US012750526B2

(12) United States Patent
Xie

(10) Patent No.: US 12,750,526 B2
(45) Date of Patent: Sep. 29, 2026

(54) DECODING METHOD, ENCODING METHOD, AND STORAGE MEDIUM

(71) Applicant: GUANGDONG OPPO MOBILE TELECOMMUNICATIONS CORP., LTD., Dongguan (CN)

(72) Inventor: Zhihuang Xie, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 19/003,094

(22) Filed: Dec. 27, 2024

(65) Prior Publication Data

US 2025/0133236 A1 Apr. 24, 2025

Related U.S. Application Data

(63) Continuation of application No. PCT/CN2022/103654, filed on Jul. 4, 2022.

(51) Int. Cl.
*H04N 19/61* (2014.01)
*H04N 19/176* (2014.01)
*H04N 19/18* (2014.01)

(52) U.S. Cl.
CPC ........... *H04N 19/61* (2014.11); *H04N 19/176* (2014.11); *H04N 19/18* (2014.11)

(58) Field of Classification Search
CPC ...... H04N 19/11; H04N 19/12; H04N 19/132; H04N 19/159; H04N 19/52; H04N 19/70; H04N 19/593; H04N 19/567
See application file for complete search history.

(56) References Cited

U.S. PATENT DOCUMENTS

2014/0314149 A1* 10/2014 Cheon .................. H04N 19/136
375/240.12
2017/0078672 A1* 3/2017 Han ..................... H04N 19/593
(Continued)

FOREIGN PATENT DOCUMENTS

CN 113557718 10/2021
CN 113632488 11/2021
(Continued)

OTHER PUBLICATIONS

Cao et al. ("EE2-related: Fusion for template-based intra mode derivation" Joint Video Experts Team (JVET) of ITU-T SG 16 WP 3 and ISO/IEC JTC 1/SC 29 23rd Meeting, by teleconference, Document: JVET-W0123-v2, Jul. 7-16, 2021.*
(Continued)

*Primary Examiner* — Fabio S Lima
(74) *Attorney, Agent, or Firm* — Hodgson Russ LLP

(57) ABSTRACT

Embodiments of the present disclosure provide a decoding method, an encoding method, and a storage medium. In the decoding method provided in embodiments of the present disclosure, first transform is performed on first transform coefficients of a current block based on a transform set corresponding to a first intra prediction mode, and the first intra prediction mode is designed to be any one of: an intra prediction mode derived from a decoder side intra mode derivation (DIMD) mode for a prediction block of the current block, an intra prediction mode derived from the DIMD mode for an output vector of an optimal matrix based intra prediction (MIP) mode for predicting the current block, an intra prediction mode derived from the DIMD mode for reconstructed samples in a first template region adjacent to the current block, and an intra prediction mode derived from a template based intra mode derivation (TIMD) mode.

9 Claims, 11 Drawing Sheets

(56) References Cited

U.S. PATENT DOCUMENTS

| | | | | |
|---|---|---|---|---|
| 2019/0166370 | A1* | 5/2019 | Xiu | H04N 19/176 |
| 2019/0215521 | A1 | 7/2019 | Chuang et al. | |
| 2021/0120266 | A1* | 4/2021 | Lee | H04N 19/593 |
| 2022/0014742 | A1 | 1/2022 | Gao et al. | |
| 2022/0060751 | A1* | 2/2022 | Nam | H04N 19/12 |

FOREIGN PATENT DOCUMENTS

| | | |
|---|---|---|
| JP | 2022529030 | 6/2022 |
| WO | 2022140718 | 6/2022 |

OTHER PUBLICATIONS

WIPO, International Search Report and Written Opinion for International Application No. PCT/CN2022/103654, Mar. 16, 2023.

Chen et al., "Algorithm description for Versatile Video Coding and Test Model 11 (VTM 11)," Joint Video Experts Team (JVET) of ITU-T SG 16 WP 3 and ISO/IEC JTC 1/SC 29, Document: JVET-T2002-v1, Oct. 2020.

Coban et al., "Algorithm description of Enhanced Compression Model 3 (ECM 3)," Joint Video Experts Team (JVET) of ITU-T SG 16 WP 3 and ISO/IEC JTC 1/SC 29, Document: JVET-X2025, Jul. 2021.

Huo et al., "EE2-related: Modification of LFNST for MIP coded block," Joint Video Experts Team (JVET) of ITU-T SG 16 WP 3 and ISO/IEC JTC 1/SC 29, Document: JVET-Z0048-v3, Apr. 2022.

EPO, Extended European Search Report for EP Application No. 22949708.6, Apr. 7, 2026.

FIPS, Office Action for RU Application No. 2025102098, Nov. 14, 2025.

JPO, Office Action for JP Application No. 2024-575832, Dec. 12, 2025.

* cited by examiner

DECODING METHOD, ENCODING METHOD, AND STORAGE MEDIUM

CROSS-REFERENCE TO RELATED APPLICATION(S)

This application is a continuation of International Application No. PCT/CN2022/103654, filed Jul. 4, 2022, the entire disclosure of which is incorporated herein by reference.

TECHNICAL FIELD

This disclosure relates to the field of video coding, and in particular to a decoding method, an encoding method, and a storage medium.

BACKGROUND

Digital video compression technology mainly involves compressing a huge amount of digital picture video data, to facilitate transmission, storage, or the like. With the surge of internet video and higher requirements for video clarity, although a video decompression technology can be realized with existing digital video compression standards, at present, there is still a need for better digital video compression technology to improve compression efficiency.

SUMMARY

Embodiments of the present disclosure provide a decoding method, an encoding method, and a storage medium, which can improve compression efficiency.

In a first aspect, a decoding method is provided in embodiments of the present disclosure. The decoding method includes the following. A bitstream is parsed to obtain first transform coefficients of a current block. A first intra prediction mode is determined. First transform is performed on the first transform coefficients based on a transform set corresponding to the first intra prediction mode, to obtain second transform coefficients of the current block. Second transform is performed on the second transform coefficients, to obtain a residual block of the current block. A reconstructed block of the current block is determined based on the prediction block of the current block and the residual block of the current block.

In a second aspect, an encoding method is provided in embodiments of the present disclosure. The encoding method includes the following. A residual block of a current block is obtained. Third transform is performed on the residual block of the current block, to obtain third transform coefficients of the current block. A first intra prediction mode is determined. Fourth transform is performed on the third transform coefficients based on a transform set corresponding to the first intra prediction mode, to obtain fourth transform coefficients of the current block. The fourth transform coefficients are encoded.

In a third aspect, a non-transitory computer-readable storage medium is provided in embodiments of the present disclosure. The non-transitory computer-readable storage medium stores a bitstream. The bitstream is generated according to the method of the second aspect.

DETAILED DESCRIPTION

Figure 1:
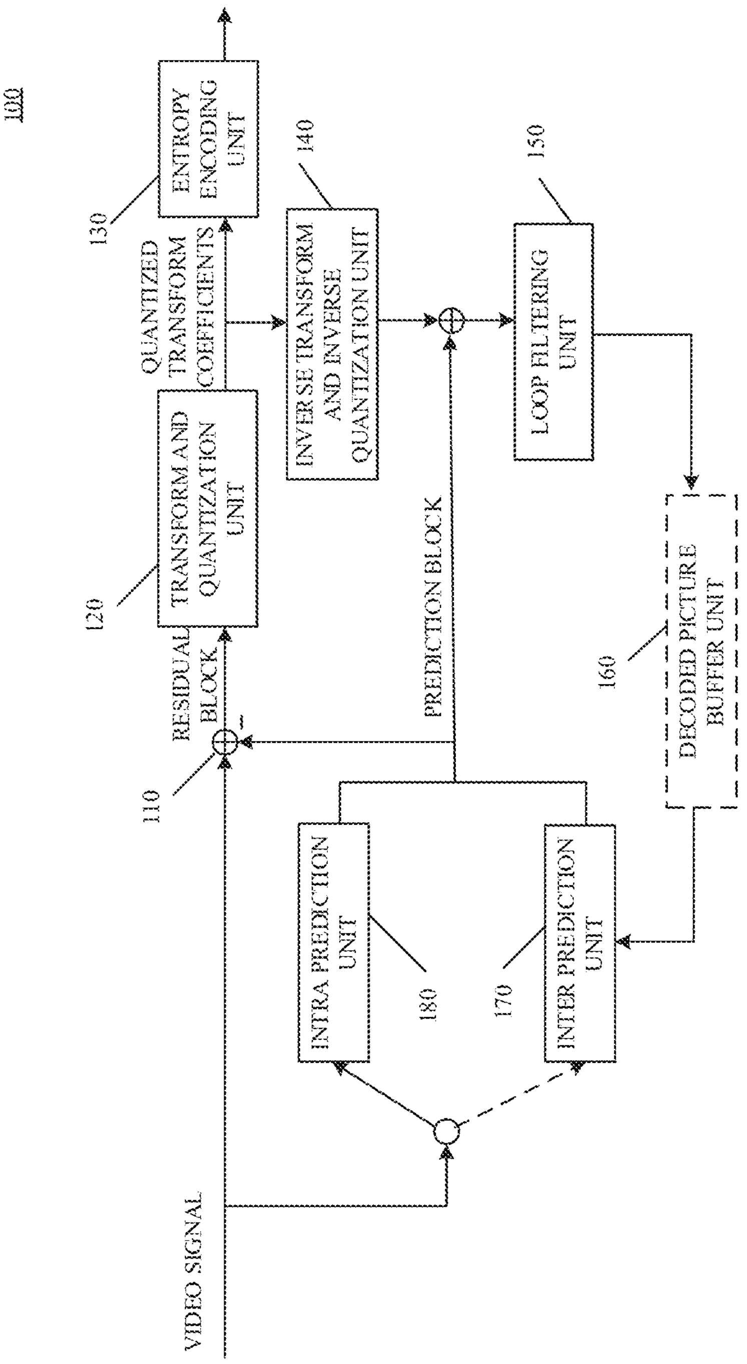
FIG. 1 is a schematic block diagram of an encoding framework provided in embodiments of the present disclosure.

The following will describe technical solutions of embodiments of the present disclosure with reference to accompanying drawings.

Solutions of embodiments of the present disclosure are applicable to the technical field of digital video coding, including but not limited to picture coding, video coding, hardware video coding, dedicated circuit video coding, real-time video coding, etc. In addition, the solutions of embodiments of the present disclosure can be incorporated into audio video coding standards (AVS), AVS 2, or AVS 3. For example, the AVS includes, but is not limited to, H.264/audio video coding (AVC) standard, H.265/high efficiency video coding (HEVC) standard, and H.266/versatile video coding (VVC) standard. Furthermore, the solutions of embodiments of the present disclosure can be used for performing lossy compression or lossless compression on a picture. The lossless compression can be visually lossless compression or mathematically lossless compression.

A block-based hybrid coding framework is generally used in video coding standards. Specifically, each picture of a video is divided into largest coding units (LCUs) or coding tree units (CTUs), which are squares of equal size (e.g., 128×128, 64×64, etc.). Each LCU or CTU can be divided into rectangular coding units (CUs) according to certain rules. Furthermore, the CU can also be divided into prediction units (PUs), transform units (TUs), etc. The hybrid coding framework can include modules such as prediction, transform, quantization, entropy coding, and in-loop filter. The prediction module includes intra prediction and inter prediction, and the inter prediction includes motion estimation and motion compensation. Since there is a strong correlation among neighbouring samples in a video picture, using intra prediction in video coding can eliminate spatial redundancy between neighbouring samples. The intra prediction only refers to picture information of a same picture to predict sample information of a current partitioned block. Moreover, since there is also a strong similarity between neighbouring pictures in the video, using inter prediction in video coding can eliminate temporal redundancy between neighbouring pictures, thereby improving coding efficiency. The inter prediction can refer to picture information of different pictures and use motion estimation to search motion vector information that best matches the current partitioned block. For the transform, a predicted block is transformed into a frequency domain, redistributing energy. Combined with the quantization, information that is not sensitive to human eyes is removed, thereby eliminating visual redundancy. The entropy coding can eliminate character redundancy according to a current context model and probability information of a binary bitstream.

In a digital video encoding process, an encoder reads a black-and-white picture or a colour picture from an original picture sequence, and then encodes the black-and-white picture or the colour picture. The black-and-white picture can include samples of luma components, and the colour picture can include samples of chroma components. Optionally, the colour picture can also include samples of luma components. A colour format of the original picture sequence can be a luma-chroma (YCbCr, YUV) format or a red-green-blue (RGB) format, etc. Specifically, after the encoder reads the black-and-white picture or the colour picture, the encoder divides the black-and-white picture or the colour picture into blocks respectively. A prediction block of a current block is generated by performing intra prediction or inter prediction on the current block. A residual block is obtained by subtracting the prediction block from an original block of the current block. A quantization coefficient matrix is obtained by performing transform and quantization on the residual block. The quantization coefficient matrix is encoded into a bitstream by entropy encoding. In a digital video decoding process, at a decoding end, the prediction block of the current block is generated by performing intra prediction or inter prediction on the current block. Moreover, the quantization coefficient matrix is obtained by decoding the bitstream, the residual block is obtained by performing inverse quantization and inverse transform on the quantization coefficient matrix, and the reconstructed block is obtained by adding the prediction block and the residual block. The reconstructed blocks can form a reconstructed picture. A decoded picture is obtained by performing loop filtering on the reconstructed picture on a picture basis or on a block basis.

The current block can also be a current CU or a current PU.

It can be noted that similar operations for obtaining the decoded picture are also needed at an encoding end. The decoded picture can be a reference picture of a subsequent picture for inter prediction. Block partition information determined at the encoding end, as well as mode information or parameter information for prediction, transform, quantization, entropy coding, loop filtering, etc., are carried in the bitstream when necessary. The decoding end parses the bitstream and analyzes existing information to determine the block partition information, as well as the mode information or the parameter information for prediction, transform, quantization, entropy coding, loop filtering, etc. the same as such information at the encoding end, so as to ensure that the decoded picture obtained by the encoding end is the same as the decoded picture obtained by the decoding end. The decoded picture obtained by the encoding end is also referred to as "reconstructed picture". The current block can be partitioned into PUs during prediction, the current block can be partitioned into transform units (TUs) during transform, and the partition of PUs can be different from the partition of TUs. Certainly, the above is a basic process of the video encoder and the video decoder under the block-based hybrid coding framework. With the development of technology, some modules or steps of the framework or process can be optimized. The present disclosure is applicable to the basic process of the video encoder and the video decoder under the block-based hybrid coding framework.

For ease of understanding, the following will give a brief introduction to an encoding framework provided in the present disclosure.

FIG. 1 is a schematic block diagram of an encoding framework 100 provided in embodiments of the present disclosure.

As illustrated in FIG. 1, the encoding framework 100 can include an intra prediction unit 180, an inter prediction unit 170, a residual unit 110, a transform and quantization unit 120, an entropy encoding unit 130, an inverse transform and inverse quantization unit 140, and a loop filtering unit 150. Optionally, the encoding framework 100 can also include a decoded picture buffer unit 160. The encoding framework 100 can also be referred to as "hybrid frame encoding mode".

The intra prediction unit 180 or the inter prediction unit 170 can predict a block to-be-encoded to output a prediction block. The residual unit 110 can calculate a residual block, i.e., a difference between the prediction block and the block to-be-encoded, based on the prediction block and the block to-be-encoded. The transform and quantization unit 120 is configured to perform transform and quantization operations on the residual block to remove information that is not sensitive to the human eye, thereby eliminating visual redundancy. Optionally, the residual block before being transformed and quantized by the transform and quantization unit 120 can be referred to as "temporal residual block", and a temporal residual block after being transformed and quantized by the transform and quantization unit 120 can be referred to as "frequency residual block" or "frequency-domain residual block". The entropy encoding unit 130 receives quantized transform coefficients output by the transform and quantization unit 120, and can output a bitstream based on the quantized transform coefficients. For example, the entropy encoding unit 130 can eliminate character redundancy according to a target context model and probability information of a binary bitstream. For example, the entropy encoding unit 130 is configured to implement context-based adaptive binary arithmetic coding (CABAC). The entropy encoding unit 130 is also referred to as "header information encoding unit". Optionally, in the present disclosure, the block to-be-encoded can also be referred to as "original block" or "target block". The prediction block can also be referred to as "predicted picture block" or "picture prediction block", and can also be referred to as "prediction signal" or "prediction information". The reconstructed block can also be referred to as "reconstructed picture block" or "picture reconstruction block", and can also be referred to as "reconstructed signal" or "reconstructed information". Furthermore, for an encoding end, the block to-be-encoded can also be referred to as "encoding block" or "encoding picture block", and for a decoding end, the block to-be-decoded can also be referred to as "decoding block" or "decoding picture block". The block to-be-encoded can be a CTU or a CU.

The encoding framework 100 calculates a residual between the prediction block and the block to-be-encoded to obtain the residual block, the residual block is transformed, quantized, etc., and then transmitted to the decoder. Correspondingly, after the decoder receives and parses the bitstream, the decoder performs inverse transform and inverse quantization to obtain the residual block, and then superimposes the residual block on the prediction block obtained through prediction by the decoder to obtain the reconstructed block.

It can be noted that in the encoding framework 100, the inverse transform and inverse quantization unit 140, the loop filtering unit 150, and the decoded picture buffer unit 160 can be configured to form a decoder. In other words, the intra prediction unit 180 or the inter prediction unit 170 can predict the block to-be-encoded based on an existed reconstructed block, so that the encoding end uses a reference frame in the same way as the decoding end. In other words, the encoder can replicate a processing loop of the decoder and thus can generate the same prediction as the decoding end. Specifically, the quantized transform coefficients are inversely transformed and inversely quantized by the inverse transform and inverse quantization unit 140 to replicate an approximate residual block at the decoding end. The approximate residual block plus the prediction block can then be processed by the loop filtering unit 150 to smoothly filter out effects such as blocking due to block-based processing and quantization. The block output from the loop filtering unit 150 can be stored in the decoded picture buffer unit 160 for the prediction of subsequent pictures.

It can be understood that FIG. 1 is only an example of the present disclosure and cannot be construed as a limitation to the present disclosure.

For example, the loop filtering unit 150 in the encoding framework 100 can include a deblocking filter (DBF) and a sample adaptive offset (SAO). The DBF has a function of deblocking, and the SAO has a function of deringing. In other embodiments of the present disclosure, a neural network-based loop filtering algorithm can be used for the encoding framework 100 to improve video compression efficiency. Alternatively, the encoding framework 100 can be a video encoding hybrid framework based on a deep learning neural network. In an embodiment, a convolutional neural network (CNN)-based model can be used based on the DBF and the SAO to calculate a result after sample filtering. The loop filtering unit 150 can have the same or different network structure in a luma component and in a chroma component. Considering that the luma component contains more visual information, the luma component can also be used for guiding the filtering of the chroma component, thereby improving the reconstruction quality of the chroma component.

The following will introduce contents related to intra prediction and inter prediction.

For inter prediction, the inter prediction can refer to picture information of different pictures and use motion estimation to search motion vector information that best matches the block to-be-encoded, so as to eliminate temporal redundancy. A picture for which inter prediction is used can be a P frame and/or a B frame, where the P frame refers to a forward predicted picture, and the B frame refers to bidirectional predicted picture.

For intra prediction, the intra prediction only refers to information of a same picture to predict sample information of the block to-be-encoded, thereby eliminating spatial redundancy. A frame used for intra prediction can be an I-frame. For example, according to an encoding order from the left to the right and from the top to the bottom, prediction can be performed on the block to-be-encoded by taking a top-left block, a top block, and a left block as reference information, and the block to-be-encoded is also used as reference information of a subsequent block. In this way, prediction can be performed on the whole picture. If an input digital video is in a colour format, such as a YUV 4:2:0 format, every 4 pixels of each picture in the digital video have 4 Y components and 2 UV components, and the encoding framework 100 can encode the Y components (i.e., luma block) and the UV components (i.e., chroma block) respectively. Similarly, the decoder can also decode correspondingly according to the format.

For an intra prediction process, in intra prediction, prediction can be performed on the block to-be-encoded in an angular prediction mode and in a non-angular prediction mode, to obtain a prediction block. An optimal prediction mode for the block to-be-encoded is selected according to rate-distortion information calculated from the prediction block and the block to-be-encoded. The prediction mode is then transmitted to the decoding end through the bitstream. The decoding end parses out the prediction mode and performs prediction to obtain a prediction block of a target decoding block. The prediction block is superimposed with a temporal residual block transmitted through the bitstream, so as to obtain a reconstructed block.

With the development of digital video coding standards over generations, the non-angular prediction mode remains relatively stable and includes a mean mode and a planar mode. The number of angular prediction modes increases continuously with the evolution of digital video coding standards. Taking international digital video coding standard H series as an example, H.264/AVC standard only includes eight angular prediction modes and one non-angular prediction mode, H.265/HEVC is extended to include 33 angular prediction modes and two non-angular prediction modes, and in H.266/VVC, the intra prediction mode is further extended. For luma blocks, there are in total 67 traditional prediction modes and a non-traditional prediction mode, i.e., a matrix weighted intra prediction (MIP) mode. These 67 traditional prediction modes include a planar mode, a DC mode, and 65 angular prediction modes, where the planar mode is usually used for processing some blocks with gradient textures, the DC mode is usually used for processing some flat areas, and the angular prediction mode is usually used for processing blocks with obvious angular textures.

It can be noted that, in the present disclosure, the current block for the intra prediction can be a square block or a rectangular block.

Further, since intra prediction blocks are all square, the probabilities of using respective angular prediction modes are equal. When the length and the width of the current block are not equal, for horizontal blocks (whose width is greater than its height), top reference samples are more likely to be used than left reference samples, and for vertical blocks (whose height is greater than its width), top reference samples are less likely to be used than left reference samples. Based on this, a wide angular prediction mode is introduced in the present disclosure. When prediction is performed on a rectangular block, the traditional angular prediction mode is changed into the wide angular prediction mode. A prediction angle range of the current block when the wide angular prediction mode is used for performing prediction on the rectangular block is larger than a prediction angle range when the traditional angular prediction mode is used for performing prediction on the rectangular block. Optionally, when the wide angular prediction mode is used, an index of the traditional angular prediction mode can still be used for sending a signal. Correspondingly, the decoding end receives the signal and then can change the traditional angular prediction mode into the wide angular prediction mode. As such, the total number of intra prediction modes and an intra-mode encoding method remain unchanged.

Further, an intra prediction mode to-be-performed can be determined or selected based on the size of the current block. For example, the wide angular prediction mode can be determined or selected based on the size of the current block for performing intra prediction on the current block. For example, when the current block is a rectangular block (the width and the height are different), the wide angular prediction mode can be used for performing intra prediction on the current block. An aspect ratio of the current block can be used for determining an angular prediction mode to be replaced and an angular prediction mode for replacement in the wide angular prediction mode. For example, when prediction is performed on the current block, any intra prediction mode with an angle not exceeding a diagonal angle of the current block (from the bottom-left corner to the top-right corner of the current block) can be selected as the replaced angular prediction mode.

Other intra prediction modes involved in the present disclosure will be described below.

(1) Matrix-Based Intra Prediction (MIP) Mode

The MIP mode can also be referred to as "matrix-weighted intra prediction mode". Processes involved in the MIP mode can include three main operations, which are a down-sampling process, a matrix multiplication process, and an up-sampling process respectively. Specifically, spatial neighbouring reconstructed samples are down-sampled first through the down-sampling process. Then, a sample sequence after down-sampling is used as an input vector of the matrix multiplication process, i.e., an output vector of the down-sampling process is used as the input vector of the matrix multiplication process, the input vector of the matrix multiplication process is then multiplied with a preset matrix and added with a bias vector, and a sample vector after calculation is output. Finally, an output vector of the matrix multiplication process is used as an input vector of the up-sampling process, and a final prediction block is obtained by up-sampling.

Figure 2:
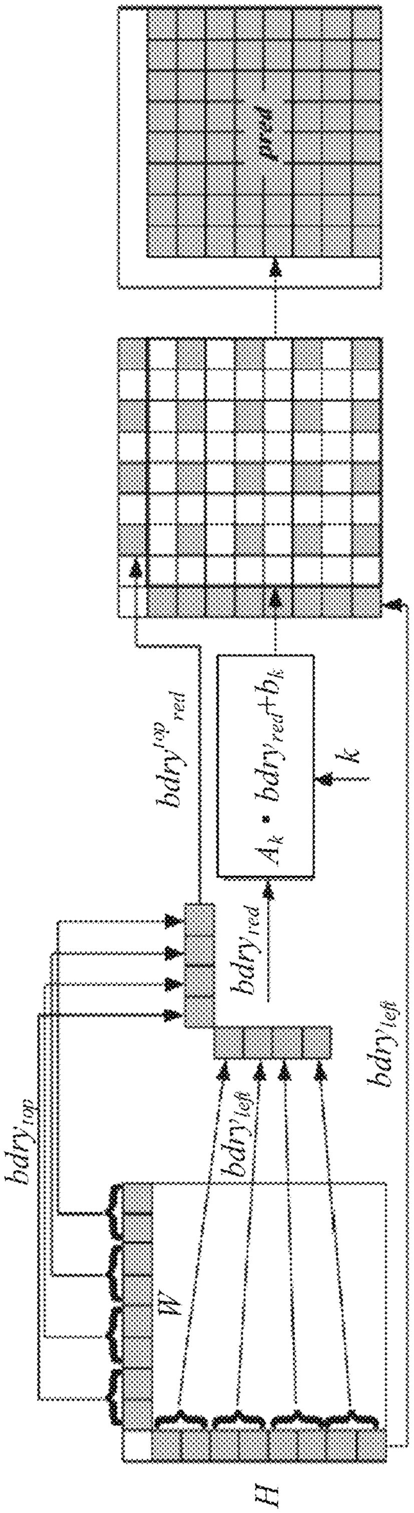
FIG. 2 is a schematic diagram of a matrix based intra prediction (MIP) mode provided in embodiments of the present disclosure.

FIG. 2 is a schematic diagram of an MIP mode provided in embodiments of the present disclosure.

As illustrated in FIG. 2, for the MIP mode, in the down-sampling process, a down-sampled top neighbouring reconstructed sample vector $bdry_{top}$ is obtained by averaging top neighbouring reconstructed samples of a current CU, and a down-sampled left neighbouring reconstructed sample vector $bdry_{left}$ is obtained by averaging left neighbouring reconstructed samples of the current CU. After $bdry_{top}$ and $bdry_{left}$ are obtained, $bdry_{top}$ and $bdry_{left}$ are used as an input vector $bdry_{red}$ of the matrix multiplication process. Specifically, a sample vector can be obtained based on a top-row vector $bdry_{topred}$ of $bdry_{red}$, $bdry_{left}$, and $A_k \cdot bdry_{red}+b_k$, where $A_k$ is a preset matrix, $b_k$ is a preset bias vector, and k is an index of the MIP mode. After the sample vector is obtained, the sample vector is up-sampled with linear interpolation to obtain a predicted sample block having the number of samples consistent with the actual number of samples of the CU.

In other words, in order to predict a block with the width of W and the height of H, H reconstructed samples in a left column of the current block and W reconstructed samples in a top row of the current block are needed as inputs for the MIP. A prediction block in the MIP is mainly generated based on three operations: reference samples averaging, matrix vector multiplication, and interpolation. A core of MIP is matrix vector multiplication which can be regarded as a process of generating the prediction block from input samples (reference samples) in a matrix vector multiplication. A variety of matrixes are provided in the MIP, different matrixes have different prediction methods, and same input samples will have different results using different matrixes. The process of reference samples averaging and interpolation is a compromise design between performance and complexity. For a larger block, reference sample averaging can be performed to achieve an approximate down-sampling effect, so that the input can be adapted to a smaller matrix, while interpolation achieves an up-sampling effect. In this way, there is no need to provide an MIP matrix for the block of each size, but only matrixes with one or more specific sizes are provided. With the increasing need for compression performance and improvement of hardware capabilities, a more complex MIP can appear in the next generation of standards.

For an MIP mode, the MIP mode can be simplified from a neural network. For example, a matrix used in the MIP mode can be obtained through training. Therefore, the MIP mode has a strong generalization capability and a prediction effect not achieved by a traditional prediction mode. The MIP mode can be a model obtained by performing complexity simplification in hardware and software on a neural network-based intra prediction mode for multiple times. On the basis of a large number of training samples, multiple prediction modes indicate multiple models and parameters, which can better cover the texture of a natural sequence.

The MIP mode is somewhat similar to the planar mode, but clearly, the MIP mode is more complex and flexible than the planar mode.

It can be noted that the number of MIP modes varies for CUs of different block sizes. Exemplarily, the MIP mode has 16 prediction modes for a 4×4-sized CU. The MIP mode has 8 prediction modes for an 8×8-sized CU or a CU with a width or height equal to 4. The MIP mode has 6 prediction modes for CUs of other sizes. Moreover, the MIP mode has a transpose function. For a prediction mode that matches the current size, in the MIP mode, transpose calculations can be tried at the encoding end. Therefore, the MIP mode needs a flag indicating whether the MIP mode is used for the current CU, and if the MIP mode is used for the current CU, a transpose flag and an index flag also need to be transmitted to the decoder. The transpose flag can be binarized by fixed length (FL), with a length of 1. The index flag is binarized by truncated binary (TB) encoding. Taking a 4×4-sized coding unit as an example, there are 16 prediction modes in the MIP mode, and the index flag can be a TB flag with 5 or 6 bits.

(2) Decoder-Side Intra-Mode Derivation (DIMD) Mode

A core of the DIMD prediction mode is deriving the intra prediction mode at the decoder in the same way as the encoder, to avoid the transmission of an index of the intra prediction mode for the current CU in the bitstream, thereby saving bit overhead.

Specifically, the DIMD mode can include two main operations.

Step 1: A Prediction Mode is Derived.

Figure 3:
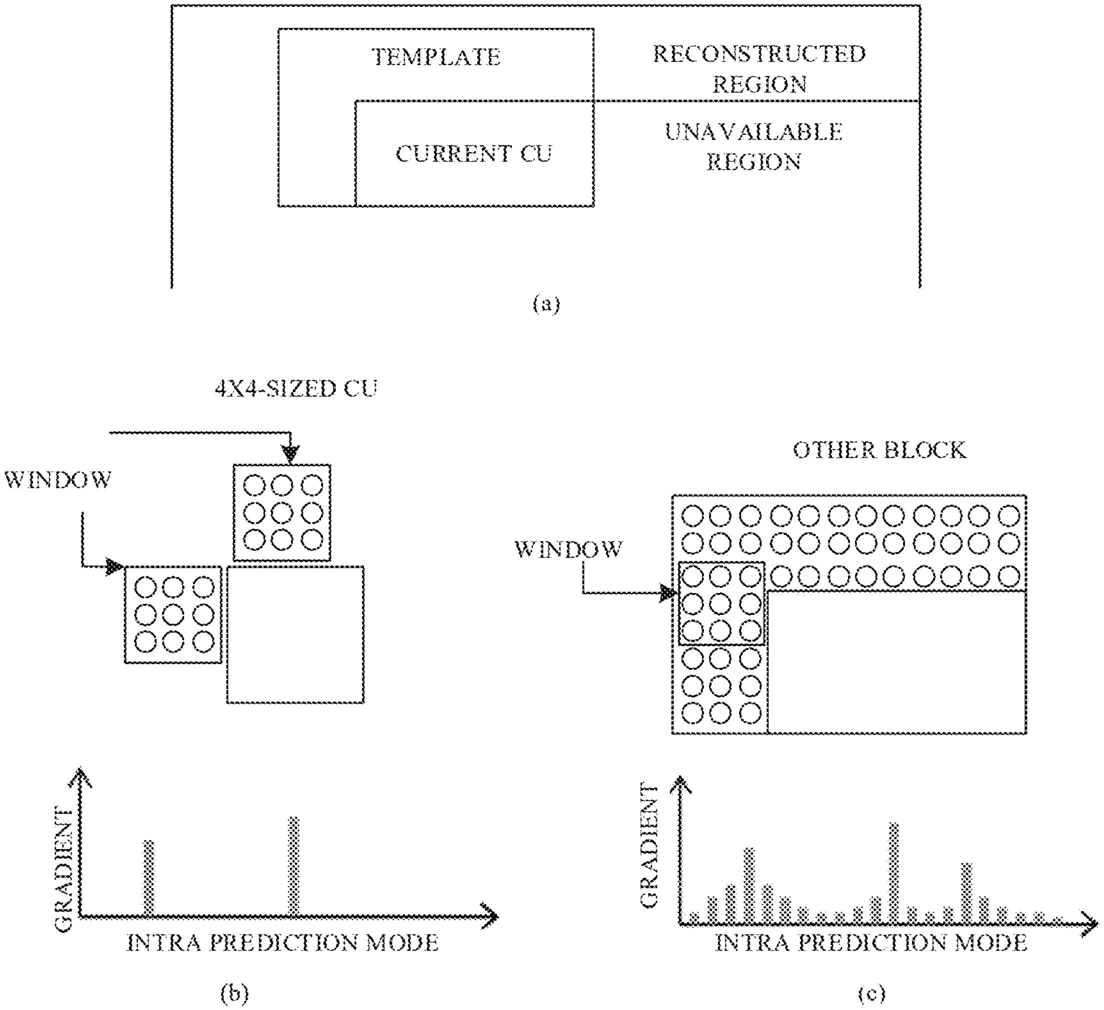
FIG. 3 is a schematic diagram illustrating derivation of a prediction mode via decoder side intra mode derivation (DIMD) provided in embodiments of the present disclosure.

FIG. 3 is a schematic diagram illustrating deriving a prediction mode via DIMD provided in embodiments of the present disclosure.

As illustrated in (a) of FIG. 3, the DIMD derives a prediction mode by utilizing samples (reconstructed samples on the left and the top of the current block) in a template in the reconstructed region. For example, the template can include the top three rows of neighbouring reconstructed samples, the left three columns of neighbouring reconstructed samples, and the corresponding top-left neighbouring reconstructed samples of the current block. Based on this, multiple gradient values corresponding to multiple neighbouring reconstructed samples can be determined in the template according to a window (e.g., a window as illustrated in (c) of FIG. 3 or a window as illustrated in (b) of FIG. 3), where each of the gradient values can be used for obtaining an intra prediction mode (IPM) adapted to its direction of gradient. In this way, the encoder can use a prediction mode corresponding to the maximum gradient value and a prediction mode corresponding to the second maximum gradient value among the multiple gradient values as derived prediction modes. For example, as illustrated in (b) of FIG. 3, for blocks of size 4×4, all neighbouring reconstructed samples that need to determine gradient values are analyzed and a corresponding histogram of gradients is obtained. For example, as illustrated in (c) of FIG. 3, for blocks of other sizes, all neighbouring reconstructed samples that need to determine gradient values are analyzed and a corresponding histogram of gradients is obtained. Finally, a prediction mode corresponding to the maximum gradient and a prediction mode corresponding to the second-maximum gradient in the histogram of gradients are taken as the derived prediction modes.

Certainly, the histogram of gradients in the present disclosure is only an example for determining the derived prediction modes, and can be implemented in various simple forms in specific implementations, which is not limited in the present disclosure. In addition, the present disclosure does not limit a manner in which the histogram of gradients is obtained. For example, the histogram of gradients can be obtained by using the Sobel operator or other manners. In addition, in other alternative embodiments, the gradient value involved in the present disclosure can also be equivalently replaced by the gradient amplitude value, which is not specifically limited in the present disclosure.

Step 2: A Prediction Block is Derived.

Figure 4:
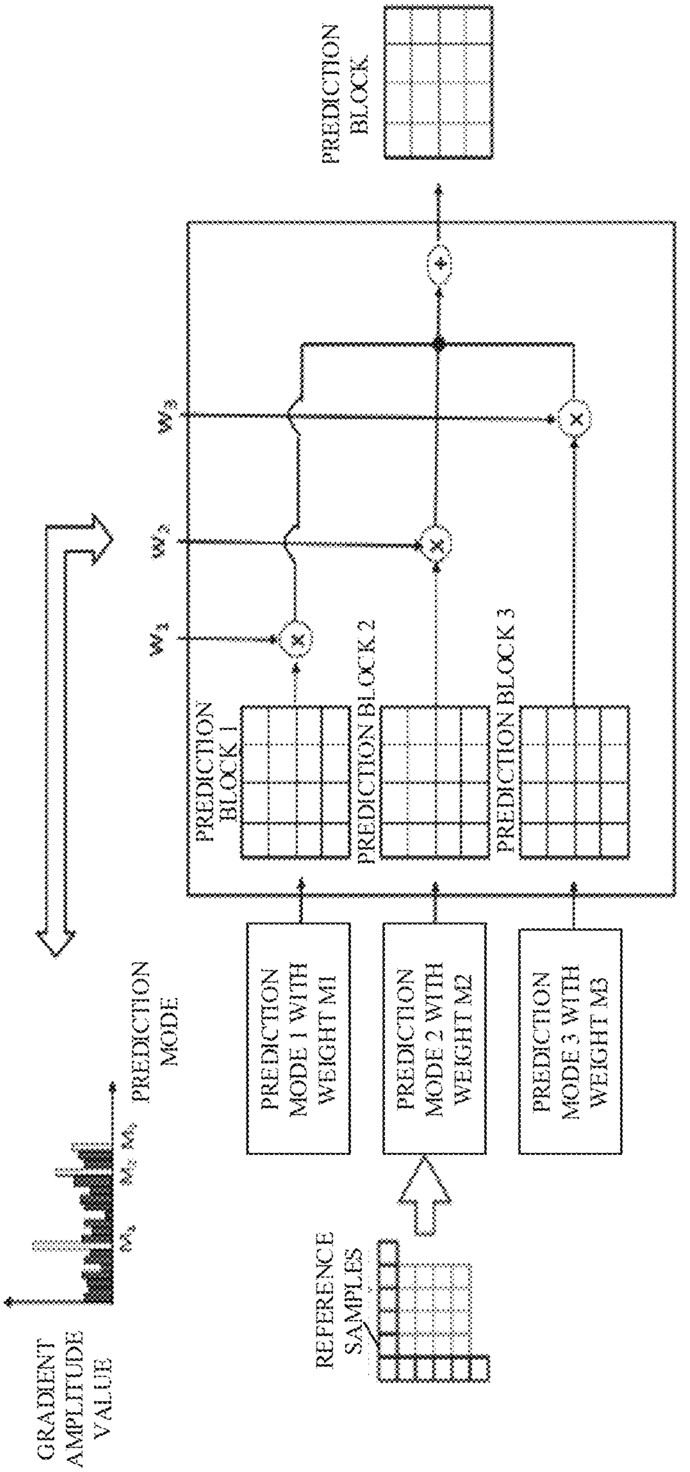
FIG. 4 is a schematic diagram illustrating derivation of a prediction block via DIMD provided in embodiments of the present disclosure.

FIG. 4 a schematic diagram illustrating deriving a prediction block via DIMD provided in embodiments of the present disclosure.

As illustrated in FIG. 4, the encoder can weight prediction values corresponding to three intra prediction modes (the planar mode as well as two intra prediction modes derived via the DIMD). The same prediction block derivation mode is used at both the encoder and the decoder to obtain a prediction block of the current block. Assuming that the prediction mode corresponding to the maximum gradient value is prediction mode 1 and the prediction mode corresponding to the second maximum gradient value is prediction mode 2, then the encoder evaluates the following two conditions: 1) the gradient of prediction mode 2 is not 0, and 2) neither prediction mode 1 nor prediction mode 2 is the planar mode or a DC prediction mode.

If both conditions are not simultaneously satisfied, only prediction mode 1 is used for calculating predicted sample values of the current block. That is, the regular prediction process is applicable to prediction mode 1. Otherwise, if both conditions are satisfied, the prediction block of the current block will be derived using a weighted average approach. A specific method is as follows. A weight of the planar mode is ⅓, and a total weight of prediction mode 1 and prediction mode 2 is ⅔. A weight of prediction mode 1 is obtained by dividing the gradient amplitude value of prediction mode 1 by a sum of the gradient amplitude value of prediction mode 1 and the gradient amplitude value of prediction mode 2, and a weight of prediction mode 2 is obtained by dividing the gradient amplitude value of prediction mode 2 by the sum of the gradient amplitude value of prediction mode 1 and the gradient amplitude value of prediction mode 2. Finally, the prediction blocks are obtained based on the three prediction modes, i.e., prediction block 1, prediction block 2, and prediction block 3 are obtained based on prediction mode 1, prediction mode 2, and the planar mode, and then the prediction block of the current block is obtained by performing weighted average on prediction block 1, prediction block 2, and prediction block 3. The decoder obtains the prediction block with the same operations.

In other words, weights at Step 2 are calculated as follows.

$$\text{Weight(PLANAR)} = 1/3;$$

$$\text{Weight}\big(\text{mode2}/3 * \big(ampl/(ampl + amp2)\big); \text{ and}$$

$$\text{Weight(mode2)} = 1 - \text{Weight(PLANAR)} - \text{Weight(mode1)};$$

where model indicates prediction mode 1, mode 2 indicates prediction mode 2, amp1 indicates the gradient amplitude value of prediction mode 1, and amp2 indicates the gradient amplitude value of prediction mode 2. In the DIMD mode, a flag needs to be transmitted to the decoder for indicating whether the DIMD mode is used for the current CU.

Certainly, performing weighted average is only an example of the present disclosure and cannot be construed as a limitation to the present disclosure.

To summarize, in the DIMD, the intra prediction modes are selected by analyzing the gradients of the reconstructed samples, and the two intra prediction modes and the planar mode are weighted according to the results of the analysis. The advantage of the DIMD is that if the DIMD mode is selected for the current block, there is no need to indicate which intra prediction mode is used in the bitstream, but it is derived by the decoder itself through the above process, thereby saving overhead to a certain extent.

(3) Template-Based Intra-Mode Derivation (TIMD) Mode

The technical principle of the TIMD mode is similar to that of the DIMD mode, and both the encoder and the decoder perform the same operations to derive the prediction mode to reduce the overhead of transmitting mode indexes. The TIMD mode can be understood as two main parts. First, cost information of each prediction mode is calculated according to a template. A prediction mode corresponding to the minimum cost and a prediction mode corresponding to the second-minimum cost are selected. The prediction mode corresponding to the minimum cost is denoted as prediction mode 1, and the prediction mode corresponding to the second-minimum cost is denoted as prediction mode 2. If a ratio of the second-minimum cost (costMode2) to the minimum cost (costMode1) satisfies a preset condition, such as costMode2<2*costMode1, weighted fusion is performed on a prediction block corresponding to prediction mode 1 and a prediction block corresponding to prediction mode 2 according to a weight corresponding to prediction mode 1 and a weight corresponding to prediction mode 2, so as to obtain a final prediction block.

Exemplarily, the weight corresponding to prediction mode 1 and the weight corresponding to the prediction mode 2 are determined according to the following manner:

$$\text{weight1} = \text{costMode2}/(\text{costMode1} + \text{costMode2});$$

$$\text{and weight2} = 1 - \text{weight1};$$

where weight1 indicates the weight for the prediction block corresponding to prediction mode 1, and weight2 indicates the weight for the prediction block corresponding to prediction mode 2. However, if the ratio of the second-minimum cost (costMode2) to the minimum cost (costMode1) does not satisfy the preset condition, the weighted fusion on the prediction blocks is not performed, and the prediction block corresponding to prediction mode 1 is taken as the TIMD prediction block.

It can be noted that when the TIMD mode is used for performing intra prediction on the current block, if no available neighbouring reconstructed sample is included in a reconstructed-sample template of the current block, in the TIMD mode, the planar mode is selected for performing intra prediction on the current block, i.e., the weighted fusion is not performed. Similar to the DIMD mode, in the TIMD mode, a flag needs to be transmitted to the decoder for indicating whether the TIMD mode is used for the current CU.

The encoder or the decoder calculates the cost information of each prediction mode as follows. Intra prediction is performed on samples in a template region according to reconstructed samples adjacent to the top or the left of the template region, and the prediction process is the same as that of an original intra prediction mode. For example, when intra prediction is performed on the samples in the template region in a DC mode, an average of the whole CU is calculated. For another example, when the intra prediction is performed on the samples in the template region in an angle prediction mode, a corresponding interpolation filter is selected according to the mode, and predicted samples are obtained by interpolation according to the rules. In this case, the distortion between the predicted samples and the reconstructed samples in the template region, i.e., the cost information of the current prediction mode, can be calculated according to the predicted samples and the reconstructed samples in the template region.

Figure 5:
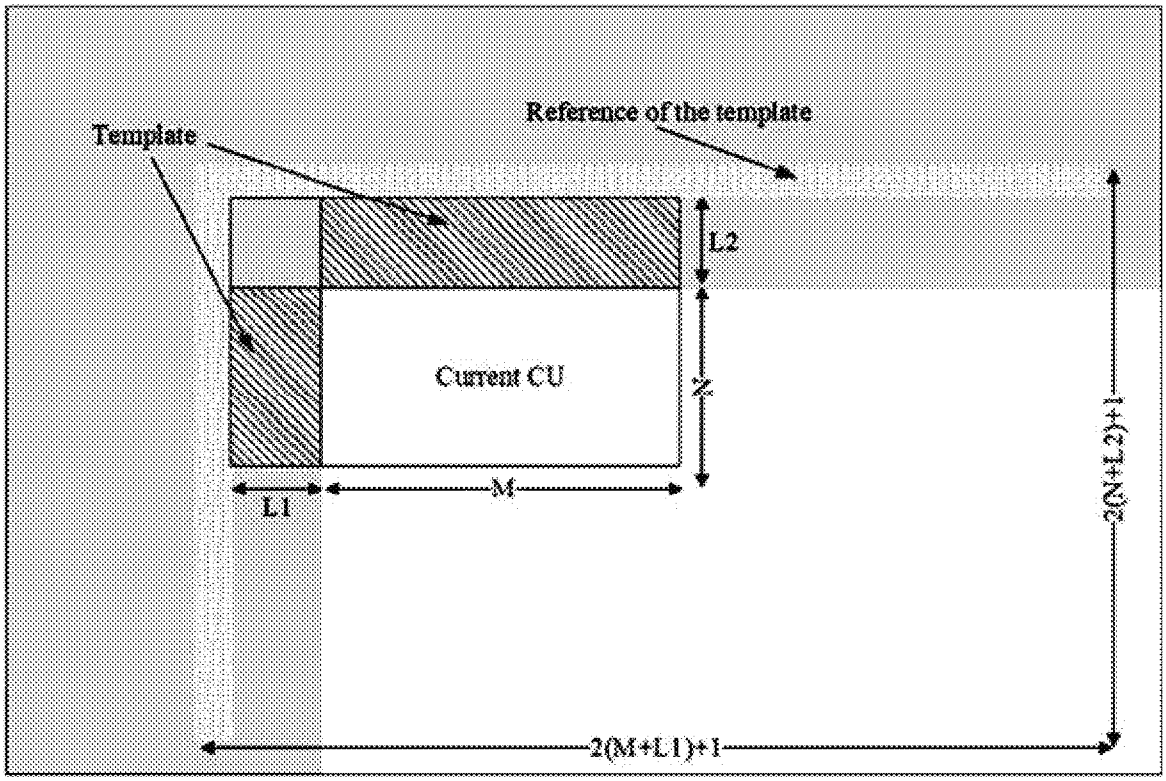
FIG. 5 is a schematic diagram illustrating a template used in template based intra mode derivation (TIMD) provided in embodiments of the present disclosure.

FIG. 5 is a schematic diagram of a template used for TIMD provided in embodiments of the present disclosure.

As illustrated in FIG. 5, if the current block is a CU with a width equal to M and a height equal to N, the encoder and the decoder can select a reference of template of the current block based on a CU with a width equal to 2(M+L1)+1 and a height equal to 2(N+L2)+1, to calculate the template of the current block. In this case, if no available neighbouring reconstructed sample is included in the template of the current block, in the TIMD mode, the planar mode is selected for performing intra prediction on the current block. For example, the template of the current block can be samples adjacent to the left and the top of the current CU in FIG. 5, i.e., no available reconstructed samples are present in regions padded with oblique lines. In other words, if there is no available neighbouring reconstructed sample in the regions padded with oblique lines, in the TIMD mode, the planar mode is selected to perform intra prediction on the current block.

It is worth noting that except for the boundary case, when the current block is encoded and decoded, theoretically, reconstructed values can be obtained at the left and the top of the current block, that is, available neighbouring reconstructed samples are included in the template of the current block. In a specific implementation, the decoder can predict the template in a certain intra prediction mode, and compare a prediction value with a reconstructed value to obtain a cost of the intra prediction mode in the template, for example, a sum of absolute difference (SAD), a sum of absolute transformed difference (SATD), and a sum of squared error (SSE). Since the template is adjacent to the current block, the reconstructed samples in the template have a correlation with samples in the current block. Therefore, a prediction mode used for the template can be used to estimate the prediction mode used for the current block. In the TIMD, prediction is performed on the template in some candidate intra prediction modes to obtain costs of the candidate intra prediction modes in the template, and prediction values in one or two intra prediction modes with the lowest costs are taken as intra prediction values of the current block. If a difference in two costs corresponding to the two intra prediction modes in the template is small, weighted average is performed on prediction values of the two intra prediction modes, to improve the compression performance. Optionally, weights of the prediction values of the two prediction modes are related to the costs, for example, the weights are inversely proportional to the costs.

To summarize, in the TIMD, the intra prediction modes are selected according to prediction effects of the intra prediction modes in the template, and the two intra prediction modes are weighted according to the costs in the template. The advantage of the TIMD is that if the TIMD mode is selected for the current block, there is no need to indicate which intra prediction mode is used in the bitstream, but it is derived by the decoder itself through the above process, thereby saving overhead to a certain extent.

Through the above brief introductions to several intra prediction modes, it is not difficult to find that the technical principle of the DIMD mode is similar to that of the TIMD prediction mode, and the encoder and the decoder perform the same operations to infer the prediction mode of the current CU. This prediction mode can avoid transmission of an index of the prediction mode with acceptable complexity, thereby reducing overhead and improving compression efficiency. However, due to the limitation of reference information and the fact that the tool itself does not have much part to improve the prediction quality, the DIMD mode and the TIMD mode work better in large regions with consistent texture characteristics. The technology does not perform well if the texture changes slightly or the template region cannot be covered.

In addition, both the DIMD mode and the TIMD mode involve fusion or weighted prediction on prediction blocks obtained based on multiple traditional prediction modes. Fusion of the prediction blocks can produce effects that cannot be achieved by a single prediction mode. The DIMD mode introduces the planar mode as an additional weighted prediction mode to increase the spatial correlation between neighbouring reconstructed samples and predicted samples, thereby improving the prediction effect of intra prediction. However, due to the simplicity of the prediction principle of the planar mode, taking the planar mode prediction as the additional weighted prediction mode can have a counterproductive effect for prediction blocks with significant differences between the top-right corner and the bottom-left corner.

Contents related to a transform of a residual block are described below.

During encoding, the current block is predicted first. During the prediction, spatial or temporal correlation can be used for obtaining a picture that is the same as or similar to the current block. For a block, the prediction block may be exactly the same as the current block, but it is difficult to ensure this for all blocks in a video. Especially for a natural video or a video captured by a camera, due to factors such as complex textures of the picture, noise in the picture, etc., the prediction block and the current block are usually very similar but different. Furthermore, it is difficult to completely predict the current block due to irregular motion, distortion and deformation, occlusion, variations of luma, etc., in the video. Therefore, in the hybrid coding framework, a residual picture is obtained by subtracting a prediction picture from an original picture of the current block, or a residual block is obtained by subtracting a prediction block from a current block. The residual block is usually simpler than the original picture, therefore prediction can significantly improve the compression efficiency. The residual block is not directly encoded, instead, the residual block is usually transformed first. Transform refers to transforming the residual picture from a spatial domain to a frequency domain, to remove the correlation of the residual picture. After the residual picture is transformed into the frequency domain, since most of the energy is concentrated in a low-frequency region, most of the transformed non-zero coefficients are concentrated at the top-left corner. Then, quantization is used for further compression. Furthermore, since human eyes are not sensitive to high frequencies, a larger quantization step size can be used in a high-frequency region.

The picture transform technology is to transform the original picture so as to represent the original picture with an orthogonal function or an orthogonal matrix, where the transform is two-dimensional linear reversible. Generally, the original picture is referred to as “spatial-domain picture”, a transformed picture is referred to as “transform-domain picture” (also referred to as “frequency-domain picture”), and the transform-domain picture can be reversely transformed into the spatial-domain picture. After the picture transform, for one thing, the features of the picture can be reflected more effectively, and for another thing, the energy can be concentrated on a small amount of data, which is more beneficial to picture storage, transmission, and processing.

Technologies related to the transform involved in the present disclosure are described below.

In the field of video coding, after the encoder obtains the residual block, the encoder can transform the residual block. The transform includes a primary transform and a secondary transform. The primary transform includes but is not limited to: a discrete cosine transform (DCT) and a discrete sine transform (DST). The DCT that can be used in video coding includes but is not limited to DCT2 and DCT8. The DST that can be used in video coding includes but is not limited to DST7. Since the DCT has a strong energy concentration characteristic, only some areas (e.g., an area at the top-left corner) of the original picture have non-zero coefficients after DCT transform. Certainly, in video coding, the picture is divided into blocks for processing, and thus the transform is performed based on blocks.

It is worth noting that since pictures are all two-dimensional, the amount of computation and memory overhead of directly performing a two-dimensional transform is unbearable to the hardware conditions. Therefore, DCT2, DCT8, and DST7 each are generally divided into one-dimensional transforms in the horizontal direction and the vertical direction, that is, they are performed in two steps. For example, a horizontal transform is performed first and then a vertical transform is performed, or the vertical transform is performed first and then the horizontal transform is performed. This transform method is more effective for horizontal and vertical textures but less effective for oblique textures. Since the horizontal and vertical textures are the most common, the transform method is very useful for improving the compression efficiency.

The encoder can perform the secondary transform on the basis of the primary transform, thereby further improving the compression efficiency.

The primary transform can be used for processing the horizontal and vertical textures. The primary transform can also be referred to as “core transform”. For example, the primary transform includes but is not limited to: DCT2, DCT8, and DST7. The secondary transform is used for processing the oblique textures. For example, the secondary transform includes but is not limited to: a low frequency non-separable transform (LFNST). At the encoding end, the secondary transform is performed after the primary transform and before quantization. At the decoding end, the secondary transform is performed after inverse quantization and before inverse primary transform.

Figure 6:
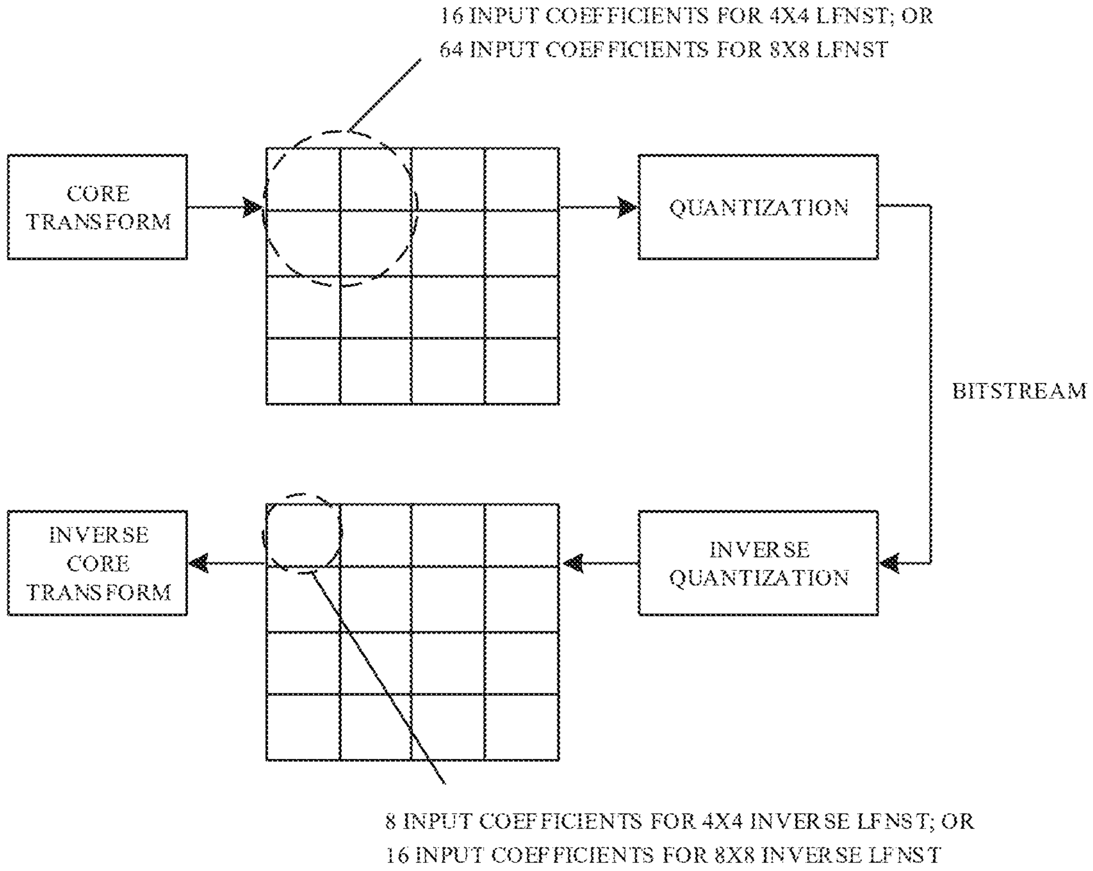
FIG. 6 is an example of a low frequency non-separable transform (LFNST) provided in embodiments of the present disclosure.

FIG. 6 is an example of an LFNST provided in embodiments of the present disclosure.

As illustrated in FIG. 6, at the encoding end, in the LFNST, the secondary transform is performed on low-frequency coefficients in the top-left corner after the core transform. The primary transform concentrates the energy in the top-left corner by de-correlating the picture, and the secondary transform further de-correlates the low-frequency coefficients after the primary transform. At the encoding end, when 16 coefficients are input to a 4×4 LFNST, 8 coefficients are output, and when 64 coefficients are input to an 8×8 LFNST, 16 coefficients are output. At the decoding end, when 8 coefficients are input to a 4×4 inverse LFNST, 16 coefficients are output, and when 16 coefficients are input to an 8×8 inverse LFNST, 64 coefficients are output.

When the encoder performs the secondary transform on the current block in the current picture, a certain transform kernel in a selected transform set can be used for transforming the residual block of the current block. For example, the secondary transform is the LFNST. A transform set can refer to a set of transform kernels for transforming a certain oblique texture, or the transform set can include a set of transform kernels for transforming certain similar oblique textures. Certainly, in other alternative embodiments, the transform kernel can also be referred to as or be equivalently replaced by “transform matrix”, “transform kernel type”, “base function”, or other terms with similar or identical meanings, and the transform set can also be referred to as or be equivalently replaced by “transform matrix set”, “transform kernel type set”, “base function set”, or other terms with similar or identical meanings, which are not limited in the present disclosure.

Figure 7:
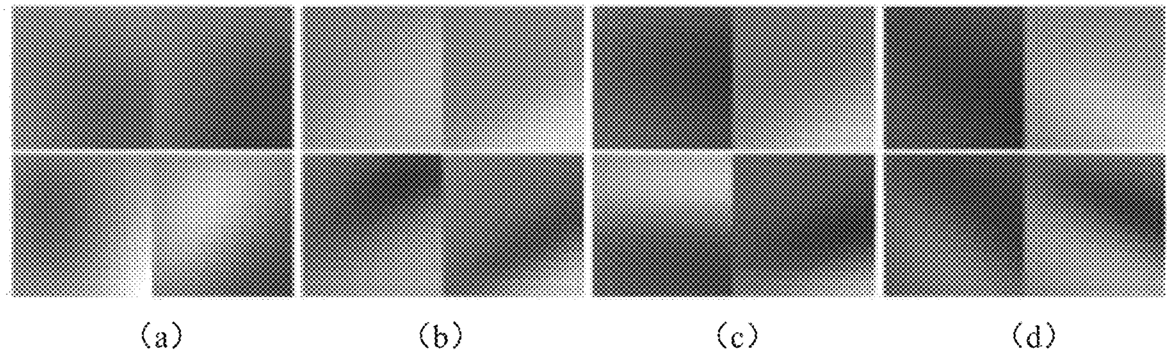
FIG. 7 is an example of a transform set of an LFNST provided in embodiments of the present disclosure.

FIG. 7 is an example of a transform set of an LFNST provided in embodiments of the present disclosure.

As illustrated in (a) to (d) of FIG. 7, there can be four transform sets for the LFNST, and transform kernels in the same transform set have similar oblique textures. Exemplarily, a transform set illustrated in (a) of FIG. 7 can be a transform set with an index of 0, a transform set illustrated in (b) of FIG. 7 can be a transform set with an index of 1, a transform set illustrated in (c) of FIG. 7 can be a transform set with an index of 2, and a transform set illustrated in (d) of FIG. 7 can be a transform set with an index of 3.

Related solutions of applying the LFNST to intra-coded blocks are described below.

In intra prediction, reconstructed samples around the current block are used as references for performing prediction on the current block. Since current videos are encoded from the left to the right and from the top to the bottom, reference samples that can be used for the current block are usually on the left and the top. In angular prediction, the reference samples are spread across the current block at a specified angle as prediction values, which means that the prediction block will have obvious directional textures and the residual of the current block after angular prediction will have obvious angular characteristics statistically. Therefore, the transform set selected for the LFNST can be bound to the intra prediction mode. In other words, after the intra prediction mode is determined, a transform set whose texture direction is adapted to the angular characteristics of the intra prediction mode can be used for the LFNST, thereby saving bit overhead.

Exemplarily, it is assumed that there are four transform sets for LFNST in total, and each transform set includes two transform kernels. Table 1 illustrates a correspondence between intra prediction modes and transform sets.

TABLE 1

| Intra prediction mode (IntraPredMode) | Index of transform set (Tr. set index) |
|---|---|
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode <= 80 | 1 |
| 81 <= IntraPredMode <= 83 | 0 |

As illustrated in Table 1, intra prediction modes 0 to 81 can be associated with indexes of the four transform sets.

It is worth noting that cross-component prediction modes used for chroma intra prediction are modes 81 to 83, while there are no such modes for luma intra prediction. The transform set for LFNST can be transposed to handle more angles with one transform set. For example, both intra prediction modes 13 to 23 and intra prediction modes 45 to 55 correspond to transform set 2, but intra prediction modes 13 to 23 are obviously close to the horizontal direction, and intra prediction modes 45 to 55 are obviously close to the vertical direction. Therefore, after a transform corresponding to intra prediction modes 45 to 55, adaption through transpose is needed.

In a specific implementation, since there are four transform sets for LFNST in total, the encoder can determine, according to the intra prediction mode used for the current block, which transform set is used for the LFNST, and then determine a transform kernel to-be-used in the determined transform set. In other words, the correlation between the intra prediction mode and the transform set for LFNST can be used for reducing the transmission of the selection of the transform set for LFNST in the bitstream. Whether LFNST is used for the current block and whether to use the first transform kernel or the second transform kernel in the transform set if LFNST is used can be determined according to the bitstream and some conditions.

Certainly, considering that there are 67 common intra prediction modes and there are only four transform sets for LFNST, multiple similar angular prediction modes can only correspond to one transform set for LFNST. This is a compromise design between performance and complexity, because each transform set requires storage space to save coefficients of transform kernels in the transform set. With the increasing requirement for compression efficiency and improvement of hardware capabilities, LFNST can also be designed to be more complex. For example, a larger transform set, more transform sets, and more transform kernels for each transform set are used.

Exemplarily, Table 2 illustrates another correspondence between intra prediction modes and transform sets.

TABLE 2

| Intra prediction mode | −14 | −13 | −12 | −11 | −10 | −9 | −8 | −7 | −6 | −5 | −4 | −3 | −2 | −1 |
|---|---|---|---|---|---|---|---|---|---|---|---|---|---|---|
| Index of transform set | 2 | 2 | 2 | 2 | 2 | 2 | 2 | 2 | 2 | 2 | 2 | 2 | 2 | 2 |
| Intra prediction mode | 0 | 1 | 2 | 3 | 4 | 5 | 6 | 7 | 8 | 9 | 10 | 11 | 12 | 13 |
| Index of transform set | 0 | 1 | 2 | 3 | 4 | 5 | 6 | 7 | 8 | 9 | 10 | 11 | 12 | 13 |
| Intra prediction mode | 14 | 15 | 16 | 17 | 18 | 19 | 20 | 21 | 22 | 23 | 24 | 25 | 26 | 27 |
| Index of transform set | 14 | 15 | 16 | 17 | 18 | 19 | 20 | 21 | 22 | 23 | 24 | 25 | 26 | 27 |
| Intra prediction mode | 28 | 29 | 30 | 31 | 32 | 33 | 34 | 35 | 36 | 37 | 38 | 39 | 40 | 41 |
| Index of transform set | 28 | 29 | 30 | 31 | 32 | 33 | 34 | 33 | 32 | 31 | 30 | 29 | 28 | 27 |
| Intra prediction mode | 42 | 43 | 44 | 45 | 46 | 47 | 48 | 49 | 50 | 51 | 52 | 53 | 54 | 55 |
| Index of transform set | 26 | 25 | 24 | 23 | 22 | 21 | 20 | 19 | 18 | 17 | 16 | 15 | 14 | 13 |
| Intra prediction mode | 56 | 57 | 58 | 59 | 60 | 61 | 62 | 63 | 64 | 65 | 66 | 67 | 68 | 69 |
| Index of transform set | 12 | 11 | 10 | 9 | 8 | 7 | 6 | 5 | 4 | 3 | 2 | 2 | 2 | 2 |
| Intra prediction mode | 70 | 71 | 72 | 73 | 74 | 75 | 76 | 77 | 78 | 79 | 80 | | | |
| Index of transform set | 2 | 2 | 2 | 2 | 2 | 2 | 2 | 2 | 2 | 2 | 2 | | | |

As illustrated in Table 2, 35 transform sets are used, and 3 transform kernels are used for each transform set. The correspondence between the transform sets and the intra prediction modes can be implemented as follows. Intra prediction modes 0 to 34 positively correspond to transform sets 0 to 34. In other words, a larger number of the prediction modes leads to a larger index of the transform set. Intra prediction modes 35 to 67 reversely correspond to transform sets 2 to 33 due to transpose. In other words, a larger number of the prediction mode leads to a smaller index of the transform set. The remaining prediction modes can uniformly correspond to a transform set with an index of 2. In other words, if transpose is not considered, one intra prediction mode corresponds to one transform set. Based on this design, a more adapted transform set can be obtained for the residual corresponding to each intra prediction mode, thereby improving the compression performance.

Certainly, one-to-one correspondence can also be achieved between the wide angular modes and the transform sets theoretically, but this design is less cost-effective, which is not illustrated in the present disclosure. It can be noted that LFNST is only an example of the secondary transform and cannot be construed as a limitation to the secondary transform. For example, LFNST is a non-separable secondary transform. In other alternative embodiments, a separable secondary transform can be used for improving the compression efficiency of the residual of the oblique textures, which is not limited in the present disclosure.

Figure 8:
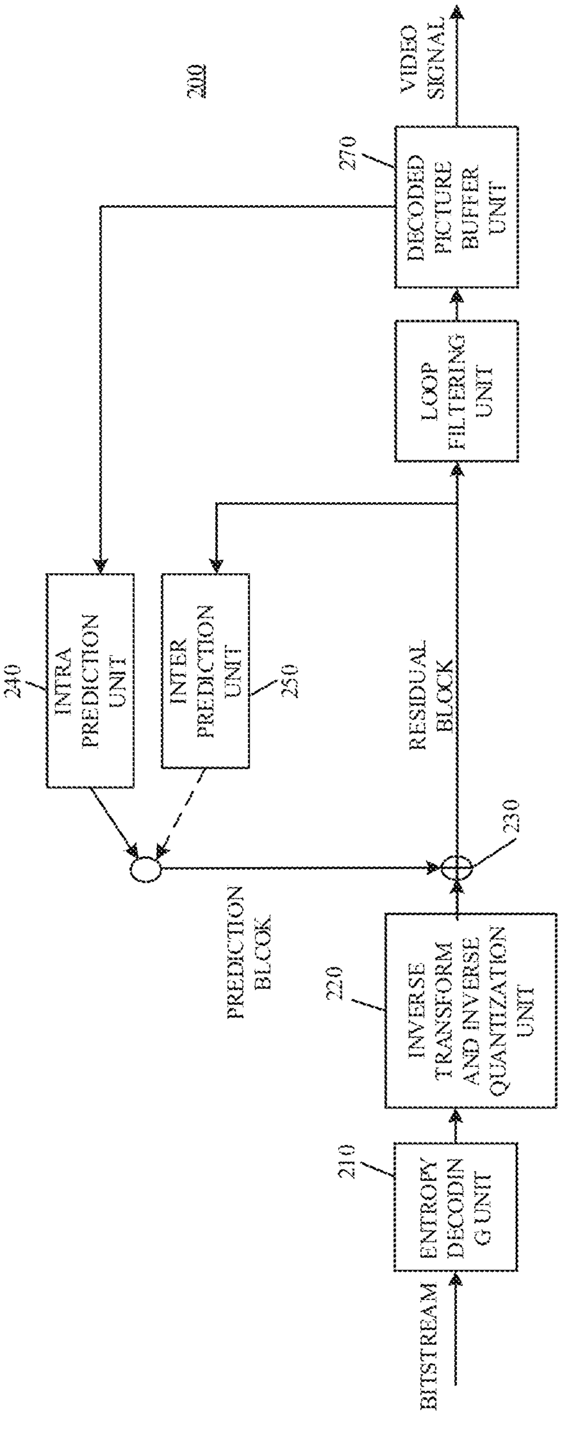
FIG. 8 is a schematic block diagram of a decoding framework provided in embodiments of the present disclosure.

FIG. 8 is a schematic block diagram of a decoding framework 200 provided in embodiments of the present disclosure.

As illustrated in FIG. 8, the decoding framework 200 can include an entropy decoding unit 210, an inverse transform and inverse quantization unit 220, a residual unit 230, an intra prediction unit 240, an inter prediction unit 250, a loop filtering unit 260, and a decoded picture buffer unit 270. The entropy decoding unit 210 receives and parses a bitstream to obtain a prediction block and a frequency-domain residual block, and the frequency-domain residual block is inversely transformed and inversely quantized by the inverse transform and inverse quantization unit 220 to obtain a temporal residual block. The residual unit 230 superimposes a prediction block obtained by the intra prediction unit 240 or the inter prediction unit 250 to the temporal residual block obtained after performing inverse transformation and inverse quantization operations by the inverse transformation and inverse quantization unit 220, to obtain a reconstructed block.

Figure 9:
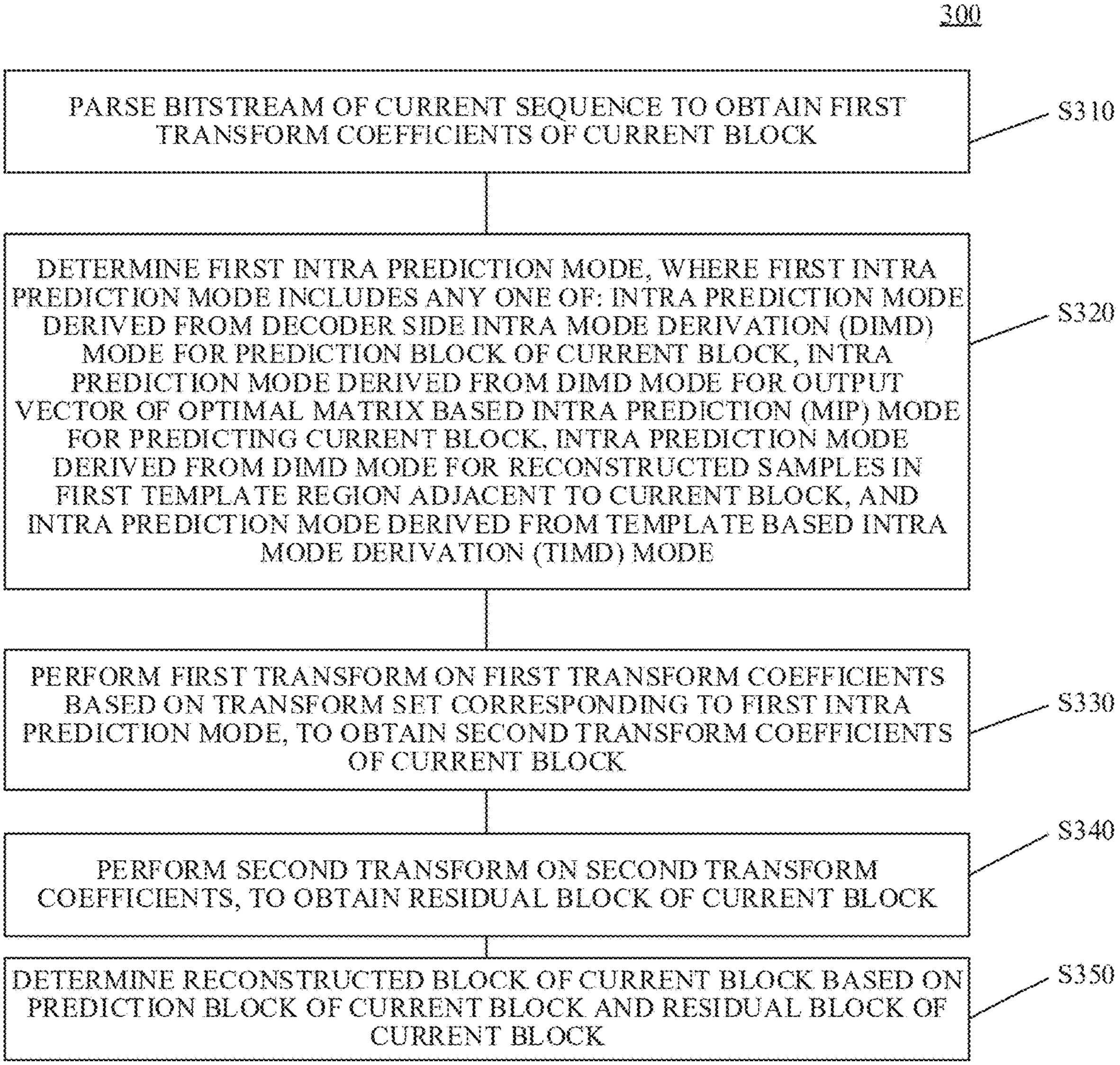
FIG. 9 is a schematic flowchart of a decoding method provided in embodiments of the present disclosure.

FIG. 9 is a schematic flowchart of a decoding method 300 provided in embodiments of the present disclosure. It can be understood that the decoding method 300 can be performed by a decoder. For example, the decoding method 300 can be performed in the decoding framework 200 illustrated in FIG. 8. For ease of description, the decoder is illustrated below as an example.

As illustrated in FIG. 9, the decoding method 300 can include some or all of the following.

S310, a bitstream of a current sequence is parsed to obtain first transform coefficients of a current block.

S320, a first intra prediction mode is determined.

The first intra prediction mode includes any one of: an intra prediction mode derived from a DIMD mode for a prediction block of the current block, an intra prediction mode derived from the DIMD mode for an output vector of an optimal MIP mode for predicting the current block, an intra prediction mode derived from the DIMD mode for reconstructed samples in a first template region adjacent to the current block, and an intra prediction mode derived from a TIMD mode.

S330, first transform is performed on the first transform coefficients based on a transform set corresponding to the first intra prediction mode, to obtain second transform coefficients of the current block.

S340, second transform is performed on the second transform coefficients, to obtain a residual block of the current block.

S350, a reconstructed block of the current block is determined based on the prediction block of the current block and the residual block of the current block.

Exemplarily, when the decoder uses the intra prediction mode derived from the DIMD mode for the reconstructed samples in the first template region, the decoder can calculate gradient values of the reconstructed samples in the first template region first, and then determine an intra prediction mode that matches a gradient direction of a reconstructed sample with the maximum gradient value among the reconstructed samples in the first template region as the intra prediction mode derived from the DIMD mode. Alternatively, the decoder can calculate, based on the reconstructed samples in the first template region, a gradient value of each intra prediction mode by traversing the intra prediction modes, and then determine an intra prediction mode with the maximum gradient value as the intra prediction mode derived from the DIMD mode.

Exemplarily, the decoder uses the intra prediction mode derived from the DIMD mode for the prediction block (or the output vector of the optimal MIP mode) of the current block, the decoder can calculate gradient values of predicted samples in the prediction block (or the output vector of the optimal MIP mode) of the current block first, and then determine an intra prediction mode that matches a gradient direction of a predicted sample with the maximum gradient value among the predicted samples in the prediction block (or the output vector of the optimal MIP mode) of the current block as the intra prediction mode derived from the DIMD mode. Alternatively, the decoder can calculate, based on the predicted samples in the prediction block (or the output vector of the optimal MIP mode) of the current block, a gradient value of each intra prediction mode by traversing the intra prediction modes, and then determine an intra prediction mode with the maximum gradient value as the intra prediction mode derived from the DIMD mode.

Exemplarily, the first transform is used for processing textures of the current block in an oblique direction.

Exemplarily, the second transform is used for processing textures of the current block in a horizontal direction and textures of the current block in a vertical direction.

It can be understood that the first transform is an inverse transform of the secondary transform at the encoding end, and the second transform is an inverse transform of the core transform at the encoding end. For example, the first transform can be an inverse (de) LFNST, and the second transform can be an inverse (de) DCT2, an inverse (de) DCT8, an inverse (de) DST7, etc.

Certainly, a method for adapting the TMMIP technology to the LFNST is also applicable to other secondary transform methods. For example, the LFNST is a non-separable secondary transform, and in other alternative embodiments, the TMMIP technology is also applicable to a separable secondary transform, which is not limited in the present disclosure.

It is worth noting that when the encoder or the decoder predicts the current block, a transform set corresponding to the planar mode may be used for performing LFNST. This is because a transform kernel used for the LFNST is obtained through deep-learning training of a dataset of the traditional intra prediction mode, and accordingly in an ordinary intra prediction process, the transform kernel used for the LFNST is usually also a transform kernel selected from the transform set of the LFNST corresponding to the traditional intra prediction mode. However, the encoder or the decoder may predict the current block in the non-traditional intra prediction mode. In this case, since the planar mode is usually used for processing some blocks with gradient textures and the LFNST is used for processing oblique textures, in general, texture information of the prediction block output from the planar mode and texture information of the planar mode in the traditional intra prediction mode are treated as one type of texture. In other words, when the encoder or the decoder predicts the current block in the non-traditional intra prediction mode, the transform set corresponding to the planar mode is used for performing LFNST. For example, when the encoder predicts the current block in the MIP mode, LFNST is performed by using the transform set corresponding to the planar mode. However, since the meaning indicated by the MIP mode is different from that indicated by the traditional intra prediction mode, that is, the traditional intra prediction mode has obvious directionality while the MIP mode is only an index of a matrix coefficient, the planar mode is used for processing some blocks with gradient textures but does not necessarily conform to the texture information of the current block. In other words, a texture direction of the transform set used for the LFNST does not necessarily conform to a texture direction of the current block, which reduces the decompression performance of the current block.

In view of the above, in embodiments of the present disclosure, the decompression performance of the current block can further be improved by introducing the first intra prediction mode and performing first transform on the first transform coefficients of the current block based on the transform set corresponding to the first intra prediction mode. In particular, when the decoder performs prediction on the current block by using the non-traditional intra prediction mode, the transform set corresponding to the planar mode will not be directly used for performing first transform, and the transform set corresponding to the first intra prediction mode can reflect the texture direction of the current block to a certain extent, thereby improving the decompression performance of the current block.

Beneficial effects of the solutions provided in the present disclosure will be described below with reference to test results in Table 3 and Table 4.

Table 3 shows results obtained from tests performed on test sequences when weighted prediction is performed on the current block in the optimal MIP mode and in a suboptimal MIP mode and the first intra prediction mode is designed to be the intra prediction mode derived from the DIMD mode for the prediction block of the current block. Table 4 shows results obtained from tests performed on the test sequences when weighted prediction is performed on the current block in the optimal MIP mode and in the intra prediction mode derived from the DIMD mode for the reconstructed samples in the first template region adjacent to the current block and the first intra prediction mode is designed to be the intra prediction mode derived from the DIMD mode for the prediction block of the current block.

TABLE 3

| | Y (BD-rate) | U (BD-rate) | V (BD-rate) | Improvement of encoding performance (EncT) | Improvement of decoding performance (DecT) |
|---|---|---|---|---|---|
| Class A1 | −0.25% | −0.18% | −0.23% | 118% | 105% |
| Class A2 | −0.15% | −0.06% | −0.02% | 118% | 104% |
| Class B | −0.17% | −0.03% | −0.06% | 121% | 107% |
| Class C | −0.20% | −0.08% | −0.02% | 117% | 106% |
| Class E | −0.25% | −0.09% | −0.13% | 119% | 105% |
| Average | −0.20% | −0.08% | −0.08% | 119% | 105% |
| Class D | −0.17% | 0.00% | −0.15% | 116% | 108% |
| Class F | −0.23% | 0.03% | 0.01% | 112% | 105% |

TABLE 4

| | Y (BD-rate) | U (BD-rate) | V (BD-rate) | Improvement of encoding performance (EncT) | Improvement of decoding performance (DecT) |
|---|---|---|---|---|---|
| Class A1 | −0.24% | −0.09% | −0.12% | 130% | 114% |
| Class A2 | −0.14% | −0.03% | 0.01% | 123% | 105% |
| Class B | −0.19% | 0.00% | 0.07% | 126% | 105% |
| Class C | −0.21% | 0.06% | 0.05% | 130% | 115% |
| Class E | −0.28% | 0.02% | −0.05% | 128% | 109% |
| Average | −0.21% | 0.00% | 0.01% | 127% | 109% |
| Class D | −0.20% | 0.06% | −0.08% | 131% | 125% |
| Class F | −0.26% | 0.15% | 0.12% | 127% | 109% |

As illustrated in Table 3 and Table 4, a Bjøntegaard delta bit rate (BD-rate) with a negative value indicates performance improvement of test results of the solutions provided in the present disclosure relative to ECM2.0. As can be seen from the test results, under the general test condition, the test results in Table 3 and Table 4 have a luma performance gain of 0.20% on average, and the 4K sequence has a good performance. It is worth noting that the TIMD prediction mode integrated in ECM2.0 has higher complexity on the basis of ECM1.0 but only achieves a performance gain of 0.4%. At present, intra coding performance is difficult to improve, while in the present disclosure, a good performance gain can be brought without increasing the complexity of the decoder. In particular, the 4K video sequence has a significant improvement. Furthermore, due to server loads, even though encoding time and decoding time fluctuate slightly, the decoding time will not substantially increase theoretically.

In some embodiments, the output vector of the optimal MIP mode is a vector before up-sampling a vector output from the optimal MIP mode, or the output vector of the optimal MIP mode is a vector after up-sampling the vector output from the optimal MIP mode.

In other words, a process of using the intra prediction mode derived from the DIMD mode for the output vector of the optimal MIP mode may be performed before the vector output from the optimal MIP mode is up-sampled, or may be performed after the vector output from the optimal MIP mode is up-sampled, which is not limited in the present disclosure.

The decoder inputs reference samples into a prediction matrix of the optimal MIP mode and obtains the vector output, where the vector output from the optimal MIP mode has at most 64 predicted samples. Compared with an up-sampled prediction block with up to thousands of predicted samples, the decoder uses the intra prediction mode derived from the DIMD mode before the vector output from the optimal MIP mode is up-sampled, which can reduce the calculation complexity, thereby improving the decompression performance of the current block. For example, the decoder uses the DIMD to calculate the gradient amplitude value of each traditional prediction mode before up-sampling, which can effectively reduce the calculation complexity.

In some embodiments, the operations at S350 can include the following. The decoder determines the first intra prediction mode based on a prediction mode for predicting the current block.

Exemplarily, the decoder determines the first intra prediction mode based on a mode type of the prediction mode for predicting the current block.

Exemplarily, the decoder determines the first intra prediction mode based on a derivation mode of the prediction mode for predicting the current block.

Exemplarily, the derivation mode of the prediction mode for predicting the current block includes, but is not limited to: the MIP mode, the DIMD mode, and the TIMD mode.

In some embodiments, when the prediction mode for predicting the current block includes the optimal MIP mode and the suboptimal MIP mode for predicting the current block, the decoder determines the first intra prediction mode to be the intra prediction mode derived from the DIMD mode for the prediction block of the current block, or the decoder determines the first intra prediction mode to be the intra prediction mode derived from the DIMD mode for the output vector of the optimal MIP mode.

In other words, when the decoder performs weighted prediction on the current block in the optimal MIP mode and in the suboptimal MIP mode, the decoder determines that the first intra prediction mode is the intra prediction mode derived from the DIMD mode for the prediction block of the current block, or the decoder determines that the first intra prediction mode is the intra prediction mode derived from the DIMD mode for the output vector of the optimal MIP mode.

In this embodiment, in the case where the prediction mode for predicting the current block includes the optimal MIP mode and the suboptimal MIP mode, when the decoder preferentially takes the intra prediction mode derived from the DIMD mode for the prediction block of the current block as the first intra prediction mode, the texture direction of the transform set corresponding to the first intra prediction mode can fit both the texture characteristics reflected by the prediction block of the current block in the optimal MIP mode and the texture characteristics reflected by the prediction block of the current block in the suboptimal MIP mode, thereby improving the decompression performance of the current block as much as possible. When the decoder preferentially takes the intra prediction mode derived from the DIMD mode for the output vector of the optimal MIP mode as the first intra prediction mode, the output vector of the optimal MIP mode can be directly obtained during determination of the optimal MIP mode, so the texture direction of the transform set corresponding to the first intra prediction mode can fit the texture characteristics reflected by the prediction block of the current block in the optimal MIP mode on the basis of reducing the decompression complexity, thereby improving the decompression performance of the current block as much as possible.

Certainly, in other alternative embodiments, when the prediction mode for predicting the current block includes the optimal MIP mode and the suboptimal MIP mode, the decoder can determine the intra prediction mode derived from the DIMD mode for the reconstructed samples in the first template region or the intra prediction mode derived from the TIMD mode as the first intra prediction mode, which is not limited in the present disclosure.

In some embodiments, when the prediction mode for predicting the current block includes the optimal MIP mode and the intra prediction mode derived from the TIMD mode, the decoder determines the first intra prediction mode to be the intra prediction mode derived from the DIMD mode for the prediction block of the current block, or the decoder determines the first intra prediction mode to be the intra prediction mode derived from the TIMD mode.

In other words, when a second intra prediction mode is the intra prediction mode derived from the TIMD mode, the decoder determines that the first intra prediction mode is the intra prediction mode derived from the DIMD mode for the prediction block of the current block, or the decoder determines that the first intra prediction mode is the intra prediction mode derived from the TIMD mode.

In this embodiment, in the case where the second intra prediction mode includes the intra prediction mode derived from the TIMD mode, when the decoder preferentially takes the intra prediction mode derived from the DIMD mode for the prediction block of the current block as the first intra prediction mode, the texture direction of the transform set corresponding to the first intra prediction mode can fit both the texture characteristics reflected by the prediction block of the current block in the optimal MIP mode and the texture characteristics reflected by the prediction block of the current block in the intra prediction mode derived from the TIMD mode, thereby improving the decompression performance of the current block as much as possible. When the decoder preferentially takes the intra prediction mode derived from the TIMD mode as the first intra prediction mode, the second intra prediction mode can be directly determined as the first intra prediction mode, so the texture direction of the transform set corresponding to the first intra prediction mode can fit the texture characteristics reflected by the prediction block of the current block in the optimal MIP mode on the basis of reducing the decompression complexity, thereby improving the decompression performance of the current block as much as possible.

Certainly, in other alternative embodiments, when the second intra prediction mode is the intra prediction mode derived from the TIMD mode, the decoder can determine that the intra prediction mode derived from the DIMD mode for the output vector of the optimal MIP mode or the intra prediction mode derived from the DIMD mode for the reconstructed samples in the first template region is the first intra prediction mode, which is not limited in the present disclosure.

In some embodiments, when the prediction mode for predicting the current block includes the optimal MIP mode and the intra prediction mode derived from the DIMD mode for the reconstructed samples in the first template region, the decoder determines the first intra prediction mode to be the intra prediction mode derived from the DIMD mode for the prediction block of the current block, or the decoder determines the first intra prediction mode to be the intra prediction mode derived from the DIMD mode for the reconstructed samples in the first template region.

In other words, when the second intra prediction mode is the intra prediction mode derived from the DIMD mode, the decoder determines that the first intra prediction mode is the intra prediction mode derived from the DIMD mode for the prediction block of the current block, or the decoder determines that the first intra prediction mode is the intra prediction mode derived from the DIMD mode for the reconstructed samples in the first template region.

In this embodiment, in the case where the second intra prediction mode includes the intra prediction mode derived from the DIMD mode for the reconstructed samples in the first template region, the decoder preferentially takes the intra prediction mode derived from the DIMD mode for the prediction block of the current block as the first intra prediction mode, the texture direction of the transform set corresponding to the first intra prediction mode can fit both the texture characteristics reflected by the prediction block of the current block in the optimal MIP mode and the texture characteristics reflected by the prediction block of the current block in the intra prediction mode derived from the DIMD mode, thereby improving the decompression performance of the current block as much as possible. When the decoder preferentially takes the intra prediction mode derived from the DIMD mode for the reconstructed samples in the first template region as the first intra prediction mode, the second intra prediction mode can be directly determined as the first intra prediction mode, so the texture direction of the transform set corresponding to the first intra prediction mode can fit the texture characteristics reflected by the prediction block of the current block in the optimal MIP mode on the basis of reducing the decompression complexity, thereby improving the decompression performance of the current block as much as possible.

Certainly, in other alternative embodiments, when the second intra prediction mode is the intra prediction mode derived from the DIMD mode for the reconstructed samples in the first template region, the decoder can determine that the intra prediction mode derived from the DIMD mode for the output vector of the optimal MIP mode or the intra prediction mode derived from the TIMD mode is the first intra prediction mode, which is not limited in the present disclosure.

In some embodiments, the method 300 can further include the following. The second intra prediction mode is determined, where the second intra prediction mode includes any one of: the suboptimal MIP mode for predicting the current block, the intra prediction mode derived from the DIMD mode for the reconstructed samples in the first template region, and the intra prediction mode derived from the TIMD mode. The current block is predicted in the optimal MIP mode and in the second intra prediction mode, to obtain the prediction block of the current block.

Exemplarily, a process in which the decoder predicts the current block based on the optimal MIP mode and the determined second intra prediction mode) can also be referred to as "template matching MIP (TMMIP) technology", "TMMIP-based prediction mode derivation method", or "TMMIP fusion enhancement technology". In other words, after the residual block of the current block is obtained by the decoder, the decoder can achieve performance enhancement on a process of predicting the current block based on the derived optimal MIP mode and the derived second intra prediction mode. Alternatively, the TMMIP technology can achieve performance enhancement on a process of predicting the current block in the optimal MIP prediction mode and in at least one of: the suboptimal MIP prediction mode, the intra prediction mode derived from the TIMD mode, or the intra prediction mode derived from the DIMD mode for the reconstructed samples in the first template region adjacent to the current block.

In this embodiment, the decoder operates as follows. The current block is predicted in the optimal MIP mode and in the second intra prediction mode. The optimal MIP mode is designed to be an optimal MIP mode, determined based on distortion costs of multiple MIP modes, for predicting the current block. The second intra prediction mode is designed to include at least one of: a suboptimal MIP mode, determined based on the distortion costs of the multiple MIP modes, for predicting the current block, the intra prediction mode derived from the DIMD mode for the reconstructed samples in the first template region adjacent to the current block, or the intra prediction mode derived from the TIMD mode. In this way, the decoder can obtain the MIP modes without parsing the bitstream. Compared with traditional MIP technologies, in the present disclosure, bit overhead at a CU level can be effectively reduced, thereby improving the decompression efficiency of the current block.

Specifically, the MIP mode needs more bit overhead than other intra prediction modes. The MIP mode not only needs a flag to indicate whether the MIP mode is used, but also needs a flag to indicate whether the MIP mode is transposed. In addition, the MIP mode also needs to use TB encoding to indicate an index of the MIP mode, which needs the largest overhead. The MIP mode is a technology simplified from the neural network and is quite different from the traditional interpolation filtering prediction technology. For some special textures, the MIP mode works better than the traditional intra prediction mode, but the MIP mode has a deficiency of requiring relatively large flag overhead. For example, for a 4×4-sized CU, there are 16 prediction modes in the MIP mode, but the MIP mode requires bit overhead on one MIP mode usage flag, one MIP mode transpose flag, and a TB flag of five or six bits. Therefore, in the present disclosure, the decoder autonomously determines the optimal MIP mode for predicting the current block, and determines the intra prediction mode for the current block in the optimal MIP mode, which can save up to five or six bits of overhead and effectively reduces bit overhead at the CU level, thereby improving decompression efficiency.

In addition, a prerequisite for saving up to five or six bits of overhead per CU is that a template matching-based prediction mode derivation algorithm is accurate enough. If the template matching-based prediction mode derivation algorithm has low accuracy, the MIP mode derived at the decoding end will be different from that derived at the encoding end, which will reduce the coding performance. In other words, the coding performance depends on the accuracy of the template matching-based prediction mode derivation algorithm.

However, neither the template-based derivation algorithm in the traditional intra prediction mode nor the template matching-based derivation algorithm in the inter prediction mode has an unsatisfactory accuracy. Although the bit overhead can be saved and the compression efficiency can be improved, with an increase in the number of prediction modes of the template matching-based prediction mode derivation algorithm, additional bit overheads at the CU level, which are brought by the template matching-based prediction mode derivation algorithm, are not enough to enable subsequent technologies to improve the compression efficiency simply by using the template matching-based prediction mode derivation algorithm. Therefore, the template matching-based prediction mode derivation algorithm needs to improve the coding performance on the basis of improving the compression efficiency. As a possible implementation, on the basis of saving the bit overheads at the CU level, different novel prediction blocks can be introduced to ensure prediction diversity and selection diversity, thereby improving the coding performance. Therefore, by fusing the optimal MIP mode and the second intra prediction mode, i.e., fusion prediction is performed on the current block in the optimal MIP mode and in the second intra prediction mode, an optimal prediction mode obtained based on rate-distortion costs will not be completely replaced by the optimal MIP mode, thereby balancing prediction accuracy and prediction diversity and improving the decompression performance.

In particular, with the TMMIP technology, the current block is predicted in combination of the optimal MIP mode and the second intra prediction mode, and prediction blocks obtained by predicting the current block in different prediction modes may have different texture characteristics. Therefore, if the TMMIP technology is selected for the current block, it means that the optimal MIP mode can cause the prediction block of the current block to have one texture characteristic, while the second intra prediction mode can cause the prediction block of the current block to have another texture characteristic. In other words, after the current block is predicted, from a statistical point of view, the residual block of the current block will also have two texture characteristics, that is to say, the residual block of the current block does not necessarily conform to a law that can be reflected by a certain prediction mode. In this case, for the TMMIP technology, when the first intra prediction mode is the intra prediction mode derived from the DIMD mode for the prediction block of the current block, the texture direction of the transform set corresponding to the first intra prediction mode can fit both the texture characteristics reflected by the prediction block of the current block in the optimal MIP mode and the texture characteristics reflected by the prediction block of the current block in the second intra prediction mode, thereby improving the decompression performance of the current block. Further, when the first intra prediction mode is the intra prediction mode derived from the DIMD mode for the reconstructed samples in the first template region or the intra prediction mode derived from the TIMD mode, the first intra prediction mode can be determined directly during determination of the second intra prediction mode, so the texture direction of the transform set corresponding to the first intra prediction mode can fit both the texture characteristics reflected by the prediction block of the current block in the optimal MIP mode and the texture characteristics reflected by the prediction block of the current block in the second intra prediction mode on the basis of reducing the decompression complexity, thereby improving the decompression efficiency.

In some embodiments, the decoder first predicts the current block in the optimal MIP mode, to obtain a first prediction block. Then, the decoder predicts the current block in the second intra prediction mode, to obtain a second prediction block. Finally, the decoder weights the first prediction block and the second prediction block based on a weight of the optimal MIP mode and a weight of the second intra prediction mode, to obtain the prediction block of the current block.

In some embodiments, before weighting the first prediction block and the second prediction block based on the weight of the optimal MIP mode and the weight of the second intra prediction mode, to obtain the prediction block of the current block, the method 300 further includes the following. When the prediction mode for predicting the current block includes the optimal MIP mode as well as the suboptimal MIP mode for predicting the current block or the intra prediction mode derived from the TIMD mode, the weight of the optimal MIP mode and the weight of the second intra prediction mode are determined based on a distortion cost of the optimal MIP mode and a distortion cost of the second intra prediction mode. When the prediction mode for predicting the current block includes the optimal MIP mode and the intra prediction mode derived from the DIMD mode for the reconstructed samples in the first template region, both the weight of the optimal MIP mode and the weight of the second intra prediction mode are determined to be preset values.

In some embodiments, the decoder predicts the current block in the optimal MIP mode, to obtain the first prediction block. Then, the decoder predicts the current block in the second intra prediction mode, to obtain the second prediction block. Finally, the decoder weights the first prediction block and the second prediction block based on the weight of the optimal MIP mode and the weight of the second intra prediction mode, to obtain the prediction block of the current block.

Exemplarily, the decoder can directly perform intra prediction on the current block based on the optimal MIP mode to obtain the first prediction block. In addition, the decoder can directly obtain an optimal prediction mode and a suboptimal prediction mode based on the TIMD mode, and predict the current block to obtain the second prediction block. For example, if neither the optimal prediction mode nor the suboptimal prediction mode is a DC mode (which can also be referred to as "mean mode") or a planar mode (which can also be referred to as "plane mode"), and a distortion cost of the suboptimal prediction mode is less than twice a distortion cost of the optimal prediction mode, prediction blocks need to be fused. In other words, firstly, the decoder can perform intra prediction on the current block in the optimal prediction mode to obtain an optimal prediction block. Secondly, the decoder can perform intra prediction on the current block in the suboptimal prediction mode to obtain a suboptimal prediction block. Thirdly, a weighted value of the optimal prediction block and a weighted value of the suboptimal prediction block are obtained with the ratio of the distortion cost of the optimal prediction mode to the distortion cost of the suboptimal prediction mode. Finally, weighted fusion is performed on the optimal prediction block and the suboptimal prediction block to obtain the second prediction block. For another example, if the optimal prediction mode or the suboptimal prediction mode is the planar mode or the DC mode, or if the distortion cost of the suboptimal prediction mode is greater than twice the distortion cost of the optimal prediction mode, the prediction blocks do not need to be fused, i.e., the optimal prediction block obtained in the optimal prediction mode can be directly taken as the second prediction block. After the decoder obtains the first prediction block and the second prediction block, the decoder weights the first prediction block and the second prediction block to obtain the prediction block of the current block.

In some embodiments, when the prediction mode for predicting the current block includes the optimal MIP mode as well as the suboptimal MIP mode for predicting the current block or the intra prediction mode derived from the TIMD mode, the decoder determines the weight of the optimal MIP mode and the weight of the second intra prediction mode based on the distortion cost of the optimal MIP mode and the distortion cost of the second intra prediction mode. When the prediction mode for predicting the current block includes the optimal MIP mode and the intra prediction mode derived from the DIMD mode for the reconstructed samples in the first template region, the decoder determines that both the weight of the optimal MIP mode and the weight of the second intra prediction mode are preset values.

In some embodiments, the operations at S320 can include the following. The decoder parses the bitstream of the current sequence to obtain a first flag. When the first flag indicates that the optimal MIP mode and the second intra prediction mode are allowed to be used for predicting a picture block in the current sequence, the decoder determines the optimal MIP mode based on the distortion costs of the multiple MIP modes.

Exemplarily, if a value of the first flag is a first value, the first flag indicates that the optimal MIP mode and the second intra prediction mode are allowed to be used for predicting the picture block in the current sequence. If the value of the first flag is a second value, the first flag indicates that the optimal MIP mode and the second intra prediction mode are not allowed to be used for predicting the picture block in the current sequence. In an implementation, the first value is 1 and the second value is 0. In another implementation, the first value is 0 and the second value is 1. Certainly, the first value and the second value can also be other values, which is not limited in the present disclosure.

Exemplarily, if the first flag is true, the first flag indicates that the optimal MIP mode and the second intra prediction mode are allowed to be used for predicting the picture block in the current sequence. If the first flag is false, the first flag indicates that the optimal MIP mode and the second intra prediction mode are not allowed to be used for predicting the picture block in the current sequence.

Exemplarily, the decoder parses a block-level flag. If the intra prediction mode is used for the current block, the decoder parses or obtains the first flag. If the first flag is true, the decoder determines the optimal MIP mode based on the distortion costs of the multiple MIP modes.

Exemplarily, the first flag is denoted as sps_timd_enable_flag. In this case, the decoder parses or obtains sps_timd_enable_flag. If sps_timd_enable_flag is true, the decoder determines the optimal MIP mode based on the distortion costs of the multiple MIP modes.

Exemplarily, the first flag is a sequence-level flag.

It is noted that the first flag indicating that the optimal MIP mode and the second intra prediction mode are allowed to be used for predicting the picture block in the current sequence can also be replaced with descriptions having a similar or identical meaning. For example, in other alternative embodiments, the first flag indicating that the optimal MIP mode and the second intra prediction mode are allowed to be used for predicting the picture block in the current sequence can also be replaced with any one of: the first flag indicating that the TMMIP technology is allowed to be used for determining an intra prediction mode for the picture block in the current sequence, the first flag indicating that the TMMIP technology is allowed to be used for performing intra prediction on the picture block in the current sequence, the first flag indicating that the TMMIP technology is allowed to be used for the picture block in the current sequence, or the first flag indicating that an MIP mode determined based on the multiple MIP modes is allowed to be used for predicting the picture block in the current sequence.

In addition, in other alternative embodiments, when the TMMIP technology is combined with another technology, an enable flag of another technology can indirectly indicate whether the TMMIP technology is enabled for the current sequence. Taking the TIMD technology as an example, when the first flag indicates that the TIMD technology is enabled for the current sequence, it is indicated that the TMMIP technology is also enabled for the current sequence. Alternatively, when the first flag indicates that the TIMD technology is enabled for the current sequence, it is indicated that both the TIMD technology and the TMMIP technology are enabled for the current sequence, thereby further reducing bit overhead.

In some embodiments, when the first flag indicates that the optimal MIP mode and the second intra prediction mode are allowed to be used for predicting the picture block in the current sequence, the decoder parses the bitstream to obtain a second flag. When the second flag indicates that the optimal MIP mode and the second intra prediction mode are allowed to be used for predicting the current block, the decoder determines the optimal MIP mode based on the distortion costs of the multiple MIP modes.

Exemplarily, the decoder parses the block-level flag. If the intra prediction mode is used for the current block, the decoder parses or obtains the first flag. If the first flag is true, the decoder parses or obtains the second flag. If the second flag is true, the decoder determines the optimal MIP mode based on the distortion costs of the multiple MIP modes.

Exemplarily, if a value of the second flag is a third value, the second flag indicates that the optimal MIP mode and the second intra prediction mode are allowed to be used for predicting the current block. If the value of the second flag is a fourth value, the second flag indicates that the optimal MIP mode and the second intra prediction mode are not allowed to be used for predicting the current block. In an implementation, the third value is 1 and the fourth value is 0. In another implementation, the third value is 0 and the fourth value is 1. Certainly, the third value and the fourth value can also be other values, which are not limited in the present disclosure.

Exemplarily, if the second flag is true, the second flag indicates that the optimal MIP mode and the second intra prediction mode are allowed to be used for predicting the current block. If the second flag is false, the second flag indicates that the optimal MIP mode and the second intra prediction mode are not allowed to be used for predicting the current block.

Exemplarily, the first flag is noted as sps_timd_enable_flag, and the second flag is denoted as cu_timd_enable_flag. In this case, the decoder parses or obtains sps_timd_enable_flagt. If sps_timd_enable_flag is true, the decoder parses or obtains cu_timd_enable_flag. If cu_timd_enable_flag is true, the decoder determines the optimal MIP mode based on the distortion costs of the multiple MIP modes.

Exemplarily, the second flag is a block-level flag or a CU-level flag.

It is noted that the second flag indicating that the optimal MIP mode and the second intra prediction mode are allowed to be used for predicting the current block can also be replaced with descriptions having a similar or identical meaning. For example, in other alternative embodiments, the second flag indicating that the optimal MIP mode and the second intra prediction mode are allowed to be used for predicting the current block can also be replaced with any one of: the second flag indicating that the TMMIP technology is allowed to be used for determining an intra prediction mode for the current block, the second flag indicating that the TMMIP technology is allowed to be used for performing intra prediction on the current block, the second flag indicating that the TMMIP technology is allowed to be used for the picture block of the current block, or the second flag indicating that an MIP mode determined based on the multiple MIP modes is allowed to be used for predicting the current block.

In addition, in other alternative embodiments, when the TMMIP technology is combined with another technology, the enable flag of another technology can indirectly indicate whether the TMMIP technology is enabled for the current block. Taking the TIMD technology as an example, when the second flag indicates that the TIMD technology is enabled for the current block, it is indicated that the TMMIP technology is also enabled for the current block. Alternatively, when the second flag indicates that the TIMD technology is enabled for the current block, it is indicated that both the TIMD technology and the TMMIP technology are enabled for the current block, thereby further reducing the bit overhead.

Furthermore, the decoding end can parse the second flag either before parsing the residual block of the current block or after parsing the residual block of the current block, which is not limited in the present disclosure.

In some embodiments, the method 300 can further include the following. The decoder determines the optimal MIP mode based on the distortion costs of the multiple MIP modes, where the distortion costs of the multiple MIP modes include distortion costs obtained by predicting samples in a second template region adjacent to the current block in the multiple MIP modes.

Exemplarily, before the decoder determines, based on the distortion costs of the multiple MIP modes, the optimal MIP mode for predicting the current block, the decoder calculates a distortion cost of each of the multiple MIP modes and sorts the multiple MIP modes according to the distortion cost of each of the multiple MIP modes, and an MIP mode with the minimum cost is an optimal prediction result.

It is worth noting that in the present disclosure, the distortion cost involved in the decoder is different from the rate-distortion cost (RDcost) involved in the encoder. The rate-distortion cost is a distortion cost used at the encoding end for determining a particular intra prediction technology among multiple intra prediction technologies, and the rate-distortion cost can be a cost obtained by comparing a distorted picture with an original picture. Since the decoder is unable to acquire the original picture, the distortion cost involved in the decoder can be a distortion cost between the reconstructed sample and the predicted sample, such as an SATD cost between the reconstructed sample and the predicted sample or other costs for calculating a difference between the reconstructed sample and the predicted sample.

Certainly, in other alternative embodiments, the decoder first determines an arrangement order of the multiple MIP modes based on the distortion costs of the multiple MIP modes. Then, the decoder determines a coding manner used for the optimal MIP mode based on the arrangement order of the multiple MIP modes. Finally, the decoder decodes the bitstream of the current sequence based on the coding manner used for the optimal MIP mode, to obtain an index of the optimal MIP mode.

For example, a codeword length of a coding manner used for each of first n MIP modes in the arrangement order is less than a codeword length of a coding manner used for each of MIP modes following the n-th MIP mode in the arrangement order. Additionally/Alternatively, variable-length coding is used for the first n MIP modes, and TB encoding is used for the MIP modes following the n-th MIP mode. Exemplarily, N can be any value greater than or equal to 1. It can be noted that for the traditional MIP technologies, an index of the MIP mode is usually binarized by TB which is similar to equal probability coding, i.e., each prediction mode is divided into two segments, where one segment is indicated by N code words, and the other one is indicated by N+1 code words. Therefore, in the present disclosure, before the decoder determines, based on the distortion costs of the multiple MIP modes, the optimal MIP mode for predicting the current block, the decoder can calculate the distortion cost of each of the multiple MIP modes and sort the multiple MIP modes based on the distortion cost of each of the multiple MIP modes. Ultimately, the decoder can choose to use more flexible variable-length coding based on the arrangement order of the multiple MIP modes. Compared with the equal probability coding, the bit overhead of the index of the MIP mode can be saved by flexibly setting the coding manner of the MIP mode.

For another example, the arrangement order is an order obtained by the decoder arranging the multiple MIP modes in ascending order of the corresponding distortion costs. When a distortion cost of an MIP mode is smaller, a probability that the encoder performs intra prediction on the current block in this MIP mode will be higher. Therefore, the codeword length of the coding manner used for each of first n MIP modes in the arrangement order is designed to be less than the codeword length of the coding manner used for each of MIP modes following the n-th MIP mode in the arrangement order. Additionally/Alternatively, the variable-length coding is designed to be used for the first n MIP modes, and the TB encoding is designed to be used for the MIP modes following the n-th MIP mode. In this way, a shorter codeword length or the variable-length coding is used for an MIP mode which is more likely to be used by the encoder, thereby reducing bit overhead of the index of the MIP mode and improving the decompression performance.

In some embodiments, the method 300 can further include the following. When the second intra prediction mode is the suboptimal MIP mode, the decoder determines, based on a distortion cost of the optimal MIP mode and a distortion cost of the suboptimal MIP mode, whether the suboptimal MIP mode is used for predicting the current block. Based on a determination that the suboptimal MIP mode is not used, the decoder can directly predict the current block based on the optimal MIP mode. Based on a determination that the suboptimal MIP mode is used, the decoder can predict the current block in the optimal MIP mode and in the suboptimal MIP mode, to obtain the prediction block of the current block.

When the second intra prediction mode is the suboptimal MIP mode, if a ratio of the distortion cost of the optimal MIP mode to the distortion cost of the suboptimal MIP mode is less than or equal to a preset ratio, the decoder can directly predict the current block in the optimal MIP mode to obtain the prediction block of the current block. Alternatively, when the second intra prediction mode is the suboptimal MIP mode, if a ratio of the distortion cost of the suboptimal MIP mode to the distortion cost of the optimal MIP mode is greater than or equal to a preset ratio, the decoder can directly predict the current block in the optimal MIP mode to obtain the prediction block of the current block. For example, if the distortion cost of the suboptimal MIP mode is greater than or equal to a multiple (e.g., twice) of the distortion cost of the optimal MIP mode, it can be understood that the suboptimal MIP mode has a larger distortion and is not suitable for the current block, i.e., the current block can be predicted in the optimal MIP mode without using a fusion enhancement technology.

In this embodiment, the decoder determines, based on the distortion cost of the optimal MIP mode and the distortion cost of the suboptimal MIP mode, whether the suboptimal MIP mode is used for predicting the current block. In other words, the decoder determines, based on the distortion cost of the optimal MIP mode and the distortion cost of the suboptimal MIP mode, whether the suboptimal MIP mode is used to enhance the performance of the optimal MIP mode.

In this way, a flag for determining whether the suboptimal MIP mode is used to enhance the performance of the optimal MIP mode is not carried in the bitstream, thereby saving the bit overhead and improving the decompression performance.

In some embodiments, the second template region is the same as or different from the first template region.

Exemplarily, a size of the second template region can be preset according to the size of the current block. For example, in the second template region, a width of a region adjacent to the top of the current block is equal to a width of the current block, and a height of the region adjacent to the top of the current block is equal to a height of at least one row of samples. For another example, in the second template region, a height of a region adjacent to the left of the current block is equal to a height of the current block, and a width of the region adjacent to the left of the current block is equal to a width of two columns of samples. Certainly, in other alternative embodiments, the size of the second template region can also be implemented as other sizes, which is not limited in the present disclosure.

In some embodiments, the method 300 can further include the following. The decoder predicts the samples in the second template region based on a third flag and the multiple MIP modes to obtain distortion costs of the multiple MIP modes in each state of the third flag, where the third flag indicates whether an input vector and an output vector corresponding to an MIP mode are transposed. The decoder determines the optimal MIP mode based on the distortion costs of the multiple MIP modes in each state of the third flag.

Exemplarily, before the decoder determines the optimal MIP mode based on the distortion costs of the multiple MIP modes, the decoder predicts the samples in the second template region based on the third flag and the multiple MIP modes to obtain the distortion costs of the multiple MIP modes in each state of the third flag.

As mentioned above, the traditional MIP technologies need more bit overhead than other intra prediction tools. The traditional MIP technologies not only need a flag to indicate whether the MIP technology is used, but also need a flag to indicate whether the MIP is transposed. In addition, the traditional MIP technologies also need TB encoding to indicate the MIP prediction mode, which needs the largest overhead. The MIP technology is simplified from neural network and is quite different from the traditional interpolation filtering prediction technology. For some special textures, the MIP prediction mode works better than the traditional intra prediction mode, but has a deficiency of requiring relatively large flag overhead. For example, for the 4×4-sized CU, there are 16 predicted samples in total, but it requires bit overhead including one MIP usage flag, one MIP transpose flag, and a TB flag of five or six bits. Therefore, in the present disclosure, in determining the optimal MIP mode, a transpose function of the MIP mode is considered by traversing each state of the third flag, which can save overheads of one MIP transpose flag, thereby improving the decompression efficiency.

Exemplarily, the decoder determines the distortion costs of the multiple MIP modes in each state of the third flag by traversing each state of the third flag and the multiple MIP modes, and then determines the optimal MIP mode based on the distortion costs of the multiple MIP modes in each state of the third flag. Alternatively, the decoder determines the distortion costs, in each state of the third flag, corresponding to the multiple MIP modes by traversing each state of the third flag and the multiple MIP modes, and then determines the optimal MIP mode based on the distortion costs, in each state of the third flag, corresponding to the multiple MIP modes. In other words, the decoding end can first traverse the multiple MIP modes or can first traverse the states of the third flag.

Exemplarily, if a value of the third flag is a fifth value, the third flag indicates that the input vector and the output vector corresponding to the MIP mode are transposed. If the value of the third flag is a sixth value, the third flag indicates that the input vector and the output vector corresponding to the MIP mode are not transposed. In this case, each state of the third flag can be replaced with each value of the third flag. In an implementation, the fifth value is 1 and the sixth value is 0. In another implementation, the fifth value is 0 and the sixth value is 1. Certainly, the fifth value and the sixth value can also be other values, which is not limited in the present disclosure.

Exemplarily, if the third flag is true, the third flag indicates that the input vector and the output vector corresponding to the MIP mode are transposed. If the third flag is false, the third flag indicates that the input vector and the output vector corresponding to the MIP mode are not transposed. In this case, the third flag being true or false is a state of the third flag.

Exemplarily, the third flag is a sequence-level flag, a block-level flag, or a CU-level flag.

Exemplarily, the third flag can also be referred to as "transpose message", "transpose flag", or "MIP transpose flag".

It is noted that the third flag indicating whether the input vector and the output vector corresponding to the MIP mode are transposed can also be replaced with descriptions having a similar or identical meaning. For example, in other alternative embodiments, the third flag indicates whether an input and an output corresponding to the MIP mode are transposed, the third flag indicates whether the input vector and the output vector corresponding to the MIP mode are transposed vectors, or the third flag indicates whether to transpose.

In some embodiments, the method 300 can further include the following. When a size of the current block is a preset size, the decoder determines the optimal MIP mode based on the distortion costs of the multiple MIP modes.

Exemplarily, the preset size can be a size of a preset width and a preset height. In other words, if the current block has the preset width and the preset height, the decoder determines the optimal MIP mode based on the distortion costs of the multiple MIP modes.

Exemplarily, the preset size can be implemented by pre-saving corresponding codes, tables, or other means that can indicate relevant information in a device (e.g., including the decoder and the encoder), and the specific implementation is not limited in the present disclosure. For example, the preset size can refer to a size defined in protocols. Optionally, the "protocols" can refer to standard protocols in the field of coding technology. For example, the "protocols" can include relevant protocols such as a VCC, an ECM protocol, etc.

Certainly, in other alternative embodiments, the decoder can also determine, based on the preset size in other manners, whether to determine the optimal MIP mode based on the distortion costs of the multiple MIP modes, which is not limited in the present disclosure.

For example, the decoder can determine, only based on the width or the height of the current block, whether to determine the optimal MIP mode based on the distortion costs of the multiple MIP modes. In an implementation, if the width of the current block is the preset width or the height of the current block is the preset height, the decoder determines the optimal MIP mode based on the distortion costs of the multiple MIP modes. For another example, the decoder can determine whether to determine the optimal MIP mode based on the distortion costs of the multiple MIP modes by comparing the size of the current block with the preset size. In an implementation, if the size of the current block is greater or less than the preset size, the decoder determines the optimal MIP mode based on the distortion costs of the multiple MIP modes. In another implementation, if the width of the current block is greater or less than the preset width, the decoder determines the optimal MIP mode based on the distortion costs of the multiple MIP modes. In another implementation, if the height of the current block is greater or less than the preset height, the decoder determines the optimal MIP mode based on the distortion costs of the multiple MIP modes.

In some embodiments, the method 300 can further include the following. When a frame containing the current block is an I-frame and the size of the current block is the preset size, the decoder determines the optimal MIP mode based on the distortion costs of the multiple MIP modes.

Exemplarily, if the frame containing the current block is the I-frame, the width of the current block is the preset width, and the height of the current block is the preset height, the decoder determines the optimal MIP mode based on the distortion costs of the multiple MIP modes. In other words, only when the frame containing the current block is the I-frame, the decoder determines, based on the size of the current block, whether to determine the optimal MIP mode based on the distortion costs of the multiple MIP modes.

In some embodiments, the method 300 can further include the following. When the frame containing the current block is a B-frame, the decoder determines the optimal MIP mode based on the distortion costs of the multiple MIP modes.

Exemplarily, if the frame containing the current block is the B-frame, the decoder can directly determine the optimal MIP mode based on the distortion costs of the multiple MIP modes. In other words, when the frame containing the current block is the B-frame, regardless of the size of the current block, the decoder can directly determine the optimal MIP mode directly based on the distortion costs of the multiple MIP modes.

In some embodiments, before the operations at S320, the method 300 can further include the following. The decoder obtains MIP modes used for a neighbouring block adjacent to the current block. The decoder determines the MIP modes used for the neighbouring block as the multiple MIP modes.

Exemplarily, the neighbouring block can be a picture block adjacent to at least one of the top, the left, the bottom left, the top right, or the top left of the current block. For example, the decoder can determine a picture block obtained in an order of the top, the left, the bottom left, the top right, and the top left of the current block as the neighbouring block. Optionally, the multiple MIP modes can be used for constructing available MIP modes or a list of the available MIP modes, which are determined by the decoder and used for predicting the current block, so that the decoder determines the optimal MIP mode among the available MIP modes or from the list of available MIP modes by predicting the samples in the second template region.

In some embodiments, the method 300 can further include the following. The decoder performs reconstructed-sample padding on a reference region adjacent to the second template region to obtain a reference row and a reference column of the second template region. The decoder predicts the samples in the second template region in the multiple MIP modes respectively with the reference row and the reference column as inputs to obtain multiple prediction blocks corresponding to the multiple MIP modes. The decoder determines the distortion costs of the multiple MIP modes based on the multiple prediction blocks and a reconstructed block of the second template region.

Exemplarily, before the decoder determines the optimal MIP mode based on the distortion costs of the multiple MIP modes, the decoder performs reconstructed-sample padding on the reference region adjacent to the second template region.

Exemplarily, a width of a region in the reference region adjacent to the top of the second template region is equal to a width of the second template region, and a height of a region in the reference region adjacent to the left of the second template region is equal to the height of the second template region. If the width of the region in the reference region adjacent to the top of the second template region is greater than the width of the second template region, the decoder can perform down-sampling or dimensionality reduction on the region in the reference region adjacent to the top of the second template region, to obtain the reference row. If the height of the region in the reference region adjacent to the left of the second template region is greater than the height of the second template region, the decoder can perform down-sampling or dimensionality reduction on the region in the reference region adjacent to the left of the second template region, to obtain the reference column.

Exemplarily, the second template region can be the second template region used for the TIMD mode, and the reference region can be the reference of template used for the TIMD mode. For example, in connection with FIG. 5, if the current block is a CU with a width equal to M and a height equal to N, the decoder performs reconstructed-sample padding on the reference region consisting of a CU with a width equal to 2(M+L1)+1 and a height equal to 2(N+L2)+1, down-samples or performs dimensionality reduction on the padded reference region to obtain the reference row and the reference column, and then constructs input vectors corresponding to the MIP modes based on the reference row and the reference column.

Exemplarily, after the reference row and the reference column are obtained by the decoder, the decoder predicts the samples in the second template region in the multiple MIP modes respectively with the reference row and the reference column as the inputs, to obtain the multiple prediction blocks corresponding to the multiple MIP modes. In other words, based on the reconstructed samples in the reference of template of the current block, the decoder predicts samples in the second template region of the current block by traversing the multiple MIP modes. Taking a currently traversed MIP mode as an example, the decoder takes the reference row, the reference column, an index of the currently traversed MIP mode, and the third flag as inputs to obtain a prediction block corresponding to the currently traversed MIP mode. The reference row and the reference column are used for constructing an input vector corresponding to the currently traversed MIP mode. The index of the currently traversed MIP mode is used for determining a matrix and/or a bias vector corresponding to the currently traversed MIP mode. The third flag indicates whether the input vector and the output vector corresponding to the MIP mode are transposed. For example, if the third flag indicates the input vector and the output vector corresponding to the MIP mode are not transposed, the reference column is placed at the end of the reference row to form the input vector corresponding to the currently traversed MIP mode. If the third flag indicates the input vector and the output vector corresponding to the MIP mode are transposed, the reference row is placed at the end of the reference column to form the input vector corresponding to the currently traversed MIP mode. Correspondingly, if the third flag indicates the input vector and the output vector corresponding to the MIP mode are transposed, the decoder transposes the output of the currently traversed MIP mode to obtain a prediction block of the second template region. After the decoder obtains the multiple prediction blocks corresponding to the multiple MIP modes by traversing the multiple MIP modes, the decoder can select, based on distortion costs between the multiple prediction blocks and the reconstructed samples in the second template region, an MIP mode with a minimum cost according to the principle of the minimum distortion cost, and determine the MIP mode with the minimum cost as the optimal MIP mode for the current block in a template matching-based MIP mode.

In some embodiments, when the decoder predicts the samples in the second template region in the multiple MIP modes respectively, the decoder firstly down-samples the reference row and the reference column to obtain an input vector. Then, the decoder predicts the samples in the second template region by traversing the multiple MIP modes with the input vector as an input, to obtain output vectors corresponding to the multiple MIP modes. Finally, the decoder up-samples the output vectors corresponding to the multiple MIP modes to obtain the prediction blocks corresponding to the multiple MIP modes.

Exemplarily, the reference row and the reference column satisfy input conditions for the multiple MIP modes. If the reference row and the reference column do not satisfy the input conditions for the multiple MIP modes, the reference row and/or the reference column can be first processed as input samples that satisfy the input conditions for the multiple MIP modes, and then input vectors corresponding to the multiple MIP modes can be determined based on the input samples that satisfy the input conditions for the multiple MIP modes. For illustrative purposes, the input condition is a specified number of input samples. If the reference row and the reference column do not satisfy the number of input samples for the MIP modes, the decoder can dimensionality-reduce the reference row and/or the reference column to the specified number of input samples by means of Haar-downsampling or other manners, and then determine the input vectors corresponding to the multiple MIP modes based on the dimensionality-reduced specified number of input samples.

In some embodiments, the operations at S320 can include the following. The decoder determines the optimal MIP mode based on SATDs corresponding to the multiple MIP modes for the second template region.

In this embodiment, when the decoder determines the optimal MIP mode based on the distortion costs of the multiple MIP modes for the second template region, the distortion costs of the multiple MIP modes are designed to be the SATDs corresponding to the multiple MIP modes. In this way, compared with directly calculating rate-distortion costs corresponding to the multiple MIP modes, the optimal MIP mode can be determined based on the distortion costs of the multiple MIP modes for the second template region, and the complexity of calculating the distortion costs of the multiple MIP modes can be simplified, thereby improving the decompression performance.

In conclusion, in the solutions provided in the present disclosure, fusion enhancement is proposed based on the optimal MIP mode. In other words, the decoder not only needs to determine the optimal MIP mode for predicting the current block, but also needs to fuse another prediction block to achieve different prediction effects. In this way, the bit overhead can be saved, and a new prediction technology can be created. In addition, for the fusion, since the optimal MIP mode cannot completely replace an optimal prediction mode obtained by the encoder based on the rate-distortion costs, the fusion is adopted to balance prediction accuracy and prediction diversity.

Exemplarily, a main idea of the template matching-based MIP mode derivation method for the decoder can include the following parts.

Firstly, the reference region (e.g., the reference of template illustrated in FIG. 5) is padded with reconstructed samples, where the reconstructed samples are reference reconstructed samples needed for predicting the samples in the second template region (e.g., the template illustrated in FIG. 5). Optionally, the width and the height of the reference region do not need to exceed the width and the height of the second template region. If the width and the height of the reference region padded with samples are larger than the width and the height of the second template region, dimensionality reduction needs to be performed by means of down-sampling or other manners, so as to satisfy the requirement for an input dimension of MIP.

Then, the decoder predicts the samples in the second template region with the reference reconstructed samples in the reference region, the indexes of the multiple MIP modes, and the MIP transpose flag as inputs, to obtain the prediction blocks corresponding to the multiple MIP modes. Optionally, the reference reconstructed samples in the reference region need to satisfy the input conditions for the multiple MIP modes. For example, dimensionality reduction can be performed on the reference reconstructed samples to the specified number of input samples by means of Haar-downsampling or other manners. The indexes of the multiple MIP modes are used for determining matrix indexes of the MIP technologies, to obtain MIP prediction matrix coefficients. The MIP transpose flag indicates whether the input and the output need to be transposed.

Next, for the prediction blocks corresponding to the multiple MIP modes, combinations of all the MIP modes and whether to transpose the MIP can be traversed, to obtain the predicted samples in the second template region for each of the multiple MIP modes and in each state of the MIP transpose flag. The distortions between the predicted samples and the reconstructed samples in the second template region are calculated and cost information thereof is recorded. Finally, the MIP mode with the minimum cost and corresponding MIP transpose information can be obtained according to the principle of the minimum distortion, and the MIP mode with the minimum cost is the optimal MIP mode for the current block in the template matching-based MIP mode.

Finally, the decoder predicts the current block in the optimal MIP prediction mode and in the second intra prediction mode respectively, to obtain the first prediction block and the second prediction block, and weights the first prediction block and the second prediction block according to the weight of the optimal MIP prediction mode and the weight of the second intra prediction mode, to obtain the prediction block of the current block.

It can be noted that some of the calculations involved in the present disclosure can be replaced by lookup tables and shifts. Although the lookup tables can have some errors in results compared with division, hardware can be easily implemented and the coding cost can be controlled. For example, these calculations involve calculations on the distortion costs or calculations on determining the optimal MIP mode.

The decoding method of embodiments of the present disclosure has been described in detail above from the perspective of the decoder, and an encoding method of embodiments of the present disclosure will be described below from the perspective of the encoder in connection with FIG. 10.

Figure 10:
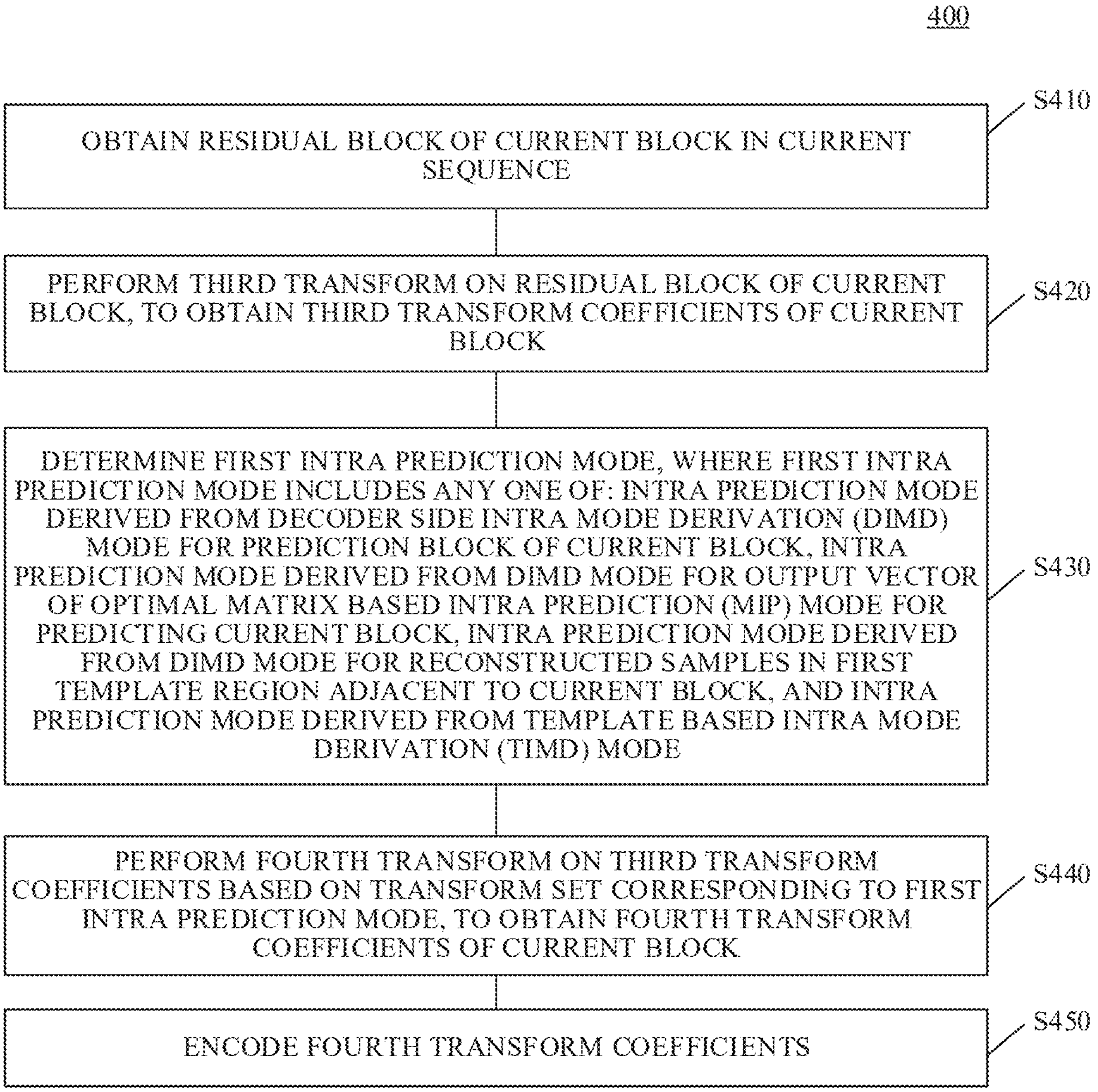
FIG. 10 is a schematic flowchart of an encoding method provided in embodiments of the present disclosure.

FIG. 10 is a schematic flowchart of an encoding method 400 provided in embodiments of the present disclosure. It can be understood that the encoding method 400 can be performed by an encoder. For example, the encoding method 400 is applicable to the encoding framework 100 illustrated in FIG. 1. For ease of description, the encoder is illustrated below as an example.

As illustrated in FIG. 10, the encoding method 400 can include the following.

S410, a residual block of a current block in a current sequence is obtained.

S420, third transform is performed on the residual block of the current block, to obtain third transform coefficients of the current block.

S430, a first intra prediction mode is determined.

The first intra prediction mode includes any one of: an intra prediction mode derived from a DIMD mode for a prediction block of the current block, an intra prediction mode derived from the DIMD mode for an output vector of an optimal MIP mode for predicting the current block, an intra prediction mode derived from the DIMD mode for reconstructed samples in a first template region adjacent to the current block, and an intra prediction mode derived from a TIMD mode.

S440, fourth transform is performed on the third transform coefficients based on a transform set corresponding to the first intra prediction mode, to obtain fourth transform coefficients of the current block.

S450, the fourth transform coefficients are encoded.

It can be understood that the first transform at the decoding end is an inverse transform of the fourth transform at the encoding end, and the second transform at the decoding end is an inverse transform of the third transform at the encoding end. For example, the third transform is the core transform or the primary transform mentioned above, and the fourth transform is the secondary transform mentioned above. Correspondingly, the first transform can be an inverse transform (or de-transform) of the secondary transform, and the second transform is an inverse transform (or de-transform) of the core transform or the primary transform. For example, the first transform can be an inverse (de) LFNST, and the second transform can be an inverse (de) DCT2, an inverse (de) DCT8, an inverse (de) DST7, etc. Correspondingly, the third transform can be DCT2, DCT8, DST7, etc., and the fourth transform can be LFNST.

In some embodiments, the output vector of the optimal MIP mode is a vector before up-sampling a vector output from the optimal MIP mode, or the output vector of the optimal MIP mode is a vector after up-sampling the vector output from the optimal MIP mode.

In some embodiments, the operations at S430 can include the following. The first intra prediction mode is determined based on a prediction mode for predicting the current block.

In some embodiments, when the prediction mode for predicting the current block includes the optimal MIP mode and a suboptimal MIP mode for predicting the current block, the first intra prediction mode is determined to be the intra prediction mode derived from the DIMD mode for the prediction block of the current block, or the first intra prediction mode is determined to be the intra prediction mode derived from the DIMD mode for the output vector of the optimal MIP mode.

In some embodiments, when the prediction mode for predicting the current block includes the optimal MIP mode and the intra prediction mode derived from the TIMD mode, the first intra prediction mode is determined to be the intra prediction mode derived from the DIMD mode for the prediction block of the current block, or the first intra prediction mode is determined to be the intra prediction mode derived from the TIMD mode.

In some embodiments, when the prediction mode for predicting the current block includes the optimal MIP mode and the intra prediction mode derived from the DIMD mode for the reconstructed samples in the first template region, the first intra prediction mode is determined to be the intra prediction mode derived from the DIMD mode for the prediction block of the current block, or the first intra prediction mode is determined to be the intra prediction mode derived from the DIMD mode for the reconstructed samples in the first template region.

In some embodiments, the second template region is the same as or different from the first template region.

In some embodiments, the operations at S410 can include the following. A second intra prediction mode is determined, where the second intra prediction mode includes any one of: the suboptimal MIP mode for predicting the current block, the intra prediction mode derived from the DIMD mode for the reconstructed samples in the first template region, and the intra prediction mode derived from the TIMD mode. The current block is predicted in the optimal MIP mode and in the second intra prediction mode, to obtain the prediction block of the current block. The residual block of the current block is obtained based on the prediction block of the current block.

In some embodiments, the current block is predicted in the optimal MIP mode, to obtain a first prediction block. The current block is predicted in the second intra prediction mode, to obtain a second prediction block. The first prediction block and the second prediction block are weighted based on a weight of the optimal MIP mode and a weight of the second intra prediction mode, to obtain the prediction block of the current block.

In some embodiments, when the prediction mode for predicting the current block includes the optimal MIP mode as well as the suboptimal MIP mode for predicting the current block or the intra prediction mode derived from the TIMD mode, the weight of the optimal MIP mode and the weight of the second intra prediction mode are determined based on a distortion cost of the optimal MIP mode and a distortion cost of the second intra prediction mode. When the prediction mode for predicting the current block includes the optimal MIP mode and the intra prediction mode derived from the DIMD mode for the reconstructed samples in the first template region, both the weight of the optimal MIP mode and the weight of the second intra prediction mode are determined to be preset values.

In some embodiments, the encoder obtains a first flag. When the first flag indicates that the optimal MIP mode and the second intra prediction mode are allowed to be used for predicting a picture block in the current sequence, the second intra prediction mode is determined. The operations at S450 can include the following. The fourth transform coefficients and the first flag are encoded.

In some embodiments, when the first flag indicates that the optimal MIP mode and the second intra prediction mode are allowed to be used for predicting the picture block in the current sequence, the current block is predicted in the optimal MIP mode and in the second intra prediction mode, to obtain a first rate-distortion cost. The current block is predicted in at least one intra prediction mode, to obtain at least one rate-distortion cost. When the first rate-distortion cost is less than or equal to a minimum of the at least one rate-distortion cost, a prediction block obtained by predicting the current block in the optimal MIP mode and in the second intra prediction mode is determined as the prediction block of the current block. The operations at S450 can include the following. The fourth transform coefficients, the first flag, and a second flag are encoded. When the first rate-distortion cost is less than or equal to the minimum of the at least one rate-distortion cost, the second flag indicates that the optimal MIP mode and the second intra prediction mode are allowed to be used for predicting the current block. When the first rate-distortion cost is greater than the minimum of the at least one rate-distortion cost, the second flag indicates that the optimal MIP mode and the second intra prediction mode are not allowed to be used for predicting the current block.

In some embodiments, the method 400 can further include the following. The optimal MIP mode is determined based on distortion costs of multiple MIP modes, where the distortion costs of the multiple MIP modes include distortion costs obtained by predicting samples in a second template region adjacent to the current block in the multiple MIP modes.

In some embodiments, the second template region is the same as or different from the first template region.

In some embodiments, the samples in the second template region are predicted based on a third flag and the multiple MIP modes, to obtain distortion costs of the multiple MIP modes in each state of the third flag, where the third flag indicates whether an input vector and an output vector corresponding to an MIP mode are transposed. The optimal MIP mode is determined based on the distortion costs of the multiple MIP modes in each state of the third flag.

In some embodiments, before the optimal MIP mode is determined based on the distortion cost of the multiple MIP modes, the method 400 can further include the following. MIP modes used for a neighbouring block adjacent to the current block are obtained. The MIP modes used for the neighbouring block are determined as the multiple MIP modes.

In some embodiments, the optimal MIP mode is determined based on the distortion cost of the multiple MIP modes, the method 400 can further include the following. Reconstructed-sample padding is performed on a reference region adjacent to the second template region, to obtain a reference row and a reference column of the second template region. The samples in the second template region are predicted in the multiple MIP modes respectively with the reference row and the reference column as inputs, to obtain multiple prediction blocks corresponding to the multiple MIP modes. The distortion costs of the multiple MIP modes are determined based on the multiple prediction blocks and a reconstructed block of the second template region.

In some embodiments, the reference row and the reference column are down-sampled to obtain an input vector. The samples in the second template region are predicted by traversing the multiple MIP modes with the input vector as an input, to obtain output vectors corresponding to the multiple MIP modes. The output vectors corresponding to the multiple MIP modes are up-sampled to obtain the prediction blocks corresponding to the multiple MIP modes.

In some embodiments, the optimal MIP mode is determined based on SATDs corresponding to the multiple MIP modes for the second template region.

It can be appreciated that the encoding method can be understood as an inverse process of the decoding method. Therefore, for the specific solutions of the encoding method 400, reference can be made to related contents of the decoding method 300, which is not repeated herein for simplicity.

The solutions of the present disclosure are described below in connection with specific embodiments.

Embodiment 1

In this embodiment, the second intra prediction mode is the suboptimal MIP mode, i.e., the encoder or the decoder can perform intra prediction on the current block in the optimal MIP mode and in the suboptimal MIP mode, to obtain the prediction block of the current block.

The encoder traverses the prediction modes. If an intra mode is used for the current block, the encoder obtains a sequence-level enable flag indicating whether a template matching-based MIP mode derivation technology is enabled for the current sequence. For example, the sequence-level enable flag can be sps_tmmip_enable_flag. If the enable flag for tmmip is true, it is indicated that the encoder enables the TMMIP technology currently.

Exemplarily, the encoder can operate as follows.

Step 1

If sps_tmmip_enable_flag is true, the encoder tries the TMMIP technology, i.e., the encoder performs Step 2. If sps_tmmip_enable_flag is false, the encoder does not try the TMMIP technology, i.e., the encoder skips Step 2 and directly performs Step 3.

Step 2

Firstly, the encoder performs reconstructed-sample padding on a row and a column both adjacent to the second template region. The padding process is the same as padding in an original intra prediction process. For example, the encoder can traverse and pad from the bottom-left corner to the top-right corner. If all of the reconstructed samples are available, padding is performed with all of the available reconstructed samples in sequence. If all of the reconstructed samples are unavailable, padding is performed with the average. If some of the reconstructed samples are available, padding is performed with the available reconstructed samples, and then for the rest of the unavailable reconstructed samples, the encoder can traverse in the order from the bottom-left corner to the top-right corner until the first available reconstructed sample appears, and then the previously unavailable position(s) is padded with the first available reconstructed sample.

Then, the encoder takes the reconstructed samples at the padded second template region as inputs and predicts the samples in the second template region in MIP modes that are allowed to be used.

Exemplarily, 16 MIP modes are available for a 4×4-sized block, 8 MIP modes are available for a block with a width or height of 4 or an 8×8-sized block, and 6 MIP modes are available for blocks with other sizes. In addition, a block of any size can have an MIP transpose function, and the TMMIP prediction mode is the same as the MIP technology.

Exemplarily, the calculation on prediction includes the following. Firstly, the encoder performs Haar-downsampling on the reconstructed samples. For example, the encoder determines a down-sampling step size based on a block size. Secondly, the encoder adjusts, according to whether to transpose, a concatenation order of the down-sampled reconstructed samples on the top and the down-sampled reconstructed samples on the left. If not transposed, the down-sampled reconstructed samples on the left are concatenated to the end of the down-sampled reconstructed samples on the top, and the obtained vector is taken as an input. If transposed, the down-sampled reconstructed samples on the top are concatenated to the end of the down-sampled reconstructed samples on the left, and the obtained vector is taken as the input. Thirdly, the encoder obtains an MIP matrix coefficient by using the traversed prediction mode as the index. The encoder obtains the output vector by calculating the MIP matrix coefficient and the input. Finally, the encoder up-samples the output vector according to the number of samples of the output vector and the size of the current template. If up-sampling is not needed, the output vector is arranged in sequence in a horizontal direction to obtain a prediction block of the template. If up-sampling is needed, the output vector is up-sampled in the horizontal direction and then is up-sampled in the vertical direction, to up-sample to the same size as that of the template, so as to output the prediction block of the second template region.

Next, the encoder calculates the distortion costs based on the reconstructed samples in the second template region and the prediction blocks of the second template region obtained by traversing each of the multiple MIP modes, and records distortion costs in each of the prediction modes and the transpose information. After all of the available prediction modes and the transpose information are traversed, the optimal MIP mode and its corresponding transpose information, as well as the suboptimal MIP mode and its corresponding transpose information, are selected according to the principle of the minimum cost. The encoder determines whether to perform fusion enhancement based on a relationship between a cost of the optimal MIP mode and a cost of the suboptimal MIP mode. If the cost of the suboptimal MIP mode is less than twice the cost of the optimal MIP mode, the fusion enhancement needs to be performed on an optimal MIP prediction block and a suboptimal MIP prediction block. If the cost of the suboptimal prediction mode is greater than or equal to twice the cost of the optimal MIP mode, the fusion enhancement is not performed.

Finally, if the fusion enhancement is performed, the encoder obtains a prediction block corresponding to the optimal MIP mode and a prediction block corresponding to the suboptimal MIP mode based on the optimal MIP mode, the suboptimal MIP mode, the transpose information of the optimal MIP mode, and the transpose information of the suboptimal MIP mode. Specifically, firstly, the encoder down-samples the reconstructed samples adjacent to the top and the left of the current block, as appropriate, performs concatenation according to the transpose information to obtain the input vector, and reads a matrix coefficient in the current mode by using the MIP mode as an index. Then, the encoder obtains the output vector by calculating the input vector and the matrix coefficient. The encoder can transpose the output according to the transpose information, and up-sample the output vector according to the size of the current block and the number of samples of the output vector to obtain an optimal MIP prediction block and a suboptimal MIP prediction block of the same size as the current block. The encoder performs weighted average on the optimal MIP prediction block and the suboptimal MIP prediction block according to a calculated weight of the optimal MIP mode and a calculated weight of the suboptimal MIP mode, to obtain a new prediction block as a final prediction block of the current block. If the fusion enhancement is not needed, the encoder can obtain the optimal MIP prediction block according to the optimal MIP mode and its transpose information, and the calculation process is the same as the previous one. Finally, the encoder takes the optimal MIP prediction block as the prediction block of the current block.

In addition, the encoder obtains a rate-distortion cost of the current block, which is denoted as cost1.

Moreover, the encoder determines that the first intra prediction mode is the intra prediction mode derived from the DIMD mode for the prediction block of the current block, or the encoder determines that the first intra prediction mode is the intra prediction mode derived from the DIMD mode for the output vector of the optimal MIP mode.

Step 3

The encoder continues to traverse other intra prediction technologies and calculates corresponding rate-distortion costs denoted as cost2, . . . , costN.

Step 4

If cost1 is a minimum rate-distortion cost, the TMMIP technology is used for the current block, and the encoder sets a TMMIP usage flag of the current block to be true and signals it into the bitstream. If cost1 is not the minimum rate-distortion cost, other intra prediction technologies are used for the current block, and the encoder sets the TMMIP usage flag of the current block to be false and signals into the bitstream. It can be understood that information such as flags or indexes for other intra prediction technologies is transmitted according to definition, which is not repeated herein.

Step 5

The encoder determines the residual block of the current block based on the prediction block of the current block and the original block of the current block, performs core transform on the residual block of the current block, performs secondary transform on transform coefficients after core transform based on the first intra prediction mode, and then performs operations such as quantization, entropy coding, loop filtering, etc., on the transform coefficients after secondary transform. It can be understood that for the specific quantization process, reference can be made to related contents of the above, which is not repeated herein for simplicity.

The related solutions of the decoder in embodiments of the present disclosure are described below.

The decoder parses a block-level flag. If an intra mode is used for the current block, the decoder parses or obtains a sequence-level enable flag for indicating whether the template matching-based MIP mode derivation technology is enabled for the current sequence. For example, the sequence-level enable flag can be sps_tmmip_enable_flag. If the enable flag for tmmip is true, it is indicated that the decoder enables the TMMIP technology currently.

Exemplarily, the decoder can operate as follows.

Step 1

If sps_tmmip_enable_flag is true, the decoder parses the TMMIP usage flag of the current block. Otherwise, in a current decoding process, the block-level TMMIP usage flag does not need to be decoded, and the block-level TMMIP usage flag is false by default. If the TMMIP usage flag of the current block is true, Step 2 is performed. Otherwise, Step 3 is performed.

Step 2

Firstly, the decoder performs reconstructed-sample padding on a row and a column both adjacent to the second template region. The padding process is the same as padding in an original intra prediction process. For example, the decoder can traverse and pad from the bottom-left corner to the top-right corner. If all of the reconstructed samples are available, padding is performed with all of the available reconstructed samples in sequence. If all of the reconstructed samples are unavailable, padding is performed with the average. If some of the reconstructed samples are available, padding is performed with the available reconstructed samples, and then for the rest of the unavailable reconstructed samples, the decoder can traverse in the order from the bottom-left corner to the top-right corner until the first available reconstructed sample appears, and then the previously unavailable position(s) is padded with the first available reconstructed sample.

Then, the decoder takes the reconstructed samples at the padded second template region as inputs and predicts the samples in the second template region in MIP modes that are allowed to be used.

Exemplarily, 16 MIP modes are available for a 4×4-sized block, 8 MIP modes are available for a block with a width or height of 4 or an 8×8-sized block, and 6 MIP modes are available for a block with other sizes. In addition, a block of any size can have an MIP transpose function, and the TMMIP prediction mode is the same as the MIP technology.

Exemplarily, the calculation on prediction includes the following. Firstly, the decoder performs Haar-downsampling on the reconstructed samples. For example, the decoder determines a down-sampling step size based on a block size. Secondly, the decoder adjusts, according to whether to transpose, a concatenation order of the down-sampled reconstructed samples on the top and the down-sampled reconstructed samples on the left. If not transposed, the down-sampled reconstructed samples on the left are concatenated to the end of the down-sampled reconstructed samples on the top, and the obtained vector is taken as an input. If transposed, the down-sampled reconstructed samples on the top are concatenated to the end of the down-sampled reconstructed samples on the left, and the obtained vector is taken as the input. Thirdly, the decoder obtains an MIP matrix coefficient by using the traversed prediction mode as the index. The decoder obtains the output vector based on the MIP matrix coefficient and the input. Finally, the decoder up-samples the output vector according to the number of samples of the output vector and the size of the current template. If up-sampling is not needed, the output vector is arranged in sequence in a horizontal direction to obtain a prediction block of the template. If up-sampling is needed, the output vector is up-sampled in the horizontal direction and then is down-sampled in a vertical direction, to up-sample to the same size as that of the template, so as to output the prediction block of the second template region.

Next, the decoder calculates the distortion costs based on the reconstructed samples in the second template region and the prediction blocks of the second template region obtained by traversing each of the multiple MIP modes, and records distortion costs in each of the prediction modes and the transpose information. After all of the available prediction modes and the transpose information are traversed, the optimal MIP mode and its corresponding transpose information, as well as the suboptimal MIP mode and its corresponding transpose information, are selected according to the principle of the minimum cost. The decoder determines whether to perform fusion enhancement based on a relationship between a cost of the optimal MIP mode and a cost of the suboptimal MIP mode. If the cost of the suboptimal MIP mode is less than twice the cost of the optimal MIP mode, the fusion enhancement needs to be performed on an optimal MIP prediction block and a suboptimal MIP prediction block. If the cost of the suboptimal prediction mode is greater than or equal to twice the cost of the optimal MIP mode, the fusion enhancement is not performed.

Finally, if the fusion enhancement is performed, the decoder obtains a prediction block corresponding to the optimal MIP mode and a prediction block corresponding to the suboptimal MIP mode based on the optimal MIP mode, the suboptimal MIP mode, the transpose information of the optimal MIP mode, and the transpose information of the suboptimal MIP mode. Specifically, firstly, the decoder down-samples the reconstructed samples adjacent to the top and the left of the current block, as appropriate, performs concatenation according to the transpose information to obtain the input vector, and reads a matrix coefficient corresponding to the current mode by using the MIP mode as an index. Then, the decoder obtains the output vector by calculating the input vector and the matrix coefficient. The decoder can transpose the output according to the transpose information, and up-sample the output vector according to the size of the current block and the number of samples of the output vector to obtain an optimal MIP prediction block and a suboptimal MIP prediction block of the same size as the current block. The decoder performs weighted average on the optimal MIP prediction block and the suboptimal MIP prediction block according to a calculated weight of the optimal MIP mode and a calculated weight of the suboptimal MIP mode, to obtain a new prediction block as a final prediction block of the current block. If the fusion enhancement is not needed, the decoder can obtain the optimal MIP prediction block according to the optimal MIP mode and its transpose information, and the calculation process is the same as the previous one. Finally, the decoder takes the optimal MIP prediction block as the prediction block of the current block.

In addition, the decoder determines that the first intra prediction mode is the intra prediction mode derived from the DIMD mode for the prediction block of the current block, or the decoder determines that the first intra prediction mode is the intra prediction mode derived from the DIMD mode for the output vector of the optimal MIP mode.

Step 3

The decoder continues to parse information such as the usage flags or the indexes for other intra prediction technologies and obtains the final prediction block of the current block according to the parsed information.

Step 4

The decoder parses the bitstream and obtains a frequency-domain residual block (also referred to as "frequency-domain residual information") of the current block, and performs inverse quantization and inverse transform (performs inverse transform of the secondary transform based on the first intra prediction mode and then performs inverse transform of the core transform and the primary transform) on the frequency-domain residual block of the current block, to obtain the residual block of the current block (also referred to as "temporal residual block" or "temporal residual information"). Then, the decoder adds the prediction block of the current block to the residual block of the current block to obtain a reconstructed sample block.

Step 5

After all of the reconstructed sample blocks in the current picture are processed by loop filtering or other technologies, a final reconstructed picture is obtained.

Optionally, the reconstructed picture can be implemented as a video output or as a reference for subsequent decoding.

In this embodiment, a size of the second template region used by the encoder or the decoder in the TMMIP technology can be preset according to the size of the current block. For example, in the second template region, a width of a region adjacent to the top of the current block is equal to a width of the current block, and a height of the region adjacent to the top of the current block is equal to a height of two rows of samples. In the second template region, a height of a region adjacent to the left of the current block is equal to a height of the current block, and a width of the region adjacent to the left of the current block is equal to a width of two columns of samples. Certainly, in other alternative embodiments, the size of the second template region can also be implemented as other sizes, which is not limited in the present disclosure.

In this embodiment, the TMMIP technology is used.

Embodiment 2

In this embodiment, the second intra prediction mode is the intra prediction mode derived from the TIMD mode, i.e., the encoder or the decoder can perform intra prediction on the current block in the optimal MIP mode and in the intra prediction mode derived from the TIMD mode to obtain the prediction block of the current block.

In other words, a template matching-based MIP mode derivation fusion enhancement technology can not only fuse two derived MIP prediction blocks, but also fuse with prediction blocks generated via other template matching-based derivation technologies. In the present disclosure, the TMMIP technology is fused with the TIMD technology to obtain a method for fusing a derived traditional prediction block with a matrix-based prediction block. The TIMD technology utilizes template matching to derive an optimal traditional intra prediction mode at an encoding end and a decoding end, and the TIMD technology can also perform offset expansion on the prediction mode to obtain an updated intra prediction mode. The TMMIP technology also utilizes the idea of template matching to derive the optimal MIP mode at the encoding end and the decoding end. A fusion of the optimal traditional intra prediction mode and the optimal MIP mode can take into account the directionality of the traditional prediction block and the unique texture characteristics of the MIP prediction, thereby generating a completely new prediction block and improving the coding efficiency.

The encoder traverses the prediction modes. If the intra mode is used for the current block, the encoder obtains the sequence-level enable flag indicating whether the template matching-based MIP mode derivation technology is enabled for the current sequence. For example, the sequence-level enable flag can be sps_tmmip_enable_flag. If the enable flag for tmmip is true, it is indicated that the encoder enables the TMMIP technology currently.

Exemplarily, the encoder can operate as follows.

Step 1

If sps_tmmip_enable_flag is true, the encoder tries the TMMIP technology, i.e., the encoder performs Step 2. If sps_tmmip_enable_flag is false, the encoder does not try the TMMIP technology, i.e., the encoder skips Step 2 and directly performs Step 3.

Step 2

Firstly, the encoder performs reconstructed-sample padding on the row and the column both adjacent to the second template region. The padding process is the same as padding in an original intra prediction process. For example, the encoder can traverse and pad from the bottom-left corner to the top-right corner. If all of the reconstructed samples are available, padding is performed with all of the available reconstructed samples. If all of the reconstructed samples are unavailable, padding is performed with the average. If some of the reconstructed samples are available, padding is performed with the available reconstructed samples, and then for the rest of the unavailable reconstructed samples, the encoder can traverse in the order from the bottom-left corner to the top-right corner until the first available reconstructed sample appears, and then the previously unavailable position(s) is padded with the first available reconstructed sample.

Then, the encoder takes the reconstructed samples at the padded second template region as inputs and predicts the samples in the second template region in MIP modes that are allowed to be used.

Exemplarily, 16 MIP modes are available for a 4×4-sized block, 8 MIP modes are available for a block with a width or height of 4 or an 8×8-sized block, and 6 MIP modes are available for a block with other sizes. In addition, a block of any size can have an MIP transpose function, and the TMMIP prediction mode is the same as the MIP technology.

Exemplarily, the calculation on prediction includes the following. Firstly, the encoder performs Haar-downsampling on the reconstructed samples. For example, the encoder determines a down-sampling step size based on a block size. Secondly, the encoder adjusts, according to whether to transpose, a concatenation order of the down-sampled reconstructed samples on the top and the down-sampled reconstructed samples on the left. If not transposed, the down-sampled reconstructed samples on the left are concatenated to the end of the down-sampled reconstructed samples on the top, and the obtained vector is taken as an input. If transposed, the down-sampled reconstructed samples on the top are concatenated to the end of the down-sampled reconstructed samples on the left, and the obtained vector is taken as the input. Thirdly, the encoder obtains an MIP matrix coefficient by using the traversed prediction mode as the index. The encoder obtains the output vector based on the MIP matrix coefficient and the input. Finally, the encoder up-samples the output vector according to the number of samples of the output vector and the size of the current template. If up-sampling is not needed, the output vector is arranged in sequence in a horizontal direction to obtain a prediction block of the template. If up-sampling is needed, the output vector is up-sampled in the horizontal direction and then is up-sampled in a vertical direction, to up-sample to the same size as that of the template, so as to output the prediction block of the second template region.

In addition, the encoder needs to try a TIMD template matching calculation process, obtain different interpolation filters according to indexes of different prediction modes, and obtain predicted samples in the template by interpolating the reference samples.

Next, the encoder calculates the distortion costs based on the reconstructed samples in the second template region and the predicted samples in the second template region obtained by traversing each of the multiple MIP modes, and records distortion costs in each of the prediction modes and the transpose information. In addition, based on the distortion costs in each of the prediction modes and the transpose information, the optimal MIP mode and its corresponding transpose information are selected according to the principle of the minimum cost. Furthermore, the encoder needs to traverse all of the intra prediction modes allowed in the TIMD to calculate the predicted samples in the template, obtain the distortion costs based on the predicted samples in the template and the reconstructed samples in the template, and record the optimal prediction mode and the suboptimal prediction mode which are derived from the TIMD, the distortion cost of the optimal prediction mode, and the distortion cost of the suboptimal prediction mode according to the principle of the minimum cost.

Finally, the encoder down-samples, according to the obtained optimal MIP mode and the transpose information, the reconstructed samples adjacent to the top and the left of the current block, as appropriate, performs concatenation according to the transpose information to obtain the input vector, and reads a matrix coefficient corresponding to the current mode by using the MIP mode as an index. Then, the encoder obtains the output vector by calculating the input vector and the matrix coefficient. The encoder can transpose the output according to the transpose information, and up-sample the output vector according to the size of the current block and the number of samples of the output vector to obtain an output of the same size as the current block as the optimal MIP prediction block of the current block.

For the optimal prediction mode and the suboptimal prediction mode which are derived from the TIMD technology, if neither the optimal prediction mode nor the suboptimal prediction mode is a DC mode or a planar mode, and a distortion cost of the suboptimal prediction mode is less than twice a distortion cost of the optimal prediction mode, the encoder needs to fuse the prediction blocks. In other words, firstly, the encoder obtains interpolation filtering coefficients according to the optimal prediction mode, and performs interpolation filtering on the reconstructed samples adjacent to the top and left of the current block to obtain the predicted samples at all positions in the current block, which is denoted as the optimal prediction block. Secondly, the encoder obtains interpolation filtering coefficients according to the suboptimal prediction mode, and performs interpolation filtering on the reconstructed samples adjacent to the top and left of the current block to obtain the predicted samples at all positions in the current block, which is denoted as the suboptimal prediction block. Thirdly, the encoder obtains a weighted value of the optimal prediction block and a weighted value of the suboptimal prediction block based on the ratio of the distortion cost of the optimal prediction mode to the distortion cost of the suboptimal prediction mode. Finally, the encoder performs weighted fusion on the optimal prediction block and the suboptimal prediction block to obtain the prediction block of the current block as an output. If the optimal prediction mode or the suboptimal prediction mode is the DC mode or the planar mode, or if the distortion cost of the suboptimal prediction mode is greater than twice the distortion cost of the optimal prediction mode, the encoder does not need to fuse the prediction blocks, but only determines the optimal prediction block obtained by performing interpolation filtering on the reconstructed samples adjacent to the top and left of the current block in the optimal prediction mode as the optimal TIMD prediction block of the current block.

Finally, the encoder performs weighted average on the optimal MIP prediction block and the optimal TIMD prediction block based on the calculated weight of the optimal MIP mode and the calculated weight of the prediction mode derived from the TIMD technology, to obtain a new prediction block which is the prediction block of the current block.

In addition, the encoder obtains the rate-distortion cost corresponding to the current block, which is denoted as cost1.

Moreover, the encoder determines that the first intra prediction mode is the intra prediction mode derived from the DIMD mode for the prediction block of the current block, or the encoder determines that the first intra prediction mode is the intra prediction mode derived from the TIMD mode.

It can be noted that since the template region in the TIMD technology and the second template region (i.e., the template region in the TMMIP technology) can be set the same, i.e., the region for calculating the distortion cost is the same, the cost information of the template region in the TIMD technology and the cost information of the template region in the TMMIP technology can be equivalent and at the same comparison level. In this case, whether to perform fusion enhancement can also be determined based on the cost information, which is not limited in the present disclosure.

Step 3

The encoder continues to traverse other intra prediction technologies and calculates corresponding rate-distortion costs denoted as cost2, . . . , costN.

Step 4

If cost1 is a minimum rate-distortion cost, the TMMIP technology is used for the current block, and the encoder sets a TMMIP usage flag of the current block to be true and signals it into the bitstream. If cost1 is not the minimum rate-distortion cost, other intra prediction technologies are used for the current block, and the encoder sets the TMMIP usage flag of the current block to be false and signals it into the bitstream. It can be understood that information such as flags or indexes for other intra prediction technologies is transmitted according to definition, which is not repeated herein.

Step 5

The encoder determines the residual block of the current block based on the prediction block of the current block and the original block of the current block, performs core transform on the residual block of the current block, performs secondary transform on transform coefficients after core transform based on the first intra prediction mode, and then performs operations such as quantization, entropy coding, loop filtering, etc., on the transform coefficients after secondary transform. It can be understood that for the specific quantization process, reference can be made to related contents of the above, which is not repeated herein for simplicity.

The related solutions of the decoder in embodiments of the present disclosure are described below.

The decoder parses a block-level flag. If an intra mode is used for the current block, the decoder parses or obtains a sequence-level enable flag for indicating whether the template matching-based MIP mode derivation technology is enabled for the current sequence. For example, the sequence-level enable flag can be sps_tmmip_enable_flag. If the enable flag for tmmip is true, it is indicated that the decoder enables the TMMIP technology currently.

Exemplarily, the decoder can operate as follows.

Step 1

If sps_tmmip_enable_flag is true, the decoder parses the TMMIP usage flag of the current block. Otherwise, in a current decoding process, the block-level TMMIP usage flag does not need to be decoded, and the block-level TMMIP usage flag is false by default. If the TMMIP usage flag of the current block is true, Step 2 is performed. Otherwise, Step 3 is performed.

Step 2

Firstly, the decoder performs reconstructed-sample padding on a row and a column both adjacent to the second template region. The padding process is the same as padding in an original intra prediction process. For example, the decoder can traverse and pad from the bottom-left corner to the top-right corner. If all of the reconstructed samples are available, padding is performed with all of the available reconstructed samples in sequence. If all of the reconstructed samples are unavailable, padding is performed with the average. If some of the reconstructed samples are available, padding is performed with the available reconstructed samples, and then for the rest of the unavailable reconstructed samples, the decoder can traverse in the order from the bottom-left corner to the top-right corner until the first available reconstructed sample appears, and then the previously unavailable position(s) is padded with the first available reconstructed sample.

Then, the decoder takes the reconstructed samples at the padded second template region as inputs and predicts the samples in the second template region in MIP modes that are allowed to be used.

Exemplarily, 16 MIP modes are available for a 4×4-sized block, 8 MIP modes are available for a block with a width or height of 4 or an 8×8-sized block, and 6 MIP modes are available for a block with other sizes. In addition, a block of any size can have an MIP transpose function, and the TMMIP prediction mode is the same as the MIP technology.

Exemplarily, the calculation on prediction includes the following. Firstly, the decoder performs Haar-downsampling on the reconstructed samples. For example, the decoder determines a down-sampling step size based on a block size. Secondly, the decoder adjusts, according to whether to transpose, a concatenation order of the down-sampled reconstructed samples on the top and the down-sampled reconstructed samples on the left. If not transposed, the down-sampled reconstructed samples on the left are concatenated to the end of the down-sampled reconstructed samples on the top, and the obtained vector is taken as an input. If transposed, the down-sampled reconstructed samples on the top are concatenated to the end of the down-sampled reconstructed samples on the left, and the obtained vector is taken as the input. Thirdly, the decoder obtains an MIP matrix coefficient by using the traversed prediction mode as the index. The decoder obtains the output vector based on the MIP matrix coefficient and the input. Finally, the decoder up-samples the output vector according to the number of samples of the output vector and the size of the current template. If up-sampling is not needed, the output vector is arranged in sequence in a horizontal direction to obtain a prediction block of the template. If up-sampling is needed, the output vector is up-sampled in the horizontal direction and then is up-sampled in a vertical direction, to up-sample to the same size as that of the template, so as to output the prediction block of the second template region.

In addition, the decoder needs to try the TIMD template matching calculation process, obtain different interpolation filters according to indexes of different prediction modes, and obtain predicted samples in the template by interpolating the reference samples.

Next, the decoder calculates the distortion costs based on the reconstructed samples in the second template region and the predicted samples in the second template region obtained by traversing each of the multiple MIP modes, and records distortion costs in each of the prediction modes and the transpose information. In addition, based on the distortion costs in each of the prediction modes and the transpose information, the optimal MIP mode and its corresponding transpose information are selected according to the principle of the minimum cost. Furthermore, the decoder needs to traverse all of the intra prediction modes allowed in the TIMD to calculate the predicted samples in the template, obtain the distortion costs based on the predicted samples in the template and the reconstructed samples in the template, and record the optimal prediction mode and the suboptimal prediction mode which are derived from the TIMD, the distortion cost of the optimal prediction mode, and the distortion cost of the suboptimal prediction mode according to the principle of the minimum cost.

Finally, the decoder down-samples, according to the obtained optimal MIP mode and the transpose information, the reconstructed samples adjacent to the top and the left of the current block, as appropriate, performs concatenation according to the transpose information to obtain the input vector, and reads a matrix coefficient corresponding to the current mode by using the MIP mode as an index. Then, the decoder obtains the output vector by calculating the input vector and the matrix coefficient. The decoder can transpose the output according to the transpose information, and up-sample the output vector according to the size of the current block and the number of samples of the output vector to obtain an output of the same size as the current block as the optimal MIP prediction block of the current block.

For the optimal prediction mode and the suboptimal prediction mode which are derived from the TIMD technology, if neither the optimal prediction mode nor the suboptimal prediction mode is a DC mode or a planar mode, and a distortion cost of the suboptimal prediction mode is less than twice a distortion cost of the optimal prediction mode, the decoder needs to fuse the prediction blocks. In other words, firstly, the decoder obtains interpolation filtering coefficients according to the optimal prediction mode, and performs interpolation filtering on the reconstructed samples adjacent to the top and left of the current block to obtain the predicted samples at all positions in the current block, which is denoted as the optimal prediction block. Secondly, the decoder obtains interpolation filtering coefficients according to the suboptimal prediction mode, and performs interpolation filtering on the reconstructed samples adjacent to the top and left of the current block to obtain the predicted samples at all positions in the current block, which is denoted as the suboptimal prediction block. Thirdly, the decoder obtains a weighted value of the optimal prediction block and a weighted value of the suboptimal prediction block based on the ratio of the distortion cost of the optimal prediction mode to the distortion cost of the suboptimal prediction mode. Finally, the decoder performs weighted fusion on the optimal prediction block and the suboptimal prediction block to obtain the prediction block of the current block as an output. If the optimal prediction mode or the suboptimal prediction mode is the DC mode or the planar mode, or if the distortion cost of the suboptimal prediction mode is greater than twice the distortion cost of the optimal prediction mode, the decoder does not need to fuse the prediction blocks, but only determines the optimal prediction block obtained by performing interpolation filtering on the reconstructed samples adjacent to the top and left of the current block in the optimal prediction mode as the optimal TIMD prediction block of the current block.

Finally, the decoder performs weighted average on the optimal MIP prediction block and the optimal TIMD prediction block based on the calculated weight of the optimal MIP mode and the calculated weight of the prediction mode derived from the TIMD technology, to obtain a new prediction block which is the prediction block of the current block.

In addition, the decoder determines that the first intra prediction mode is the intra prediction mode derived from the DIMD mode for the prediction block of the current block, or the decoder determines that the first intra prediction mode is the intra prediction mode derived from the TIMD mode.

Step 3

The decoder continues to parse information such as the usage flags or the indexes for other intra prediction technologies and obtains the final prediction block of the current block according to the parsed information.

Step 4

The decoder parses the bitstream and obtains a frequency-domain residual block (also referred to as "frequency-domain residual information") of the current block, and performs inverse quantization and inverse transform (performs inverse transform of the secondary transform based on the first intra prediction mode and then performs inverse transform of the core transform and the primary transform) on the frequency-domain residual block of the current block, to obtain the residual block of the current block (also referred to as "temporal residual block" or "temporal residual information"). Then, the decoder adds the prediction block of the current block to the residual block of the current block to obtain a reconstructed sample block.

Step 5

After all of the reconstructed sample blocks in the current picture are processed by loop filtering or other technologies, a final reconstructed picture is obtained.

Optionally, the reconstructed picture can be implemented as a video output or as a reference for subsequent decoding.

In this embodiment, for a calculation process of weights for performing weighted fusion on the TIMD prediction block, reference can be made to descriptions of the TIMD technical introduction, which is not repeated herein for simplicity. In addition, the encoder or the decoder can determine whether fusion enhancement is used in the optimal prediction mode derived from TIMD. For example, if the optimal prediction mode derived from TIMD is the DC mode or the planar mode, the encoder or the decoder may not use fusion enhancement, i.e., only the prediction block generated in the optimal MIP mode derived from the TIMD technology is used as the prediction block of the current block. In addition, the size of the second template region used by the encoder or the decoder in the TMMIP technology can be preset according to the size of the current block. For example, the definition of the second template region in the TMMIP technology can be consistent with or different from the definition of the template region in the TIMD technology. For example, if the width of the current block is less than or equal to 8, the height of the region adjacent to the top of the current block in the second template region is equal to the height of two rows of samples. Otherwise, the height is equal to a height of four rows of samples. Similarly, if the height of the current block is less than or equal to 8, the width of the region adjacent to the left of the current block in the second template region is equal to a width of two columns of samples. Otherwise, the width is equal to a width of four columns of samples.

Embodiment 3

In this embodiment, the second intra prediction mode is the intra prediction mode derived from the DIMD mode, i.e., the encoder or the decoder can perform intra prediction on the current block in the optimal MIP mode and in the intra prediction mode derived from the DIMD mode for the reconstructed samples in the first template region adjacent to the current block, to obtain the prediction block of the current block.

Similar to Embodiment 2, the TMMIP technology can be fused with the DIMD technology for enhancement.

It can be noted that although a prediction mode derived from the DIMD technology and a prediction mode derived from the TIMD technology are traditional intra prediction modes, the two prediction modes obtained are not necessarily the same due to different derivation methods. In addition, the fusion enhancement between the TMMIP technology and the DIMD technology can be performed in a different way from that between the TMMIP technology and the TIMD technology. For example, since the size of the second template region is generally the same for both the TMMIP technology and the TIMD technology, the calculated cost information is basically an SATD, which is also referred to as "distortion cost based on the Hadamard transform". Therefore, for the TMMIP technology and the TIMD technology, fusion weights can be calculated directly based on the cost information. However, the second template region in the DIMD technology is generally not the same size as that of the TMMIP technology (or the TIMD technology) and the criterion for DIMD derivation prediction mode is based on the gradient amplitude value, while the gradient amplitude value is not directly equivalent to the SATD cost. Therefore, the weights cannot be calculated simply by referring to the solutions for fusing the TMMIP technology and the TIMD technology.

The encoder traverses the prediction modes. If the intra mode is used for the current block, the encoder obtains the sequence-level enable flag indicating whether the template matching-based MIP mode derivation technology is enabled for the current sequence. For example, the sequence-level enable flag can be sps_tmmip_enable_flag. If the enable flag for tmmip is true, it is indicated that the encoder enables the TMMIP technology currently.

Exemplarily, the encoder can operate as follows.

Step 1

If sps_tmmip_enable_flag is true, the encoder tries the TMMIP technology, i.e., the encoder performs Step 2. If sps_tmmip_enable_flag is false, the encoder does not try the TMMIP technology, i.e., the encoder skips Step 2 and directly performs Step 3.

Step 2

Firstly, the encoder performs reconstructed-sample padding on the row and the column both adjacent to the second template region. The padding process is the same as padding in an original intra prediction process. For example, the encoder can traverse and pad from the bottom-left corner to the top-right corner. If all of the reconstructed samples are available, padding is performed with all of the available reconstructed samples in sequence. If all of the reconstructed samples are unavailable, padding is performed with the average. If some of the reconstructed samples are available, padding is performed with the available reconstructed samples, and then for the rest of the unavailable reconstructed samples, the encoder can traverse in the order from the bottom-left corner to the top-right corner until the first available reconstructed sample appears, and then the previously unavailable position(s) is padded with the first available reconstructed sample.

Then, the encoder takes the reconstructed samples at the padded second template region as inputs and predicts the samples in the second template region in MIP modes that are allowed to be used.

Exemplarily, 16 MIP modes are available for a 4×4-sized block, 8 MIP modes are available for a block with a width or height of 4 or an 8×8-sized block, and 6 MIP modes are available for a block with other sizes. In addition, a block of any size can have an MIP transpose function, and the TMMIP prediction mode is the same as the MIP technology.

Exemplarily, the calculation on prediction includes the following. Firstly, the encoder performs Haar-downsampling on the reconstructed samples. For example, the encoder determines a down-sampling step size based on a block size. Secondly, the encoder adjusts, according to whether to transpose, a concatenation order of the down-sampled reconstructed samples on the top and the down-sampled reconstructed samples on the left. If not transposed, the down-sampled reconstructed samples on the left are concatenated to the end of the down-sampled reconstructed samples on the top, and the obtained vector is taken as an input. If transposed, the down-sampled reconstructed samples on the top are concatenated to the end of the down-sampled reconstructed samples on the left, and the obtained vector is taken as the input. Thirdly, the encoder obtains an MIP matrix coefficient by using the traversed prediction mode as the index. The encoder obtains the output vector based on the MIP matrix coefficient and the input. Finally, the encoder up-samples the output vector according to the number of samples of the output vector and the size of the current template. If up-sampling is not needed, the output vector is arranged in sequence in a horizontal direction to obtain a prediction block of the template. If up-sampling is needed, the output vector is up-sampled in the horizontal direction and then is up-sampled in a vertical direction, to up-sample to the same size as that of the template, so as to output the prediction block of the second template region.

In addition, the encoder utilizes the DIMD technology to derive the optimal intra prediction mode, i.e., the optimal DIMD mode. The DIMD technology calculates the gradient value of the reconstructed samples in the first template region based on the Sobel operator, and then converts the gradient value according to angular values corresponding to different prediction modes, to obtain amplitude values corresponding to the prediction modes.

Next, the encoder obtains the distortion cost based on the prediction block of the template obtained by traversing each of the multiple MIP modes and the reconstructed samples in the template, and records the optimal MIP mode and the transpose information according to the principle of the minimum cost. In addition, the encoder traverses all of the intra prediction modes allowed to be used, calculates the amplitude values corresponding to the intra prediction modes, and records the optimal DIMD prediction mode according to the principle of a maximum amplitude.

Finally, the encoder down-samples, according to the obtained optimal MIP mode and the transpose information, the reconstructed samples adjacent to the top and the left of the current block, as appropriate, performs concatenation according to the transpose information to obtain the input vector, and reads a matrix coefficient corresponding to the current mode by using the MIP mode as an index. Then, the encoder obtains the output vector by calculating the input vector and the matrix coefficient. The encoder can transpose the output according to the transpose information, and up-sample the output vector according to the size of the current block and the number of samples of the output vector to obtain an output of the same size as the current block as the optimal MIP prediction block of the current block. In addition, for the optimal DIMD prediction mode, the encoder obtains interpolation filtering coefficients corresponding to the optimal DIMD prediction mode, and performs interpolation filtering on the reconstructed samples adjacent to the top and left of the current block to obtain the predicted samples at all positions in the current block, which is denoted as the optimal DIMD prediction block. The encoder performs weighted average on each of the predicted samples in the optimal MIP prediction block and the optimal DIMD prediction block according to a preset weight(s), to obtain a new prediction block as the prediction block of the current block.

In addition, the encoder obtains the rate-distortion cost corresponding to the current block, which is denoted as cost1.

Moreover, the encoder determines that the first intra prediction mode is the intra prediction mode derived from the DIMD mode for the prediction block of the current block, or the encoder determines that the first intra prediction mode is the intra prediction mode derived from the DIMD mode for the reconstructed samples in the first template region.

Step 3

The encoder continues to traverse other intra prediction technologies and calculates corresponding rate-distortion costs denoted as cost2, . . . , costN.

Step 4

If cost1 is a minimum rate-distortion cost, the TMMIP technology is used for the current block, and the encoder sets a TMMIP usage flag of the current block to be true and signals it into the bitstream. If cost1 is not the minimum rate-distortion cost, other intra prediction technologies are used for the current block, and the encoder sets the TMMIP usage flag of the current block to be false and signals it into the bitstream. It can be understood that information such as flags or indexes for other intra prediction technologies is transmitted according to definition, which is not repeated herein.

Step 5

The encoder determines the residual block of the current block based on the prediction block of the current block and the original block of the current block, performs core transform on the residual block of the current block, performs secondary transform on transform coefficients after core transform based on the first intra prediction mode, and then performs operations such as quantization, entropy coding, loop filtering, etc., on the transform coefficients after secondary transform. It can be understood that for the specific quantization process, reference can be made to related contents of the above, which is not repeated herein for simplicity.

The related solutions of the decoder in embodiments of the present disclosure are described below.

The decoder parses a block-level flag. If an intra mode is used for the current block, the decoder parses or obtains a sequence-level enable flag for indicating whether the template matching-based MIP mode derivation technology is enabled for the current sequence. For example, the sequence-level enable flag can be sps_tmmip_enable_flag. If the enable flag for tmmip is true, it is indicated that the decoder enables the TMMIP technology currently.

Exemplarily, the decoder can operate as follows.

Step 1

If sps_tmmip_enable_flag is true, the decoder parses the TMMIP usage flag of the current block. Otherwise, in a current decoding process, the block-level TMMIP usage flag does not need to be decoded, and the block-level TMMIP usage flag is false by default. If the TMMIP usage flag of the current block is true, Step 2 is performed. Otherwise, Step 3 is performed.

Step 2

Firstly, the decoder performs reconstructed-sample padding on a row and a column both adjacent to the second template region. The padding process is the same as padding in an original intra prediction process. For example, the decoder can traverse and pad from the bottom-left corner to the top-right corner. If all of the reconstructed samples are available, padding is performed with all of the available reconstructed samples in sequence. If all of the reconstructed samples are unavailable, padding is performed with the average. If some of the reconstructed samples are available, padding is performed with the available reconstructed samples, and then for the rest of the unavailable reconstructed samples, the decoder can traverse in the order from the bottom-left corner to the top-right corner until the first available reconstructed sample appears, and the previously unavailable position(s) is padded with the first available reconstructed sample.

Then, the decoder takes the reconstructed samples at the padded second template region as inputs and predicts the samples in the second template region in MIP modes that are allowed to be used.

Exemplarily, 16 MIP modes are available for a 4×4-sized block, 8 MIP modes are available for a block with a width or height of 4 or an 8×8-sized block, and 6 MIP modes are available for a block with other sizes. In addition, a block of any size can have an MIP transpose function, and the TMMIP prediction mode is the same as the MIP technology.

Exemplarily, the calculation on prediction includes the following. Firstly, the decoder performs Haar-downsampling on the reconstructed samples. For example, the decoder determines a down-sampling step size based on a block size. Secondly, the decoder adjusts, according to whether to transpose, a concatenation order of the down-sampled reconstructed samples on the top and the down-sampled reconstructed samples on the left. If not transposed, the down-sampled reconstructed samples on the left are concatenated to the end of the down-sampled reconstructed samples on the top, and the obtained vector is taken as an input. If transposed, the down-sampled reconstructed samples on the top are concatenated to the end of the down-sampled reconstructed samples on the left, and the obtained vector is taken as the input. Thirdly, the decoder obtains an MIP matrix coefficient by using the traversed prediction mode as the index. The decoder obtains the output vector based on the MIP matrix coefficient and the input. Finally, the decoder up-samples the output vector according to the number of samples of the output vector and the size of the current template. If up-sampling is not needed, the output vectors are arranged in sequence in a horizontal direction to obtain a prediction block of the template. If up-sampling is needed, the output vector is up-sampled in the horizontal direction and then is up-sampled in a vertical direction, to up-sample to the same size as that of the template, so as to output the prediction block of the second template region.

In addition, the decoder utilizes the DIMD technology to derive the optimal intra prediction mode, i.e., the optimal DIMD mode. The DIMD technology calculates the gradient value of the reconstructed samples in the first template region based on the Sobel operator, and then converts the gradient value according to angular values corresponding to different prediction modes, to obtain amplitude values corresponding to the prediction modes.

Next, the decoder obtains the distortion cost based on the prediction block of the template obtained by traversing each of the multiple MIP modes and the reconstructed samples in the template, and records the optimal MIP mode and the transpose information according to the principle of the minimum cost. In addition, the decoder traverses all of the intra prediction modes allowed to be used, calculates the amplitude values corresponding to the intra prediction modes, and records the optimal DIMD prediction mode according to the principle of a maximum amplitude.

Finally, the decoder down-samples, according to the obtained optimal MIP mode and the transpose information, the reconstructed samples adjacent to the top and the left of the current block, as appropriate, performs concatenation according to the transpose information to obtain the input vector, and reads a matrix coefficient corresponding to the current mode by using the MIP mode as an index. Then, the decoder obtains the output vector by calculating the input vector and the matrix coefficient. The decoder can transpose the output according to the transpose information, and up-sample the output vector according to the size of the current block and the number of samples of the output vector to obtain an output of the same size as the current block as the optimal MIP prediction block of the current block. In addition, for the optimal DIMD prediction mode, the decoder obtains interpolation filtering coefficients corresponding to the optimal DIMD prediction mode, and performs interpolation filtering on the reconstructed samples adjacent to the top and left of the current block to obtain the predicted samples at all positions in the current block, which is denoted as the optimal DIMD prediction block. The decoder performs weighted average on each of the predicted samples in the optimal MIP prediction block and the optimal DIMD prediction block according to a preset weight(s), to obtain a new prediction block as the prediction block of the current block.

In addition, the decoder determines that the first intra prediction mode is the intra prediction mode derived from the DIMD mode for the prediction block of the current block, or the decoder determines that the first intra prediction mode is the intra prediction mode derived from the DIMD mode for the reconstructed samples in the first template region.

Step 3

The decoder continues to parse information such as the usage flags or the indexes for other intra prediction technologies and obtains the final prediction block of the current block according to the parsed information.

Step 4

The decoder parses the bitstream and obtains a frequency-domain residual block (also referred to as "frequency-domain residual information") of the current block, and performs inverse quantization and inverse transform (performs inverse transform of the secondary transform based on the first intra prediction mode and then performs inverse transform of the core transform and the primary transform) on the frequency-domain residual block of the current block, to obtain the residual block of the current block (also referred to as "temporal residual block" or "temporal residual information"). Then, the decoder adds the prediction block of the current block to the residual block of the current block to obtain a reconstructed sample block.

Step 5

After all of the reconstructed sample blocks in the current picture are processed by loop filtering or other technologies, a final reconstructed picture is obtained.

Optionally, the reconstructed picture can be implemented as a video output or as a reference for subsequent decoding.

In this embodiment, for the calculation process of the optimal DIMD prediction block, reference can be made to descriptions of the DIMD technical introduction, which is not repeated herein for simplicity. In addition, the fusion weights of the optimal MIP prediction block and the optimal DIMD prediction block can be preset values, such as $5/9$ of the optimal MIP prediction block and $4/9$ of the optimal DIMD prediction block. Certainly, in other alternative embodiments, the fusion weights of the optimal MIP prediction block and the optimal DIMD prediction block can be other values, which are not limited in the present disclosure. Additionally, the second template region may be the same as or different from the first template region, which is not limited in the present disclosure.

The preferred embodiments of the present disclosure are described in detail above in conjunction with the accompanying drawings. However, the present disclosure is not limited to the specific details in the above implementations. Within the technical conception of the present disclosure, various simple variants of technical solutions of the present disclosure can be made, and these simple variants all fall within the protection scope of the present disclosure. For example, each specific technical feature described in the above implementations can be combined in any suitable way without contradiction, and to avoid unnecessary repetition, the various possible combinations are not described separately in the present disclosure. For example, various embodiments of the present disclosure can also be combined in any way, and as long as they do not contradict the idea of the present disclosure, they can also be considered as disclosed in the present disclosure. It can also be understood that in the various method embodiments of the present disclosure, the numbering of each process mentioned above does not imply the order of execution, and the order of execution of each process shall be determined by its function and inherent logic, which shall not constitute any limitation to the implementation process of the embodiments of the present disclosure.

Method embodiments of the present disclosure are described in detail above, and apparatus embodiments of the present disclosure are described in detail below in connection with FIG. 11 to FIG. 13.

Figure 11:
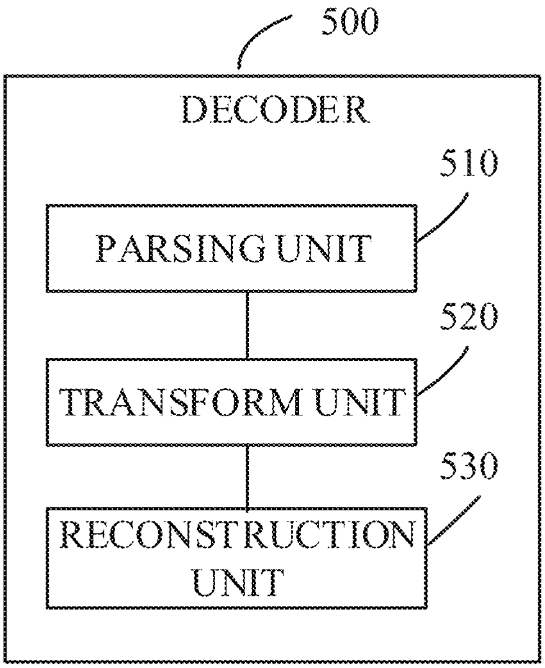
FIG. 11 is a schematic block diagram of a decoder provided in embodiments of the present disclosure.

FIG. 11 is a schematic block diagram of a decoder 500 provided in embodiments of the present disclosure.

As illustrated in FIG. 11, the decoder 500 can include a parsing unit 510, a transform unit 520, and a reconstruction unit 530. The parsing unit 510 is configured to parse a bitstream of a current sequence to obtain first transform coefficients of a current block. The transform unit 520 is configured to determine a first intra prediction mode, where the first intra prediction mode includes any one of: an intra prediction mode derived from a DIMD mode used for a prediction block of the current block, an intra prediction mode derived from the DIMD mode used for an output vector of an optimal MIP mode used for predicting the current block, an intra prediction mode derived from the DIMD mode used for reconstructed samples in a first template region adjacent to the current block, and an intra prediction mode derived from a TIMD mode. The transform unit 520 is configured to perform first transform on the first transform coefficients based on a transform set corresponding to the first intra prediction mode, to obtain second transform coefficients of the current block. The transform unit 520 is configured to perform second transform on the second transform coefficients, to obtain a residual block of the current block. The reconstruction unit 530 is configured to determine a reconstructed block of the current block based on the prediction block of the current block and the residual block of the current block.

In some embodiments, the output vector of the optimal MIP mode is a vector before up-sampling a vector output from the optimal MIP mode; or the output vector of the optimal MIP mode is a vector after up-sampling the vector output from the optimal MIP mode.

In some embodiments, the transform unit 520 is specifically configured to determine the first intra prediction mode based on a prediction mode for predicting the current block.

In some embodiments, the transform unit 520 is specifically configured to, in response to the prediction mode for predicting the current block including the optimal MIP mode and a suboptimal MIP mode for predicting the current block, determine the first intra prediction mode to be the intra prediction mode derived from the DIMD mode for the prediction block of the current block, or determine the first intra prediction mode to be the intra prediction mode derived from the DIMD mode for the output vector of the optimal MIP mode.

In some embodiments, the transform unit 520 is specifically configured to, in response to the prediction mode for predicting the current block including the optimal MIP mode and the intra prediction mode derived from the TIMD mode, determine the first intra prediction mode to be the intra prediction mode derived from the DIMD mode for the prediction block of the current block, or determine the first intra prediction mode to be the intra prediction mode derived from the TIMD mode.

In some embodiments, the transform unit 520 is specifically configured to, in response to the prediction mode for predicting the current block including the optimal MIP mode and the intra prediction mode derived from the DIMD mode for the reconstructed samples in the first template region, determine the first intra prediction mode to be the intra prediction mode derived from the DIMD mode for the prediction block of the current block, or determine the first intra prediction mode to be the intra prediction mode derived from the DIMD mode for the reconstructed samples in the first template region.

In some embodiments, the reconstruction unit 530 is also configured to determine a second intra prediction mode, where the second intra prediction mode includes any one of: a suboptimal MIP mode for predicting the current block, the intra prediction mode derived from the DIMD mode for the reconstructed samples in the first template region, and the intra prediction mode derived from the TIMD mode. The reconstruction unit 530 is further configured to predict the current block in the optimal MIP mode and in the second intra prediction mode, to obtain the prediction block of the current block.

In some embodiments, the reconstruction unit 530 is specifically configured to predict the current block in the optimal MIP mode, to obtain a first prediction block. The reconstruction unit 530 is specifically configured to predict the current block in the second intra prediction mode, to obtain a second prediction block. The reconstruction unit 530 is specifically configured to weight the first prediction block and the second prediction block based on a weight of the optimal MIP mode and a weight of the second intra prediction mode, to obtain the prediction block of the current block.

In some embodiments, before the reconstruction unit 530 weights the first prediction block and the second prediction block based on the weight of the optimal MIP mode and the weight of the second intra prediction mode, to obtain the prediction block of the current block, the reconstruction unit 530 is further configured to, in response to the prediction mode for predicting the current block including the optimal MIP mode as well as the suboptimal MIP mode for predicting the current block or the intra prediction mode derived from the TIMD mode, determine the weight of the optimal MIP mode and the weight of the second intra prediction mode based on a distortion cost of the optimal MIP mode and a distortion cost of the second intra prediction mode. The reconstruction unit 530 is further configured to, in response to the prediction mode for predicting the current block including the optimal MIP mode and the intra prediction mode derived from the DIMD mode for the reconstructed samples in the first template region, determine that both the weight of the optimal MIP mode and the weight of the second intra prediction mode are preset values.

In some embodiments, the transform unit 520 is specifically configured to parse the bitstream of the current sequence to obtain a first flag, and in response to the first flag indicating that the optimal MIP mode and the second intra prediction mode are allowed to be used for predicting a picture block in the current sequence, determine the second intra prediction mode.

In some embodiments, the transform unit 520 is specifically configured to, in response to the first flag indicating that the optimal MIP mode and the second intra prediction mode are allowed to be used for predicting the picture block in the current sequence, parse the bitstream to obtain a second flag. The transform unit 520 is specifically configured to, in response to the second flag indicating that the optimal MIP mode and the second intra prediction mode are allowed to be used for predicting the current block, determine the second intra prediction mode.

In some embodiments, the reconstruction unit 530 is further configured to determine the optimal MIP mode based on distortion costs of multiple MIP modes, where the distortion costs of the multiple MIP modes include distortion costs obtained by predicting samples in a second template region adjacent to the current block in the multiple MIP modes.

In some embodiments, the second template region is the same as or different from the first template region.

In some embodiments, the reconstruction unit 530 is specifically configured to predict the samples in the second template region based on a third flag and the multiple MIP modes, to obtain distortion costs of the multiple MIP modes in each state of the third flag, where the third flag indicates whether an input vector and an output vector corresponding to an MIP mode are transposed. The reconstruction unit 530 is specifically configured to determine the optimal MIP mode based on the distortion costs of the multiple MIP modes in each state of the third flag.

In some embodiments, before the reconstruction unit 530 determines the optimal MIP mode based on the distortion costs of the multiple MIP modes, the reconstruction unit 530 is further configured to obtain MIP modes used for a neighbouring block adjacent to the current block, and determine the MIP modes used for the neighbouring block as the multiple MIP modes.

In some embodiments, before the reconstruction unit 530 determines the optimal MIP mode based on the distortion costs of the multiple MIP modes, the reconstruction unit 530 is further configured to perform reconstructed-sample padding on a reference region adjacent to the second template region, to obtain a reference row and a reference column of the second template region. The reconstruction unit 530 is further configured to predict the samples in the second template region in the multiple MIP modes respectively with the reference row and the reference column as inputs, to obtain multiple prediction blocks corresponding to the multiple MIP modes. The reconstruction unit 530 is further configured to determine the distortion costs of the multiple MIP modes based on the multiple prediction blocks and a reconstructed block of the second template region.

In some embodiments, the reconstruction unit 530 is specifically configured to down-sample the reference row and the reference column, to obtain an input vector. The reconstruction unit 530 is specifically configured to predict the samples in the second template region by traversing the multiple MIP modes with the input vector as an input, to obtain output vectors corresponding to the multiple MIP modes. The reconstruction unit 530 is specifically configured to up-sample the output vectors corresponding to the multiple MIP modes, to obtain the prediction blocks corresponding to the multiple MIP modes.

In some embodiments, the reconstruction unit 530 is specifically configured to determine the optimal MIP mode based on SATDs corresponding to the multiple MIP modes for the second template region.

Figure 12:
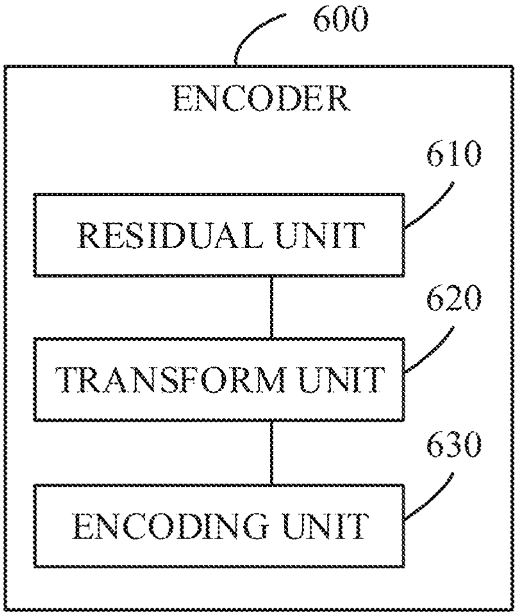
FIG. 12 is a schematic block diagram of an encoder provided in embodiments of the present disclosure.

FIG. 12 is a schematic block diagram of an encoder 600 provided in embodiments of the present disclosure.

As illustrated in FIG. 12, the encoder 600 can include a residual unit 610, a transform unit 620, and an encoding unit 630. The residual unit 610 is configured to obtain a residual block of a current block in a current sequence. The transform unit 620 is configured to perform third transform on the residual block of the current block, to obtain third transform coefficients of the current block. The transform unit 620 is configured to determine a first intra prediction mode, where the first intra prediction mode includes any one of: an intra prediction mode derived from a DIMD mode for a prediction block of the current block, an intra prediction mode derived from the DIMD mode for an output vector of an optimal MIP mode for predicting the current block, an intra prediction mode derived from the DIMD mode for reconstructed samples in a first template region adjacent to the current block, and an intra prediction mode derived from a TIMD mode. The transform unit 620 is configured to perform fourth transform on the third transform coefficients based on a transform set corresponding to the first intra prediction mode, to obtain fourth transform coefficients of the current block. The encoding unit 630 is configured to encode the fourth transform coefficients.

In some embodiments, the output vector of the optimal MIP mode is a vector before up-sampling a vector output from the optimal MIP mode; or the output vector of the optimal MIP mode is a vector after up-sampling the vector output from the optimal MIP mode.

In some embodiments, the transform unit 620 is specifically configured to determine the first intra prediction mode based on a prediction mode for predicting the current block.

In some embodiments, the transform unit 620 is specifically configured to, in response to the prediction mode for predicting the current block including the optimal MIP mode and a suboptimal MIP mode for predicting the current block, determine the first intra prediction mode to be the intra prediction mode derived from the DIMD mode for the prediction block of the current block, or determine the first intra prediction mode to be the intra prediction mode derived from the DIMD mode for the output vector of the optimal MIP mode.

In some embodiments, the transform unit 620 is specifically configured to, in response to the prediction mode for predicting the current block including the optimal MIP mode and the intra prediction mode derived from the TIMD mode, determine the first intra prediction mode to be the intra prediction mode derived from the DIMD mode for the prediction block of the current block, or determine the first intra prediction mode to be the intra prediction mode derived from the TIMD mode.

In some embodiments, the transform unit 620 is specifically configured to, in response to the prediction mode for predicting the current block including the optimal MIP mode and the intra prediction mode derived from the DIMD mode for the reconstructed samples in the first template region, determine the first intra prediction mode to be the intra prediction mode derived from the DIMD mode for the prediction block of the current block, or determine the first intra prediction mode to be the intra prediction mode derived from the DIMD mode for the reconstructed samples in the first template region.

In some embodiments, the residual unit 610 is specifically configured to determine a second intra prediction mode, where the second intra prediction mode includes any one of: a suboptimal MIP mode for predicting the current block, the intra prediction mode derived from the DIMD mode for the reconstructed samples in the first template region, and the intra prediction mode derived from the TIMD mode. The residual unit 610 is specifically configured to predict the current block in the optimal MIP mode and in the second intra prediction mode, to obtain the prediction block of the current block. The residual unit 610 is specifically configured to obtain the residual block of the current block based on the prediction block of the current block.

In some embodiments, the residual unit 610 is specifically configured to predict the current block in the optimal MIP mode, to obtain a first prediction block. The residual unit 610 is specifically configured to predict the current block in the second intra prediction mode, to obtain a second prediction block. The residual unit 610 is specifically configured to weight the first prediction block and the second prediction block based on a weight of the optimal MIP mode and a weight of the second intra prediction mode, to obtain the prediction block of the current block.

In some embodiments, before the residual unit 610 weights the first prediction block and the second prediction block based on the weight of the optimal MIP mode and the weight of the second intra prediction mode, to obtain the prediction block of the current block, the residual unit 610 is further configured to, in response to the prediction mode for predicting the current block including the optimal MIP mode as well as the suboptimal MIP mode for predicting the current block or the intra prediction mode derived from the TIMD mode, determine the weight of the optimal MIP mode and the weight of the second intra prediction mode based on a distortion cost of the optimal MIP mode and a distortion cost of the second intra prediction mode. The residual unit 610 is further configured to, in response to the prediction mode for predicting the current block including the optimal MIP mode and the intra prediction mode derived from the DIMD mode for the reconstructed samples in the first template region, determine that both the weight of the optimal MIP mode and the weight of the second intra prediction mode are preset values.

In some embodiments, the residual unit 610 is specifically configured to obtain a first flag, and in response to the first flag indicating that the optimal MIP mode and the second intra prediction mode are allowed to be used for predicting a picture block in the current sequence, determine the second intra prediction mode. The encoding unit 630 is specifically configured to encode the fourth transform coefficients and the first flag.

In some embodiments, the residual unit 610 is specifically configured to, in response to the first flag indicating that the optimal MIP mode and the second intra prediction mode are allowed to be used for predicting the picture block in the current sequence, predict the current block in the optimal MIP mode and in the second intra prediction mode, to obtain a first rate-distortion cost. The residual unit 610 is specifically configured to predict the current block in at least one intra prediction mode, to obtain at least one rate-distortion cost. The residual unit 610 is specifically configured to, in response to the first rate-distortion cost being less than or equal to a minimum of the at least one rate-distortion cost, determine a prediction block obtained by predicting the current block in the optimal MIP mode and in the second intra prediction mode as the prediction block of the current block. The encoding unit 630 is specifically configured to encode the fourth transform coefficients, the first flag, and a second flag. In response to the first rate-distortion cost being less than or equal to the minimum of the at least one rate-distortion cost, the second flag indicates that the optimal MIP mode and the second intra prediction mode are allowed to be used for predicting the current block. In response to the first rate-distortion cost being greater than the minimum of the at least one rate-distortion cost, the second flag indicates that the optimal MIP mode and the second intra prediction mode are not allowed to be used for predicting the current block.

In some embodiments, the residual unit 610 is further configured to determine the optimal MIP mode based on distortion costs of multiple MIP modes, where the distortion costs of the multiple MIP modes include distortion costs obtained by predicting samples in a second template region adjacent to the current block in the multiple MIP modes.

In some embodiments, the second template region is the same as or different from the first template region.

In some embodiments, the residual unit 610 is specifically configured to predict the samples in the second template region based on a third flag and the multiple MIP modes, to obtain distortion costs of the multiple MIP modes in each state of the third flag, where the third flag indicates whether an input vector and an output vector corresponding to an MIP mode are transposed. The residual unit 610 is specifically configured to determine the optimal MIP mode based on the distortion costs of the multiple MIP modes in each state of the third flag. In some embodiments, before the residual unit 610 determines the optimal MIP mode based on the distortion costs of the multiple MIP modes, the residual unit 610 is further configured to obtain MIP modes used for a neighbouring block adjacent to the current block, and determine the MIP modes used for the neighbouring block as the multiple MIP modes.

In some embodiments, before the residual unit 610 determines the optimal MIP mode based on the distortion costs of the multiple MIP modes, the residual unit 610 is further configured to perform reconstructed-sample padding on a reference region adjacent to the second template region, to obtain a reference row and a reference column of the second template region. The residual unit 610 is further configured to predict the samples in the second template region in the multiple MIP modes respectively with the reference row and the reference column as inputs, to obtain multiple prediction blocks corresponding to the multiple MIP modes. The residual unit 610 is further configured to determine the distortion costs of the multiple MIP modes based on the multiple prediction blocks and a reconstructed block of the second template region.

In some embodiments, the residual unit 610 is specifically configured to down-sample the reference row and the reference column, to obtain an input vector. The residual unit 610 is specifically configured to predict the samples in the second template region by traversing the multiple MIP modes with the input vector as an input, to obtain output vectors corresponding to the multiple MIP modes. The residual unit 610 is specifically configured to up-sample the output vectors corresponding to the multiple MIP modes, to obtain the prediction blocks corresponding to the multiple MIP modes.

In some embodiments, the residual unit 610 is specifically configured to determine the optimal MIP mode based on SATDs corresponding to the multiple MIP modes for the second template region.

It can be understood that the apparatus embodiments and the method embodiments can correspond to each other, and similar descriptions can refer to the method embodiments. To avoid repetition, details are not repeated herein. Specifically, the decoder 500 illustrated in FIG. 11 can execute the method 300 in embodiments of the present disclosure, and the aforementioned and other operations and/or functions of each unit in the decoder 500 are configured to implement related operations of various methods such as the method 300. Similarly, the encoder 600 illustrated in FIG. 12 can execute the method 400 in embodiments of the present disclosure, and the aforementioned and other operations and/or functions of each unit in the encoder 600 are configured to implement related operations of various methods such as the method 400.

It is further to be understood that units of the decoder 500 or the encoder 600 involved in the embodiments of the present disclosure can be separately or wholly combined into one or several other units, or one (or more) of the units herein can further be partitioned into multiple units of smaller functions. In this way, same operations can be implemented, and implementation of the technical effects of the embodiments of the present disclosure is not affected. The foregoing units are partitioned based on logical functions. In an actual implementation, a function of one unit can also be implemented by multiple units, or functions of multiple units are implemented by one unit. In other embodiments of the present disclosure, the decoder 500 or the encoder 600 can also include other units. During the actual implementation, the functions can also be cooperatively implemented by other units and can be cooperatively implemented by multiple units. According to another embodiment of the present disclosure, computer programs (including program codes) that can perform the operations involved in the corresponding method can be run on a general computing device such as a general computer, which includes processing elements and storage elements such as a central processing unit (CPU), a random access memory (RAM), and a read-only memory (ROM), to construct the decoder 500 or the encoder 600 involved in the embodiments of the present disclosure and implement the encoding method and the decoding method provided in the embodiments of the present disclosure. The computer programs can be recorded in, for example, a computer-readable storage medium, and can be loaded into any electronic device having a processing capability through the computer-readable storage medium, and run in the electronic device, to implement the corresponding method in the embodiments of the present disclosure.

In other words, the units mentioned above can be implemented in the form of hardware, can be implemented by instructions in the form of software, or can be implemented in the form of a combination of software and hardware. Specifically, the operations of the method embodiments in the embodiments of the present disclosure can be completed by a hardware integrated logical circuit in a processor, and/or by using instructions in a form of software. The operations of the methods disclosed with reference to the embodiments of the present disclosure can be directly performed and completed by using a hardware decoding processor, or can be performed and completed by using a combination of hardware and software in the decoding processor. Optionally, the software can be located in a mature storage medium in the field, such as a random access memory, a flash memory, a read-only memory, a programmable read-only memory, an electrically-erasable programmable memory, or a register. The storage medium is located in the memory. The processor reads information in the memory and completes the operations of the foregoing method embodiments in combination with hardware thereof.

Figure 13:
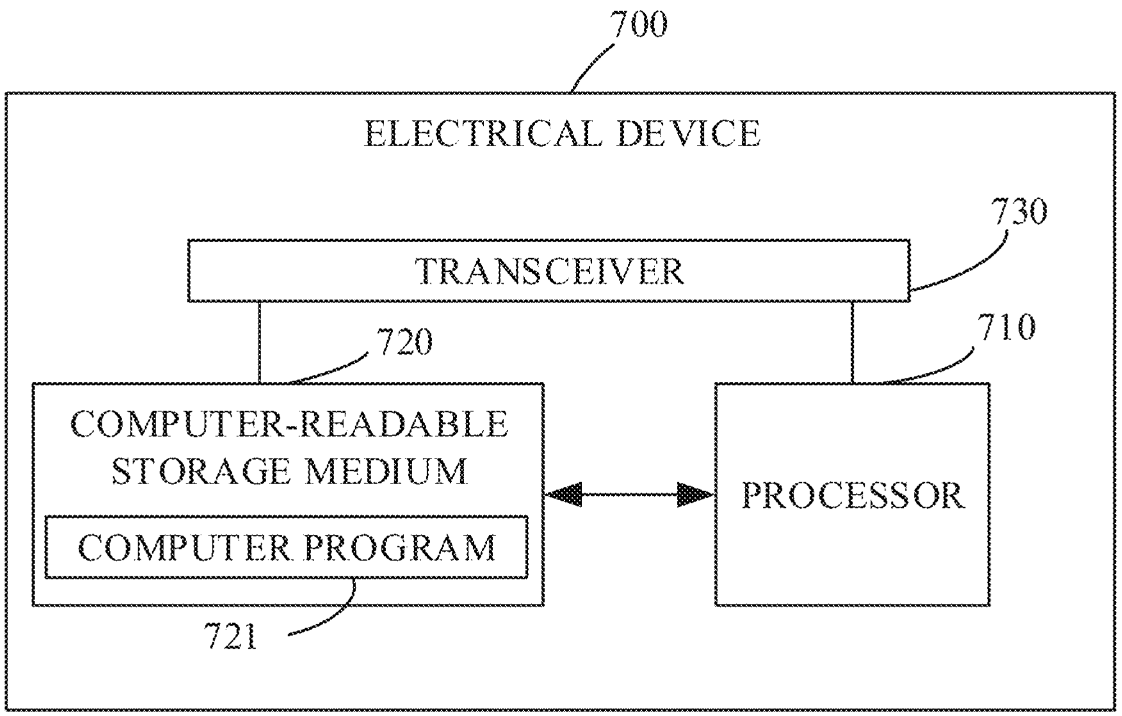
FIG. 13 is a schematic block diagram of an electronic device provided in embodiments of the present disclosure.

FIG. 13 is a schematic structural diagram of an electronic device 700 provided in embodiments of the present disclosure.

As illustrated in FIG. 13, the electronic device 700 at least includes a processor 710, a computer-readable storage medium 720, and a transceiver 730. The processor 710, the computer-readable storage medium 720, and the transceiver 730 can be connected to each other through a bus or in another manner. The computer-readable storage medium 720 is configured to store computer programs 721 and the computer programs 721 include computer instructions, and the processor 710 is configured to execute the computer instructions stored in the computer-readable storage medium 720. The processor 710 is the computing core and control core of the electronic device 700. The processor 710 is suitable for implementing one or more computer instructions, and is suitable for loading and executing the one or more compute instructions to implement a corresponding method procedure or a corresponding function.

As an example, the processor 710 can also be called a CPU. The processor 710 includes but is not limited to: a general processor, a digital signal processor (DSP), an application-specific integrated circuit (ASIC), a field programmable gate array (FPGA), or another programmable logic device, a discrete gate, a transistor logic device, or a discrete hardware component.

As an example, the computer-readable storage medium 720 can be a high-speed RAM memory, or can be a non-volatile memory, such as at least one magnetic disk memory. Optionally, the computer-readable storage medium 720 can be at least one computer-readable storage medium far away from the processor 710. Specifically, the computer-readable storage medium 720 includes, but is not limited to, a volatile memory and/or a non-volatile memory. The non-volatile memory can be an ROM, a programmable read-only memory (PROM), an erasable programmable read-only memory (EPROM), an electrically erasable programmable read-only memory (EEPROM), or a flash memory. The volatile memory can be an RAM, used as an external cache. Through exemplary but not limitative description, many forms of RAMs can be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synch link DRAM, SLDRAM), and a direct Rambus dynamic random access memory (direct Rambus RAM, DR RAM).

In an implementation, the electronic device 700 can be the encoder or the encoding framework involved in embodiments of the present disclosure. The computer-readable storage medium 720 stores a first computer instruction. The first computer instruction stored in the computer-readable storage medium 720 is loaded and executed by the processor 710, to implement corresponding steps in the encoding method provided in embodiments of the present disclosure. In other words, the first computer instruction in the computer-readable storage medium 720 is loaded and executed by the processor 710 to perform corresponding steps. To avoid repetition, details are not described herein again.

In an implementation, the electronic device 700 can be the decoder or the decoding framework involved in embodiments of the present disclosure. The computer-readable storage medium 720 stores a second computer instruction. The second computer instruction stored in the computer-readable storage medium 720 is loaded and executed by the processor 710, to implement corresponding steps in the decoding method provided in embodiments of the present disclosure. In other words, the second computer instruction in the computer-readable storage medium 720 is loaded and executed by the processor 710 to perform corresponding steps. To avoid repetition, details are not described herein again.

According to another aspect of the present disclosure, embodiments of the present disclosure further provide a coding system. The coding system includes the decoder and the encoder.

According to another aspect of the present disclosure, embodiments of the present disclosure further provide a computer-readable storage medium (e.g., memory). The computer-readable storage medium is a memory device in the electronic device 700, and is configured to store programs and data. For example, the computer-readable storage medium is the computer-readable storage medium 720. It can be understood that the computer-readable storage medium 720 herein can include an internal storage medium in the electronic device 700, and can also include an extended storage medium supported by the electronic device 700. The computer-readable storage medium provides a storage space, and the storage space stores an operating system of the electronic device 700. In addition, the storage space further stores one or more computer instructions suitable for being loaded and executed by the processor 710, and the one or more computer instructions can be the one or more computer programs 721 (including program codes).

According to another aspect of the present disclosure, a computer program product or a computer program is provided. The computer program product or the computer program includes computer instructions, and the computer instructions are stored in a computer-readable storage medium. For example, the computer instructions are the computer program 721. In this case, the electronic device 700 can be a computer, the processor 710 reads the computer instructions from the computer-readable storage medium 720, and executes the computer instructions, to cause the computer to perform the encoding method or decoding method provided in the various implementations.

In other words, when software is used to implement the implementations, the implementations can be implemented completely or partially in a form of a computer program product. The computer program product includes one or more computer instructions. When the compute instructions are loaded and executed on the computer, the procedure of the embodiments of the present disclosure is completely or partially run or functions of the embodiments of the present disclosure are completely or partially implemented. The computer can be a general-purpose computer, a special-purpose computer, a computer network, or another programmable apparatus. The computer instructions can be stored in a computer-readable storage medium or transmitted from one computer-readable storage medium to another computer-readable storage medium. For example, the computer instructions can be transmitted from one website, computer, server, or data center to another website, computer, server, or data center in a wired (for example, a coaxial cable, an optical fiber, or a digital subscriber line (DSL)) or wireless (for example, infrared, wireless or microwave) manner.

A person of ordinary skill in the art can be aware that, the units and process steps of the examples described with reference to the implementations disclosed in the present disclosure can be implemented in electronic hardware, or a combination of computer software and electronic hardware. Whether the functions are executed by hardware or software depends on particular applications and design constraint conditions of the technical solutions. A person skilled in the art can use different methods to implement the described functions for each particular application, but it cannot be considered that the implementation goes beyond the scope of the present disclosure.

Finally, the contents are merely embodiments of the present disclosure, but are not intended to limit the protection scope of the present disclosure. Any variation or substitution readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A decoding method, comprising:

parsing a bitstream to obtain first transform coefficients of a current block;

in response to a prediction mode for predicting the current block comprising an optimal matrix based intra prediction (MIP) mode and an intra prediction mode derived from a decoder side intra mode derivation (DIMD) mode for reconstructed samples in a first template region adjacent to the current block, determining a first intra prediction mode to be the intra prediction mode derived from the DIMD mode for the reconstructed samples in the first template region;

performing first transform on the first transform coefficients based on a transform set corresponding to the first intra prediction mode, to obtain second transform coefficients of the current block;

performing second transform on the second transform coefficients, to obtain a residual block of the current block; and determining a reconstructed block of the current block based on a prediction block of the current block and the residual block of the current block.

2. The method of claim 1, further comprising:

determining the optimal MIP mode based on distortion costs of a plurality of MIP modes, wherein the distortion costs of the plurality of MIP modes comprise distortion costs obtained by predicting samples in a second template region adjacent to the current block in the plurality of MIP modes.

3. The method of claim 2, wherein the second template region is the same as or different from the first template region.

4. The method of claim 2, wherein determining the optimal MIP mode based on the distortion costs of the plurality of MIP modes comprises:

predicting the samples in the second template region based on a third flag and the plurality of MIP modes, to obtain distortion costs of the plurality of MIP modes in each state of the third flag, wherein the third flag indicates whether an input vector and an output vector corresponding to an MIP mode are transposed; and determining the optimal MIP mode based on the distortion costs of the plurality of MIP modes in each state of the third flag.

5. An encoding method, applicable to an encoder and comprising:

obtaining a residual block of a current block;

performing third transform on the residual block of the current block, to obtain third transform coefficients of the current block;

in response to a prediction mode for predicting the current block comprising an optimal matrix based intra prediction (MIP) mode and an intra prediction mode derived from a decoder side intra mode derivation (DIMD) mode for reconstructed samples in a first template region adjacent to the current block, determining a first intra prediction mode to be the intra prediction mode derived from the DIMD mode for the reconstructed samples in the first template region;

performing fourth transform on the third transform coefficients based on a transform set corresponding to the first intra prediction mode, to obtain fourth transform coefficients of the current block; and encoding the fourth transform coefficients.

6. The method of claim 5, further comprising:

determining the optimal MIP mode based on distortion costs of a plurality of MIP modes, wherein the distortion costs of the plurality of MIP modes comprise distortion costs obtained by predicting samples in a second template region adjacent to the current block in the plurality of MIP modes.

7. The method of claim 6, wherein the second template region is the same as or different from the first template region.

8. The method of claim 6, wherein determining the optimal MIP mode based on the distortion costs of the plurality of MIP modes comprises:

predicting the samples in the second template region based on a third flag and the plurality of MIP modes, to obtain distortion costs of the plurality of MIP modes in each state of the third flag, wherein the third flag indicates whether an input vector and an output vector corresponding to an MIP mode are transposed; and determining the optimal MIP mode based on the distortion costs of the plurality of MIP modes in each state of the third flag.

9. A non-transitory computer-readable storage medium storing a computer program and a bitstream, wherein when executed by a processor, the computer program causes the processor to implement an encoding method to generate the bitstream, the encoding method comprising:

obtaining a residual block of a current block;

performing third transform on the residual block of the current block, to obtain third transform coefficients of the current block;

in response to a prediction mode for predicting the current block comprising an optimal matrix based intra prediction (MIP) mode and an intra prediction mode derived from a decoder side intra mode derivation (DIMD) mode for reconstructed samples in a first template region adjacent to the current block, determining a first intra prediction mode to be the intra prediction mode derived from the DIMD mode for the reconstructed samples in the first template region;

performing fourth transform on the third transform coefficients based on a transform set corresponding to the first intra prediction mode, to obtain fourth transform coefficients of the current block; and encoding the fourth transform coefficients.

* * * * *